(12) United States Patent
Kotato et al.

(10) Patent No.: US 8,043,745 B2
(45) Date of Patent: Oct. 25, 2011

(54) NON-AQUEOUS ELECTROLYTE SOLUTION AND LITHIUM SECONDARY BATTERY USING SAME

(75) Inventors: Minoru Kotato, Inashiki-gun (JP); Takashi Fujii, Inashiki-gun (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 12/957,698

(22) Filed: Dec. 1, 2010

(65) Prior Publication Data

US 2011/0070485 A1 Mar. 24, 2011

Related U.S. Application Data

(62) Division of application No. 11/578,308, filed as application No. PCT/JP2005/007455 on Apr. 19, 2005, now Pat. No. 8,007,938.

(30) Foreign Application Priority Data

| Apr. 20, 2004 | (JP) | 2004-124174 |
| May 26, 2004 | (JP) | 2004-156209 |
| Jul. 22, 2004 | (JP) | 2004-214104 |
| Aug. 5, 2004 | (JP) | 2004-229188 |
| Aug. 5, 2004 | (JP) | 2004-229757 |
| Oct. 15, 2004 | (JP) | 2004-301751 |

(51) Int. Cl.
*H01M 6/04* (2006.01)
(52) U.S. Cl. ........................ 429/199; 429/188
(58) Field of Classification Search ............... 429/199, 429/188
See application file for complete search history.

(56) References Cited

U.S. PATENT DOCUMENTS

| 5,389,467 A * | 2/1995 | Herr et al. .................. 429/331 |
| 6,664,008 B1 | 12/2003 | Suzuki et al. |
| 6,919,145 B1 | 7/2005 | Kotato et al. |
| 6,929,885 B2 | 8/2005 | Kotato et al. |
| 6,942,948 B2 | 9/2005 | Takehara et al. |
| 7,083,878 B2 | 8/2006 | Kotato et al. |
| 7,241,536 B2 * | 7/2007 | Kim et al. .................. 429/340 |
| 7,575,833 B2 | 8/2009 | Kotato et al. |
| 2010/0021823 A1 | 1/2010 | Onuki et al. |

FOREIGN PATENT DOCUMENTS

| JP | 8-298134 | 11/1996 |
| JP | 2002-343424 | 11/2002 |
| WO | WO00/16427 | 3/2000 |

OTHER PUBLICATIONS

Notice of Rejection mailed on Oct. 19, 2010, in Japanese Patent Application No. 2004-301751 (with English Translation).
Office Action issued Jan. 31, 2011, in Chinese Patent Application No. 201010238080.6, filed Nov. 24, 2010 (with English-language Translation).
L. A. Dominey, et al. "Ether Cosolvents as Components in Sulfolane-Based Rechargeable Lithium Battery Electrolytes", Proceedings of the Symposium on Lithium Batteries, The Electrochemical Society, Inc., vol. 87, No. 1, pp. 300-309. (1987).

* cited by examiner

*Primary Examiner* — Jerry A Lorengo
*Assistant Examiner* — Carlos Barcena
(74) *Attorney, Agent, or Firm* — Oblon, Spivak, McClelland, Maier & Neustadt, L.L.P.

(57) ABSTRACT

A non-aqueous electrolyte solution having a large capacity, exhibits high storage characteristics and cycle characteristics, and is capable if inhibiting gas generation. The non-aqueous electrolyte solution contains a lithium salt and a non-aqueous solvent, and a cyclic carbonate compound having an unsaturated bond in a concentration of 0.01 weight % or higher and 8 weight % or lower; and a compound expressed by a formula (IIb) in a concentration of 0.01 weight % or higher and 5 weight % or lower:

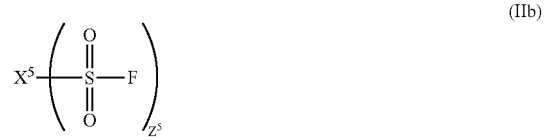

(IIb)

wherein $Z^5$ represents an integer of 2 or larger, $X^5$ represents a linkage group comprising one or more atoms selected from the group consisting of a carbon atom, a hydrogen atom, a fluorine atom and an oxygen atom, and the fluoro sulfonyl group is bound to a carbon atom of the linkage group.

4 Claims, No Drawings

NON-AQUEOUS ELECTROLYTE SOLUTION AND LITHIUM SECONDARY BATTERY USING SAME

TECHNICAL FIELD

The present invention relates to a non-aqueous electrolyte solution and a lithium secondary battery using the same.

BACKGROUND ART

Non-aqueous electrolyte solution batteries, such as lithium secondary batteries, are being put to practical use in a wide range of application fields from a so-called consumer-oriented power source for a cellular phone, a notebook computer, or the like, to an on-vehicle power source for driving an automobile. However, recent years have been seen increasing demands for higher performance on the non-aqueous electrolyte solution batteries: it is demanded to achieve excellent cycle characteristics in addition to large capacity and a high level of high-temperature-storage characteristics.

Accordingly, in order to obtain a non-aqueous electrolyte solution battery with a higher capacity, current designing methods are commonly intended to cram the largest possible amount of active material into a limited battery volume, such as the method in which pressure is applied to the active material layer of the electrode so as to increase its density and reduce the space remaining in the electrode. However, if the space within the battery is diminished, there arises a problem that even when a small amount of gas is generated due to decomposition of the electrolyte solution, the internal pressure of the battery remarkably increases.

Also, when a non-aqueous electrolyte solution battery is used as a backup power source in case of a power failure or a power source of a portable device, in order to compensate for self discharging of the battery, the battery is continuously supplied with a weak current and is constantly put in a state of charging. In such a state of continuous charging, the active materials in the electrodes keep exhibiting a high level of activity while, due to heat generated in the device, the capacity of the battery may acceleratingly decrease or the electrolyte solution may decompose and tend to bring about the generation of gas. Especially in a type of battery that detects an abnormal increase in its internal pressure due to abnormalities such as overcharging and activates a safety valve, generation of a large quantity of gas may also activate the safety valve. On the other hand, in a battery having no safety valve, the pressure of the generated gas may dilate the battery and disable the battery per se.

In order to obtain a non-aqueous electrolyte solution battery that satisfy various properties required for non-aqueous electrolyte solution batteries, including the prevention of gas generation as mentioned above, various compounds are being examined in search of an additive to a non-aqueous electrolyte solution.

For example, Patent Document 1 discloses that when a non-aqueous electrolyte solution using an asymmetric chain carbonic ester compound is used as a non-aqueous solvent while a cyclic carbonic ester compound having double bonds is added thereto, the cyclic carbonic ester compound having double bonds preferentially reacts with a negative electrode to form a coating of good quality over the negative electrode surface, so that the forming of a non-conductive coating over the negative electrode surface caused by the asymmetric chain carbonic ester compound is inhibited, and that the resultant secondary battery shows improvements in its storage characteristics and cycle characteristics.

Patent Document 2 discloses that by adding a carbonic ester compound having ether linkages to a non-aqueous electrolyte solution, the compound covers active spots on the positive electrode surface, oxidative decomposition of a non-aqueous solvent contained in the electrolyte solution can be inhibited, so that the resultant secondary battery shows improvement in its storage stability at high temperature and high voltage.

Patent Document 3 discloses that adding benzene sulfonyl fluoride or p-toluene sulfonyl fluoride to a non-aqueous electrolyte solution improves discharging characteristics at low temperature, so that a battery having excellent cycle characteristics can be obtained.

Patent Document 4 discloses that when an electrolyte solution includes an ether compound having a specific structure containing fluorine atoms, runaway reaction due to overheating does not occur, so that the electrolyte solution shows improved safety.

Patent Document 5 discloses that when one or more of aromatic compounds, esters, carbonates and monoethers having a specific structure including fluorines are contained in an electrolyte solution, generation of hydrogen gas due to decomposition of the electrolyte solution is inhibited at an interface between the positive electrode and the separator, so that swelling of the battery can be inhibited even in high temperature surrounding.

Patent Document 6 discloses that when a cyclic ether compound is added to a non-aqueous electrolyte solution using a mixture of a cyclic carbonic ester and a chain carbonic ester as a non-aqueous solvent, the resultant battery has large capacity and is excellent in cycle characteristics.

Patent Document 7 reports that when a compound monomer or polymer whose molecule contains an amide group is used for forming a coating of a negative electrode, the heat-resistance stability of the negative-electrode coating can be improved.

[Patent Document 1] Japanese Patent Laid-Open Application No. Hei 11-185806
[Patent Document 2] Japanese Patent Laid-Open Application No. 2002-237328
[Patent Document 3] Japanese Patent Laid-Open Application No. 2002-359001
[Patent Document 4] The pamphlet of International Publication No. 00/16427
[Patent Document 5] Japanese Patent Laid-Open Application No. 2002-343424
[Patent Document 6] Japanese Patent Laid-Open Application No. Hei 10-116631
[Patent Document 7] Japanese Patent Laid-Open Application No. 2003-31260

DISCLOSURE OF THE INVENTION

Problem to Be Solved by the Invention

However, as regards a secondary battery using a non-aqueous electrolyte solution containing a cyclic carbonic ester compound having double bonds disclosed in Patent Document 1, although cycle characteristics at room temperature are improved, there are problems in that cycle characteristics at low temperature may become deteriorated and that the amount of gas generated during a state of continuous charging may increase.

As for a non-aqueous electrolyte solution containing benzene sulfonyl fluoride or p-toluene sulfonyl fluoride described in Patent Document 3, there is a problem in that continuous charging characteristics at high temperature and high-temperature-storage characteristics may be deteriorated.

Regarding Patent Document 4, it only shows examples in which ether compounds having fluorines are contained at 60-70 weight % and makes no mention of battery characteristics, so that there is a problem in that when it is actually applied to a battery, battery characteristics such as continuous charging characteristics may decline.

As to Patent Document 5, there is no mention of cyclic carbonates having unsaturated bonds and is also silent about continuous charging characteristics at high voltage. It therefore involves a problem in that continuous charging characteristics may actually decrease.

In addition, when an electrolyte solution as disclosed in Patent Document 4 and Patent Document 5 is used at high voltage, there is a problem that the battery may be deteriorated and that battery characteristics may decline, as will be mentioned later. Specifically, although a battery having lower volume and higher density can be realized by enabling the battery to be charged and discharged by a higher voltage, when the battery is actually used at a high voltage, the electrode having a high potential may react with the electrolyte solution to bring about deterioration in the battery and shortening of the battery's life.

As regards a monocyclo cyclic ether compound such as 1,3-dioxolane, tetrahydrofuran, tetrahydropyran, or dioxane as described in Patent Document 6, the present inventors examined it by adding it to a non-aqueous electrolyte solution, as a result of which continuous charging characteristics (especially, residual capacity after continuous charging) and high-temperature-storage characteristics were not improved.

Also, Patent Document 7 only mentions a wide range of compounds having a specific partial structure containing nitrogen and oxygen, and is silent about battery characteristics that are of prime importance when being put in practical use, especially degradation characteristics and gas generation during storage.

In recent years, batteries of smaller sizes have been demanded for uses such as cellular phones, while prevention of swelling has become a problem of higher importance along with increase in capacity. One of the main causes of such swelling is, in addition to the swelling and shrinking of electrodes and other components, the generation of gas resulting from the decomposition of electrolyte solution or the like. Since the prevention of such swelling enables to develop batteries of smaller sizes, further improvements are demanded in order to prevent gas generation without impairing other characteristics. When a battery is used in a state of continuous charging with high voltage, there is a problem in that the electrodes at high potential react with the electrolyte solution to bring about increase in gas generation, deterioration of the battery, and reduction in the life of the battery.

The present invention has been made in view of the above problems.

An objective of the present invention is to provide a non-aqueous electrolyte solution that is capable of inhibiting gas generation while retaining high cycle characteristics, as well as improving continuous charging characteristics and high-temperature-storage characteristics, and a lithium secondary battery employing the same.

Another objective of the present invention is to provide a non-aqueous electrolyte solution that is capable of inhibiting deterioration of a battery used with high voltage, and a lithium secondary battery employing the same.

Still another objective of the present invention is to provide a non-aqueous electrolyte solution that is capable of inhibiting deterioration of a battery stored in a discharged state, as well as inhibiting gas generation, and a lithium secondary battery employing the same.

Means for Solving the Problem

As the result of eager study, the present inventors have found that the problems can be solved effectively when a non-aqueous electrolyte solution comprising a lithium salt and a non-aqueous solvent further comprises a combination of a cyclic carbonate compound with an unsaturated bond (A ingredient) and a compound (I) (B ingredient) having a specific structure described later, or a compound (II) (C ingredient) with a specific structure described later, and have accomplished the present invention.

According to a first aspect of the present invention, there is provided a non-aqueous electrolyte solution comprising: a lithium salt; a non-aqueous solvent; a cyclic carbonate compound having an unsaturated bond in a concentration of 0.01 weight % or higher and 8 weight % or lower; and a compound expressed by the following general formula (Ia) in a concentration of 0.01 weight % or higher and 5 weight % or lower.

[Chemical Formula 1]

(Ia)

(in the formula (Ia), $R^{11}$ and $R^{12}$ represent, independently of each other, an organic group that is composed of one or more carbon atoms and hydrogen atoms and may optionally contain one or more oxygen atoms but excludes unsaturated bonds, provided that at least either $R^{11}$ or $R^{12}$ has an ether linkage. The total number of carbon atoms of $R^{11}$ and $R^{12}$ is between 3 and 18, and the total number of oxygen atoms contained in $R^{11}$ and $R^{12}$ is between 1 and 6.)

According to a second aspect of the present invention, there is provided a non-aqueous electrolyte solution comprising: a lithium salt; a non-aqueous solvent; a cyclic carbonate compound having an unsaturated bond; and a compound expressed by the following general formula (Ib).

[Chemical Formula 2]

(Ib)

(in the formula (Ib), $R^{21}$ represents an alkyl group having 1-12 carbon atoms that may be substituted by a fluorine atom or an alkenyl group having 2-12 carbon atoms that may be substituted by a fluorine atom, wherein the group may have an ether linkage within its chain.)

It is preferable that in the general formula (Ib), $R^{21}$ is an alkyl group having 1-3 carbon atoms that may be substituted by a fluorine atom.

It is also preferable that the concentration of the compound expressed by the general formula (Ib) with respect to the non-aqueous electrolyte solution is 0.001 weight % or higher and 5 weight % or lower.

It is also preferable that the concentration of the cyclic carbonate compound having an unsaturated bond with respect to the non-aqueous electrolyte solution is 0.01 weight % or higher and 8 weight % or lower.

According to a third aspect of the present invention, there is provided a non-aqueous electrolyte solution comprising: a lithium salt; a non-aqueous solvent; a cyclic carbonate compound having an unsaturated bond in a concentration of 0.01 weight % or higher and 8 weight % or lower; and a compound expressed by the following general formula (Ic) in a concentration of 0.01 weight % or higher and 5 weight % or lower.

[Chemical Formula 3]

(Ic)

(in the formula (Ic), n represents an integer of 1-3 and $X^3$ represents a group selected by the groups expressed by the following formulae (Ic-1)-(Ic-4).

[Chemical Formula 4]

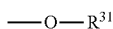 (Ic-1)

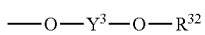 (Ic-2)

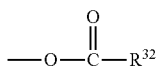 (Ic-3)

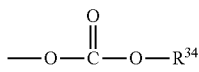 (Ic-4)

in the formulae (Ic-1)-(Ic-4), $R^{31}$-$R^{34}$ represent, independently of each other, an alkyl group having 1-20 carbon atoms that may be substituted by a halogen atom, and $Y^3$ represents a divalent hydrocarbon group having 1-10 carbon atoms that may be substituted by a halogen atom.)

It is preferable that in the general formula (Ic), $X^3$ is expressed by the formula (Ic-2), and in the formula (Ic-2), $Y^3$ is a divalent alkylene group having 1-10 carbon atoms that may be substituted by a halogen atom.

It is also preferable that in the general formula (Ic), $X^3$ is expressed by the formula (Ic-3).

It is also preferable that in the general formula (Ic), $X^3$ is expressed by the formula (Ic-4).

It is also preferable that in the formulae (Ic-1)-(Ic-4), each of $R^{31}$-$R^{34}$ is an alkyl group having 1-20 carbon atoms substituted by 1-3 fluorine atoms.

According to a fourth aspect of the present invention, there is provided a non-aqueous electrolyte solution comprising: a lithium salt; a non-aqueous solvent; and a compound expressed by the following formula (IIa).

[Chemical Formula 5]

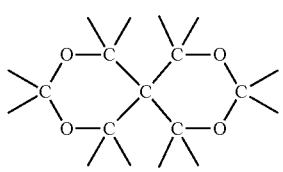
(IIa)

It is preferable that the compound expressed by the following formula (IIa) is a compound expressed by the following general formula (IIa').

[Chemical Formula 6]

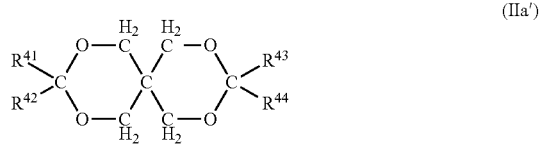
(IIa')

(in the formula (IIa'), $R^{41}$-$R^{44}$ represent, independently of each other, a hydrogen atom, an alkyl group having 1-12 carbon atoms that may be substituted by a fluorine atom, an alkenyl group having 2-12 carbon atoms that may be substituted by a fluorine atom, an aryl group having 6-12 carbon atoms that may be substituted by a fluorine atom, or an aralkyl group having 7-12 carbon atoms that may be substituted by a fluorine atom. The group may have an ether linkage in its chain. $R^{41}$ may be linked with $R^{42}$, and $R^{43}$ may be linked with $R^{44}$, to form a ring that may have an oxygen atom.)

It is also preferable that the concentration of the compound having the structure expressed by the formula (IIa) with respect to the non-aqueous electrolyte solution is 0.001 weight % or higher and 5 weight % or lower.

According to a fifth aspect of the present invention, there is provided a non-aqueous electrolyte solution comprising: a lithium salt; a non-aqueous solvent; and a compound expressed by the following general formula (IIb).

[Chemical Formula 7]

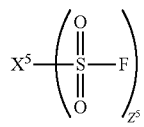
(IIb)

(in the formula (IIb), $Z^5$ represents an integer of 2 or larger, $X^5$ represents a $Z^5$ valent linkage group composed of one or more atoms selected from the group consisting of a carbon atom, a hydrogen atom, a fluorine atom and an oxygen atom, and the fluoro sulfonyl group is bound to a carbon atom of the linkage group.)

It is preferable that the concentration of the compound expressed by the general formula (IIb) with respect to the non-aqueous electrolyte solution is 0.001 weight % or higher and 5 weight % or lower.

In the aforementioned fourth and fifth aspects of the present invention, it is also preferable that it further comprises a cyclic carbonate compound having an unsaturated bond in a concentration of 0.01 weight % or higher and 8 weight % or lower with respect to the non-aqueous electrolyte solution.

According to a sixth aspect of the present invention, there is provided a non-aqueous electrolyte solution comprising: a lithium salt; a non-aqueous solvent; and a compound expressed by the following general formula (IIc) in a concentration of 0.01 weight % or higher and 4 weight % or lower with respect to the non-aqueous electrolyte solution.

[Chemical Formula 8]

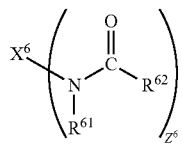

(IIc)

(in the formula (IIc), $Z^6$ represents an integer of 2 or larger, $X^6$ represents a $Z^6$-valent hydrocarbon group having 1-6 carbon atoms, $R^{61}$ represents, independently of each other, an alkyl group having 1-6 carbon atoms, and $R^{62}$ represents, independently of each other, an alkyl group having 1-6 carbon atoms substituted by one or more halogen atoms. Any two or more of $R^{61}$ and/or $R^{62}$ may be linked with each other to form a ring.)

It is preferable that it further comprises a cyclic carbonate compound having an unsaturated bond in a concentration of 0.01 weight % or higher and 5 weight % or lower with respect to the non-aqueous electrolyte solution.

In the aforementioned first through sixth aspects of the present invention, it is preferable that the cyclic carbonate compound having an unsaturated bond is a compound or a plurality of compounds selected from the group consisting of vinylene carbonate, vinyl ethylene carbonate, divinyl ethylene carbonate, vinyl vinylene carbonate and methylene carbonate.

According to a seventh aspect of the present invention, there is provided a lithium secondary battery comprising: a non-aqueous electrolyte solution; and a positive electrode and a negative electrode capable of absorbing and desorbing lithium ions; wherein the non-aqueous electrolyte solution is a non-aqueous electrolyte solution according to the aforementioned first through sixth aspects of the present invention.

ADVANTAGEOUS EFFECTS OF THE INVENTION

With the non-aqueous electrolyte solution according to the first aspect of the present invention, it is possible to provide a battery that has a large capacity and is excellent in storage characteristics and cycle characteristics, as well as to achieve reduction in size and improvement in performance of a lithium secondary battery.

With the non-aqueous electrolyte solution according to the second aspect of the present invention, it is possible to provide a battery that has a large capacity, is excellent in storage characteristics, load characteristics and cycle characteristics, and inhibits decrease in capacity and gas generation during continuous charging, as well as to achieve reduction in size and improvement in performance of a lithium secondary battery.

With the non-aqueous electrolyte solution according to the third aspect of the present invention, it is possible to realize an excellent non-aqueous electrolyte solution that is capable of inhibiting deterioration of a battery used with high voltage. Employing the non-aqueous electrolyte solution, it is also possible to realize an excellent lithium secondary battery that allows charge and discharge with high voltage to thereby realize reduction in size and increase in density.

With the non-aqueous electrolyte solution according to the fourth aspect of the present invention, it is possible to provide a battery that has a large capacity, is excellent in storage characteristics, load characteristics and cycle characteristics, and inhibits decrease in capacity and gas generation during continuous charging, as well as to achieve reduction in size and improvement in performance of a non-aqueous electrolyte solution battery.

With the non-aqueous electrolyte solution according to the fifth aspect of the present invention, it is possible to provide a battery that has a large capacity, is excellent in storage characteristics, load characteristics and cycle characteristics, and inhibits decrease in capacity and gas generation during continuous charging, as well as to achieve reduction in size and improvement in performance of a non-aqueous electrolyte solution battery.

With the non-aqueous electrolyte solution according to the sixth aspect of the present invention, it is possible to realize an excellent non-aqueous electrolyte solution that is capable of inhibiting deterioration when stored in a discharged state while inhibiting gas generation. Employing the non-aqueous electrolyte solution, it is also possible to realize an excellent lithium secondary battery.

BEST MODES FOR CARRYING OUT THE INVENTION

Hereinafter, embodiments of the present invention will be explained in detail, although the present invention should by no means be limited to the following embodiments and can be embodied with receiving any modifications unless departing from the gist of the invention.

The first non-aqueous electrolyte solution of the present invention comprises a lithium salt and a non-aqueous solvent, characterized in that it further comprises a cyclic carbonate compound having an unsaturated bond (hereinafter also called "A ingredient") and a compound (I) (hereinafter also called "B ingredient") described below.

The second non-aqueous electrolyte solution of the present invention comprises a lithium salt and a non-aqueous solvent, characterized in that it further comprises a compound (II) (hereinafter also called "C ingredient") described below. In addition, it is preferable to further comprise a cyclic carbonate compound having an unsaturated bond (hereinafter also called "D ingredient").

The lithium secondary battery of the present invention is a lithium secondary battery that comprises a non-aqueous electrolyte solution and a positive electrode and a negative electrode capable of absorbing and desorbing lithium ions, characterized in that the non-aqueous electrolyte solution is the first non-aqueous electrolyte solution or the second non-aqueous electrolyte solution of the present invention.

In the following description, explanations will be given first on the first non-aqueous electrolyte solution and the second non-aqueous electrolyte solution of the present invention in turn, and then on the lithium secondary battery of the present invention employing these solutions. Incidentally, the first non-aqueous electrolyte solution and the second non-aqueous electrolyte solution of the present invention will be separately called "the non-aqueous electrolyte solution (I)" and "the non-aqueous electrolyte solution (II)", respectively, when explained distinguishingly, while they will be collectively called "the non-aqueous electrolyte solution of the present invention" when explained without particular distinction.

[1: Non-aqueous Electrolyte Solution (I)]

The non-aqueous electrolyte solution (I) comprises a lithium salt, a non-aqueous solvent, a cyclic carbonate compound having an unsaturated bond (A ingredient), and a compound (I) (B ingredient) described later.

[Electrolyte]

The electrolyte used for the non-aqueous electrolyte solution (I) is not particularly limited but may be selected arbitrarily from compounds known to be usable as an electrolyte for the objective secondary battery. For use in a lithium secondary battery, a lithium salt is usually used as the electrolyte.

Examples of lithium salts are: inorganic lithium salts such as $LiClO_4$, $LiAsF_6$, $LiPF_6$, $Li_2CO_3$ and $LiBF_4$; fluorine-containing organic lithium salts such as $LiCF_3SO_3$, $LiN(CF_3SO_2)_2$, $LiN(C_2F_5SO_2)_2$, lithium cyclic 1,3-perfluoropropane disulfonyl imide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_5SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; oxalate borate salts such as lithium bis(oxalate)borate, and lithium difluoro oxalate borate; sodium or potassium salts such as $KPF_6$, $NaPF_6$, $NaBF_4$, and $Na_2CF_3SO_3$. These may be used either singly or a mixture of two or more. Among them, $LiPF_6$, $LiBF_4$, $LiCF_3SO_3$, $LiN(CF_3SO_2)_2$, and $LiN(C_2F_5SO_2)_2$ are preferable, and $LiPF_6$ and $LiBF_4$ are especially preferable.

The aforementioned lithium salts may be used either singly or in combination of any two or more in an arbitrary ratio, although a combined use of two or more inorganic lithium salts or a combined use of an inorganic lithium salt and a fluorine-containing organic lithium salt is desirable because gas generation during continuous charging can be inhibited or because deterioration after high-temperature storage can be prevented. Especially desirable is a combined use of $LiPF_6$ and $LiBF_4$ or a combined use of an inorganic lithium salt such as $LiPF_6$ or $LiBF_4$ and a fluorine-containing organic lithium salt such as $LiCF_3SO_3$, $LiN(CF_3SO_2)_2$, or $LiN(C_2F_5SO_2)_2$. When $LiPF_6$ and $LiBF_4$ are combinedly used, it is preferable that $LiBF_4$ is contained in a ratio of usually 0.01 weight % or higher and 20 weight % or lower with respect to the whole lithium salts. When an inorganic lithium salt such as $LiPF_6$ or $LiBF_4$ and a fluorine-containing organic lithium salt such as $LiCF_3SO_3$, $LiN(CF_3SO_2)_2$, or $LiN(C_2F_5SO_2)_2$ are combinedly used, it is desirable that the proportion of the inorganic lithium salt with respect to the whole lithium salt is within the range of usually 70 weight % or higher and 99 weight % or lower.

The concentration of the lithium salt in the non-aqueous electrolyte solution (I) is within the range of usually 0.5 mol/litre or larger, preferably 0.6 mol/litre or larger, more preferably 0.8 mol/litre or larger, and usually 3 mol/litre or smaller, preferably 2 mol/litre or smaller, more preferably 1.5 mol/litre or smaller. When the concentration is too low, the electric conductivity of the electrolyte solution may be insufficient, while when the concentration is too high, the electric conductivity may decrease due to increase in its viscosity to cause decline in the battery's performance.

[Non-Aqueous Solvent]

As the non-aqueous solvent of the non-aqueous electrolyte solution (I), it is possible to use any compound previously known as a solvent for a non-aqueous electrolyte solution, usually an organic solvent is used. Examples of organic solvents are chain and cyclic carbonates, chain and cyclic carboxylic acid esters, and chain and cyclic ethers.

Examples of cyclic carbonates are alkylene carbonates whose alkylene groups have 2-4 carbon atoms, such as ethylene carbonate, propylene carbonate, butylene carbonate, and fluoroethylene carbonate. Among them, ethylene carbonate and propylene carbonate are preferable.

Examples of chain carbonates are dialkyl carbonates whose alkyl groups have 1-4 carbon atoms, such as dimethyl carbonate, diethyl carbonate, di-n-propyl carbonate, ethyl methyl carbonate, methyl-n-propyl carbonate, and ethyl-n-propyl carbonate. Among them, dimethyl carbonate, diethyl carbonate, and ethyl methyl carbonate are preferable.

Examples of cyclic carboxylic acid esters are γ-butyrolactone and γ-valerolactone.

Examples of chain carboxylic acid esters are methyl acetate, ethyl acetate, methyl propionate, ethyl propionate, and methyl butyrate.

Examples of cyclic ethers are tetrahydrofuran and 2-methyl tetrahydrofuran.

Examples of chain ethers are diethoxyethane, dimethoxyethane, and dimethoxymethane.

These non-aqueous solvents may be used either any one singly or in combination of any two or more in an arbitrary ratio, although a combined use of two or more compounds is preferable. For example, it is desirable to use a high-dielectric solvent, such as a cyclic carbonate or a cyclic carboxylic acid ester, in combination with a low-viscosity solvent, such as a chain carbonate or a chain carboxylic acid ester.

When a chain carboxylic acid ester is contained in the non-aqueous solvent, the proportion of the chain carboxylic acid ester to the non-aqueous solvent is usually 50 weight % or lower, preferably 30 weight % or lower, more preferably 20 weight % or lower. If the proportion exceeds the upper limit, a decline in conductivity may occur. Note that the chain carboxylic acid ester is not an essential ingredient of the non-aqueous solvent, and that the non-aqueous solvent may contain no chain carboxylic acid ester.

When a cyclic carboxylic acid ester is contained in the non-aqueous solvent, the proportion of the cyclic carboxylic acid ester to the non-aqueous solvent is usually 60 weight % or lower, preferably 55 weight % or lower, more preferably 50 weight % or lower. If the proportion exceeds the upper limit, a decline in immersivity or degradation in output characteristics at low temperature may occur. Note that the cyclic carboxylic acid ester is not an essential ingredient of the non-aqueous solvent, and that the non-aqueous solvent may contain no cyclic carboxylic acid ester.

When a chain ethers is contained in the non-aqueous solvent, the proportion of the chain ether to the non-aqueous solvent is usually 60 weight % or lower, preferably 40 weight % or lower, more preferably 30 weight % or lower. If the proportion exceeds the upper limit, a decline in conductivity may occur. Note that the chain ether is not an essential ingredient of the non-aqueous solvent, and that the non-aqueous solvent may contain no chain ether.

When a cyclic ether is contained in the non-aqueous solvent, the proportion of the cyclic ether to the non-aqueous solvent is usually 60 weight % or lower, preferably 50 weight % or lower, more preferably 40 weight % or lower. If the proportion exceeds the upper limit, a decline in storage characteristics may occur. Note that the cyclic ether is not an essential ingredient of the non-aqueous solvent, and that the non-aqueous solvent may contain no cyclic ether.

One of the desirable combinations of non-aqueous solvents is a mixture mainly consisting of a cyclic carbonate and a chain carbonate. It is especially preferable that the total proportion of the cyclic carbonate and the chain carbonate in the non-aqueous solvent is usually 85 volume % or larger, preferably 90 volume % or larger, more preferably 95 volume % or larger and that the volume ratio between the cyclic carbonate and the chain carbonate is usually 5:95 or higher, preferably 10:90 or higher, more preferably 15:85 or higher and usually 45:55 or lower, preferably 40:60 or lower. Using the aforementioned mixture solvent together with an electrolyte, such as a lithium salt, a cyclic carbonate compound having an unsaturated bond (A ingredient), and a compound (I) (B ingredient) to prepare a non-aqueous electrolyte solution (I)

is preferable because it is possible to adjust the balance between characteristics, such as cycle characteristics and large current discharging characteristics, and inhibition of gas generation.

Preferable examples of the combinations between cyclic carbonates and chain carbonates are combinations of ethylene carbonate and dialkyl carbonates. Specifically, there can be mentioned the combination of ethylene carbonate and dimethyl carbonate, the combination of ethylene carbonate and diethyl carbonate, the combination of ethylene carbonate and ethyl methyl carbonate, the combination of ethylene carbonate, dimethyl carbonate and diethyl carbonate, the combination of ethylene carbonate, dimethyl carbonate and ethyl methyl carbonate, the combination of ethylene carbonate, diethyl carbonate and ethyl methyl carbonate, the combination of ethylene carbonate, dimethyl carbonate, diethyl carbonate and ethyl methyl carbonate, etc.

The addition of propylene carbonate to these combinations of ethylene carbonate and dialkyl carbonates gives other preferable combinations. In this case, the volume ratio between ethylene carbonate and propylene carbonate is usually 99:1 or lower, preferably 95:5 or lower and usually 1:99 or higher, preferably 20:80 or higher.

The combinations of propylene carbonate and the aforementioned dialkyl carbonates are also preferable.

Other examples of the non-aqueous solvent are the ones that contain an organic solvent selected from the group consisting of ethylene carbonate, propylene carbonate, γ-butyrolactone, and γ-valerolactone in the ratio of 60 volume % or larger. Using one of these mixture solvents together with an electrolyte, such as a lithium salt, a cyclic carbonate compound having an unsaturated bond (A ingredient), and compound (I) (B ingredient), the resultant non-aqueous electrolyte solution (I) can suppress vaporization and leakage of solvents when used at high temperature. Preferable among these are: the ones in which the total volume of ethylene carbonate and γ-butyrolactone with respect to the non-aqueous solvent is 80 volume % or larger, preferably 90 volume % or larger, and the volume ratio of ethylene carbonate to γ-butyrolactone is between 5:95 and 45:55; and the ones in which the total volume of ethylene carbonate and propylene carbonate with respect to the non-aqueous solvent is 80 volume % or larger, preferably 90 volume % or larger, and the volume ratio of ethylene carbonate to propylene carbonate is between 30:70 and 80:20. Using one of these mixture solvents together with an electrolyte, such as a lithium salt, a cyclic carbonate compound having an unsaturated bond (A ingredient), and a compound (I) (B ingredient) to prepare a non-aqueous electrolyte solution (I) is preferable because it can give fine balance between storage characteristics and gas generation inhibition.

It is also preferable to use a phosphorus-containing organic solvent for the non-aqueous solvent. By adding a phosphorus-containing organic solvent to the non-aqueous solvent at a ratio of usually 10 volume % or larger, preferably between 10-80 volume %, it is possible to reduce the combustibility of the electrolyte solution. It is especially preferable to use a phosphorus-containing organic solvent in combination with a non-aqueous solvent selected from the group consisting of ethylene carbonate, propylene carbonate, γ-butyrolactone, γ-valerolactone and dialkyl carbonate because cycle characteristics and large current discharging characteristics are well-balanced.

Incidentally, in the present description, the volume of a non-aqueous solvent means a value measured at 25° C. in principle: as the exceptions, for a solvent that is in the solid state at 25° C., such as ethylene carbonate, it means a value measured at the melting point.

[Unsaturated Cyclic Carbonate Compound (A Ingredient)]

The non-aqueous electrolyte solution (I) contains a cyclic carbonate compound having an unsaturated bond (in the present description, it may be abbreviated as "unsaturated cyclic carbonate compound") as A ingredient. The term "unsaturated cyclic carbonate compound" means a compound that has at least one carbonate structure, at least one carbon-carbon double bond, and at least one cyclic structure in a single molecule.

As examples of unsaturated cyclic carbonate compounds are vinylene carbonate compounds, vinyl ethylene carbonate compounds, and methylene ethylene carbonate compounds, although any compound can be used as long as it falls within the above definition.

Examples of vinylene carbonate compounds are vinylene carbonate (hereinafter may be abbreviated as "VC"), methyl vinylene carbonate, ethyl vinylene carbonate, 4,5-dimethyl vinylene carbonate, 4,5-diethyl vinylene carbonate, fluoro vinylene carbonate, trifluoromethyl vinylene carbonate, 4-vinyl vinylene carbonate, etc.

Examples of vinyl ethylene carbonate compounds are vinyl ethylene carbonate, 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, 4,5-divinyl ethylene carbonate, etc.

Examples of methylene ethylene carbonate compounds are methylene ethylene carbonate, 4,4-dimethyl-5-methylene ethylene carbonate, 4,4-diethyl-5-methylene ethylene carbonate, etc.

Among these, preferable unsaturated cyclic carbonate compounds are vinylene carbonate and vinyl ethylene carbonate, especially preferable being vinylene carbonate.

These unsaturated cyclic carbonate compounds may be used either any one singly or in combination of any two or more at an arbitrary ratio.

The proportion of the unsaturated cyclic carbonate compound in the non-aqueous electrolyte solution (I) is usually 0.01 weight % or higher, preferably 0.1 weight % or higher, especially preferably 0.5 weight % or higher, most preferably 1 weight % or higher, and usually 8 weight % or lower, preferably 6 weight % or lower, especially preferably 4 weight % or lower. If the volume of the unsaturated cyclic carbonate compound is below the lower limit, it is difficult to form an adequate amount of negative electrode coating, which is explained later, and may result in deterioration. On the other hand, if the volume exceeds the upper limit, an excessive amount of negative electrode coating may be formed and prevent the migration of lithium ions. When two or more unsaturated cyclic carbonate compounds are used in combination, the total volume of the unsaturated cyclic carbonate compounds should meet the above range.

[Compound (I) (B Ingredient)]

The non-aqueous electrolyte solution (I) contains, as B ingredient, at least one compound of a compound (Ia), a compound (Ib), and a compound (Ic) explained below (hereinafter also called "compound (I)"). The non-aqueous electrolyte solution (I) may contain any one of the compound (Ia), the compound (Ib) and the compound (Ic) singly, or may contain two or three of them in combination. In the following description, the non-aqueous electrolyte solutions (I) that each contain a respective one of the compound (Ia), the compound (Ib), and the compound (Ic) will be respectively called the "non-aqueous electrolyte solution (Ia)" through the "non-aqueous electrolyte solution (Ic)" when explained separately, while they will be collectively called the "non-aqueous electrolyte solution (I)" when explained without particular distinction.

<Compound (Ia)>

The compound (Ia) is a compound expressed by the following general formula (Ia).

[Chemical Formula 9]

In the general formula (Ia), $R^{11}$ and $R^{12}$ represents, independently of each other, an organic group that is composed of one or more carbon atoms and hydrogen atoms and may optionally contain one or more oxygen atoms but excludes unsaturated bonds, provided that at least either $R^{11}$ or $R^{12}$ has an ether linkage. The total number of carbon atoms of $R^{11}$ and $R^{12}$ is between 3 and 18, and the total number of oxygen atoms contained in $R^{11}$ and $R^{12}$ is between 1 and 6. It is preferable that the total number of carbon atoms of $R^{11}$ and $R^{12}$ is between 3 and 10, and that the total number of oxygen atoms contained in $R^{11}$ and $R^{12}$ is between 1 and 4.

It is preferable that each of $R^{11}$ and $R^{12}$ is an alkyl group or an alkyl group having an ether linkage. Preferable alkyl groups are methyl group and ethyl group, while preferable alkyl groups having an ether linkage are methoxy alkyl groups and ethoxy alkyl groups. It is also preferable that $R^{11}$ and $R^{12}$ are different with each other, especially preferably either $R^{11}$ or $R^{12}$ being a methyl group.

As the compound (Ia), the followings can be mentioned.

(a) Carbonic esters having one ether linkage per molecule:

Examples of carbonic esters having one ether linkage per molecule include (methyl)(methoxymethyl)carbonate, (methyl)(1-methoxyethyl)carbonate, (methyl)(2-methoxyethyl)carbonate, (methyl)(1-methoxypropyl)carbonate, (methyl)(2-methoxypropyl)carbonate, (methyl)(3-methoxypropyl)carbonate, (methyl)(1-methyl-1-methoxyethyl)carbonate, (methyl)(1-methyl-2-methoxyethyl)carbonate, (methyl)(1-methoxybutyl)carbonate, (methyl)(2-methoxybutyl)carbonate, (methyl)(3-methoxybutyl)carbonate, (methyl)(4-methoxybutyl)carbonate, (methyl)[1-(methoxymethyl)propyl]carbonate, (methyl)(1-methyl-2-methoxypropyl)carbonate, (methyl)(ethoxymethyl)carbonate, (methyl)(1-ethoxyethyl)carbonate, (methyl)(2-ethoxyethyl)carbonate, (methyl)(1-ethoxypropyl)carbonate, (methyl)(2-ethoxypropyl)carbonate, (methyl)(3-ethoxypropyl)carbonate, (methyl)(1-methyl-1-ethoxyethyl)carbonate, (methyl)(1-methyl-2-ethoxyethyl)carbonate, (methyl)(1-ethoxybutyl)carbonate, (methyl)(2-ethoxybutyl)carbonate, (methyl)(3-ethoxybutyl)carbonate, (methyl)(4-ethoxybutyl)carbonate, (methyl)[1-(ethoxymethyl)propyl]carbonate, (methyl)(1-methyl-2-ethoxypropyl)carbonate, (methyl)(butoxymethyl)carbonate, (methyl)(1-butoxyethyl)carbonate, (methyl)(2-butoxyethyl)carbonate, (methyl)(1-butoxypropyl)carbonate, (methyl)(2-butoxypropyl)carbonate, (methyl)(3-butoxypropyl)carbonate, (methyl)(1-methyl-1-butoxyethyl)carbonate, (methyl)(1-methyl-2-butoxyethyl)carbonate, (methyl)(1-butoxybutyl)carbonate, (methyl)(2-butoxybutyl)carbonate, (methyl)(3-butoxybutyl)carbonate, (methyl)(4-butoxybutyl)carbonate, (methyl)[1-(butoxymethyl)propyl]carbonate, (methyl)(1-methyl-2-butoxypropyl)carbonate, (methyl)(tetrahydrofurfuryl)carbonate, (methyl)(tetrahydropyranylmethyl)carbonate, (ethyl)(methoxymethyl)carbonate, (ethyl)(1-methoxyethyl)carbonate, (ethyl)(2-methoxyethyl)carbonate, (ethyl)(1-methoxypropyl)carbonate, (ethyl)(2-methoxypropyl)carbonate, (ethyl)(3-methoxypropyl)carbonate, (ethyl)(1-methyl-1-methoxyethyl)carbonate, (ethyl)(1-methyl-2-methoxyethyl)carbonate, (ethyl)(1-methoxybutyl)carbonate, (ethyl)(2-methoxybutyl)carbonate, (ethyl)(3-methoxybutyl)carbonate, (ethyl)(4-methoxybutyl)carbonate, (ethyl)[1-(methoxymethyl)propyl]carbonate, (ethyl)(1-methyl-2-methoxypropyl)carbonate, (ethyl)(ethoxymethyl)carbonate, (ethyl)(1-ethoxyethyl)carbonate, (ethyl)(2-ethoxyethyl)carbonate, (ethyl)(1-ethoxypropyl)carbonate, (ethyl)(2-ethoxypropyl)carbonate, (ethyl)(3-ethoxypropyl)carbonate, (ethyl)(1-methyl-1-ethoxyethyl)carbonate, (ethyl)(1-methyl-2-ethoxyethyl)carbonate, (ethyl)(1-ethoxybutyl)carbonate, (ethyl)(2-ethoxybutyl)carbonate, (ethyl)(3-ethoxybutyl)carbonate, (ethyl)(4-ethoxybutyl)carbonate, (ethyl)[1-(ethoxymethyl)propyl]carbonate, (ethyl)(1-methyl-2-ethoxypropyl)carbonate, (ethyl)(butoxymethyl)carbonate, (ethyl)(1-butoxyethyl)carbonate, (ethyl)(2-butoxyethyl)carbonate, (ethyl)(1-butoxypropyl)carbonate, (ethyl)(2-butoxypropyl)carbonate, (ethyl)(3-butoxypropyl)carbonate, (ethyl)(1-methyl-1-butoxyethyl)carbonate, (ethyl)(1-methyl-2-butoxyethyl)carbonate, (ethyl)(1-butoxybutyl)carbonate, (ethyl)(2-butoxybutyl)carbonate, (ethyl)(3-butoxybutyl)carbonate, (ethyl)(4-butoxybutyl)carbonate, (ethyl)[1-(butoxymethyl)propyl]carbonate, (ethyl)(1-methyl-2-butoxypropyl)carbonate, (ethyl)(tetrahydrofurfuryl)carbonate, (ethyl)(tetrahydropyranylmethyl)carbonate, (butyl))(methoxymethyl)carbonate, (butyl)(1-methoxyethyl)carbonate, (butyl)(2-methoxyethyl)carbonate, (butyl)(1-methoxypropyl)carbonate, (butyl)(2-methoxypropyl)carbonate, (butyl)(3-methoxypropyl)carbonate, (butyl)(1-methyl-1-methoxyethyl)carbonate, (butyl)(1-methyl-2-methoxyethyl)carbonate, (butyl)(1-methoxybutyl)carbonate, (butyl)(2-methoxybutyl)carbonate, (butyl)(3-methoxybutyl)carbonate, (butyl)(4-methoxybutyl)carbonate, (butyl)[1-(methoxymethyl)propyl]carbonate, (butyl)(1-methyl-2-methoxypropyl)carbonate, (butyl)(ethoxymethyl)carbonate, (butyl)(1-ethoxyethyl)carbonate, (butyl)(2-ethoxyethyl)carbonate, (butyl)(1-ethoxypropyl)carbonate, (butyl)(2-ethoxypropyl)carbonate, (butyl)(3-ethoxypropyl)carbonate, (butyl)(1-methyl-1-ethoxyethyl)carbonate, (butyl)(1-methyl-2-ethoxyethyl)carbonate, (butyl)(1-ethoxybutyl)carbonate, (butyl)(2-ethoxybutyl)carbonate, (butyl)(3-ethoxybutyl)carbonate, (butyl)(4-ethoxybutyl)carbonate, (butyl)[1-(ethoxymethyl)propyl]carbonate, (butyl)(1-methyl-2-ethoxypropyl)carbonate, (butyl)(butoxymethyl)carbonate, (butyl)(1-butoxyethyl)carbonate, (butyl)(2-butoxyethyl)carbonate, (butyl)(1-butoxypropyl)carbonate, (butyl)(2-butoxypropyl)carbonate, (butyl)(3-butoxypropyl)carbonate, (butyl)(1-methyl-1-butoxyethyl)carbonate, (butyl)(1-methyl-2-butoxyethyl)carbonate, (butyl)(1-butoxybutyl)carbonate, (butyl)(2-butoxybutyl)carbonate, (butyl)(3-butoxybutyl)carbonate, (butyl)(4-butoxybutyl)carbonate, (butyl)[1-(butoxymethyl)propyl]carbonate, (butyl)(1-methyl-2-butoxypropyl)carbonate, (butyl)(tetrahydrofurfuryl)carbonate, (butyl)(tetrahydropyranylmethyl)carbonate, (hexyl)(methoxymethyl)carbonate, (hexyl)(1-methoxyethyl)carbonate, (hexyl)(2-methoxyethyl)carbonate, (hexyl)(1-methoxypropyl)carbonate, (hexyl)(2-methoxypropyl)carbonate, (hexyl)(3-methoxypropyl)carbonate, (hexyl)(1-methyl-1-methoxyethyl)carbonate, (hexyl)(1-methyl-2-methoxyethyl)carbonate, (hexyl)(1-methoxybutyl)carbonate, (hexyl)(2-methoxybutyl)carbonate, (hexyl)(3-methoxybutyl)carbonate, (hexyl)(4-methoxybutyl)carbonate, (hexyl)[1-(methoxymethyl)propyl]carbonate, (hexyl)(1-methyl-2-methoxypropyl)carbonate, (hexyl)(ethoxymethyl)carbonate, (hexyl)(1-ethoxyethyl)carbonate, (hexyl)(2-ethoxyethyl)carbonate, (hexyl)(1-ethoxypropyl)carbonate, (hexyl)(2-ethoxypropyl)carbonate, (hexyl)(3-ethoxypropyl)carbonate, (hexyl)(1-methyl-1-ethoxyethyl)carbonate, (hexyl)(1-methyl-2-ethoxyethyl)carbonate, (hexyl)(1-ethoxybutyl)carbonate, (hexyl)(2-ethoxybutyl)carbonate, (hexyl)(3-ethoxybutyl)carbonate, (hexyl)(4-ethoxybutyl)carbonate, (hexyl)[1-(ethoxymethyl)propyl]carbonate, (hexyl)(1-methyl-2-ethoxypropyl)carbonate, (hexyl)(butoxymethyl)carbonate, (hexyl)(1-butoxyethyl)carbonate, (hexyl)(2-butoxyethyl)carbonate, (hexyl)(1-butoxypropyl)carbonate, (hexyl)(2-butoxypropyl)carbonate, (hexyl)(3-butoxypropyl)carbonate, (hexyl)(1-methyl-1-butoxyethyl)carbonate, (hexyl)(1-methyl-2-butoxyethyl)carbonate, (hexyl)(1-butoxybutyl)carbonate, (hexyl)(2-butoxybutyl)carbonate, (hexyl)(3-butoxybutyl)carbonate, (hexyl)(4-butoxybutyl)carbonate, (hexyl)[1-(butoxymethyl)propyl]carbonate, (hexyl)(1-methyl-2-butoxypropyl)carbonate, (hexyl)(tetrahydrofurfuryl)carbonate, and (hexyl)(tetrahydropyranylmethyl)carbonate.

Preferable among them are (methyl)(2-methoxyethyl)carbonate, (methyl)(3-methoxypropyl)carbonate, (methyl)(4-methoxybutyl)carbonate, (methyl)(2-ethoxyethyl)carbonate, (methyl)(3-ethoxypropyl)carbonate, (methyl)(4-ethoxybutyl)carbonate, (methyl)(2-butoxyethyl)carbonate, (methyl)(3-butoxypropyl)carbonate, (methyl)(4-butoxybutyl)carbonate, (methyl)(tetrahydrofurfuryl)carbonate, (methyl)(tetrahydropyranylmethyl)carbonate, (ethyl)(2-methoxyethyl)carbonate, (ethyl)(3-methoxypropyl)carbonate, (ethyl)(4-methoxybutyl)carbonate, (ethyl)(2-ethoxyethyl)carbonate, (ethyl)(3-ethoxypropyl)carbonate, (ethyl)(4-ethoxybutyl)carbonate, (ethyl)(2-butoxyethyl)carbonate, (ethyl)(3-butoxypropyl)carbonate, (ethyl)(4-butoxybutyl)carbonate, (ethyl)(tetrahydrofurfuryl)carbonate, and (ethyl)(tetrahydropyranylmethyl)carbonate.

Especially preferable among them are (methyl)(2-methoxyethyl)carbonate, (methyl)(3-methoxypropyl)carbonate, (methyl)(4-methoxybutyl)carbonate, (methyl)(2-ethoxyethyl)carbonate, (methyl)(3-ethoxypropyl)carbonate, (methyl)(4-ethoxybutyl)carbonate, (ethyl)(2-methoxyethyl)carbonate, (ethyl)(3-methoxypropyl)carbonate, (ethyl)(4-methoxybutyl)carbonate, (ethyl)(2-ethoxyethyl)carbonate, (ethyl)(3-ethoxypropyl)carbonate, and (ethyl)(4-ethoxybutyl)carbonate.

(b) Carbonic esters having two ether linkages per molecule:

Examples of carbonic esters having two ether linkages per molecule include bis(methoxymethyl)carbonate, bis(1-methoxyethyl)carbonate, bis(2-methoxyethyl)carbonate, bis(1-methoxypropyl)carbonate, bis(2-methoxypropyl)carbonate, bis(3-methoxypropyl)carbonate, bis(1-methyl-1-methoxyethyl)carbonate, bis(1-methyl-2-methoxyethyl)carbonate, bis(1-methoxybutyl)carbonate, bis(2-methoxybutyl)carbonate, bis(3-methoxybutyl)carbonate, bis(4-methoxybutyl)carbonate, bis[1-(methoxymethyl)propyl]carbonate, bis(1-methyl-2-methoxypropyl)carbonate, bis(ethoxymethyl)carbonate, bis(1-ethoxyethyl)carbonate, bis(2-ethoxyethyl)carbonate, bis(1-ethoxypropyl)carbonate, bis(2-ethoxypropyl)carbonate, bis(3-ethoxypropyl)carbonate, bis(1-methyl-1-ethoxyethyl)carbonate, bis(1-methyl-2-ethoxyethyl)carbonate, bis(1-ethoxybutyl)carbonate, bis(2-ethoxybutyl)carbonate, bis(3-ethoxybutyl)carbonate, bis(4-ethoxybutyl)carbonate, bis[1-(ethoxymethyl)propyl]carbonate, bis(1-methyl-2-ethoxypropyl)carbonate, bis(butoxymethyl)carbonate, bis(1-butoxyethyl)carbonate, bis(2-butoxyethyl)carbonate, bis(1-butoxypropyl)carbonate, bis(2-butoxypropyl)carbonate, bis(3-butoxypropyl)carbonate, bis(1-methyl-1-butoxyethyl)carbonate, bis(1-methyl-2-butoxyethyl)carbonate, bis(tetrahydrofurfuryl)carbonate, bis(tetrahydropyranylmethyl)carbonate, (methyl)[2-(2-methoxyethoxy)ethyl]carbonate, (methyl)[2-(2-ethoxyethoxy)ethyl]carbonate, (methyl)[2-(2-butoxyethoxy)ethyl]carbonate, (methyl)[2-(2-methoxyethoxy)propyl]carbonate, (methyl)[2-(2-ethoxyethoxy)propyl]carbonate, (methyl)[2-(2-butoxyethoxy)propyl]carbonate, (methyl)[3-(2-methoxyethoxy)propyl]carbonate, (methyl)[3-(2-ethoxyethoxy)propyl]carbonate, (methyl)[3-(2-butoxyethoxy)propyl]carbonate, (methyl)[4-(2-methoxyethoxy)butyl]carbonate, (methyl)[4-(2-ethoxyethoxy)butyl]carbonate, (methyl)[4-(2-butoxyethoxy)butyl]carbonate, (methyl)[2-(2-methoxybutoxy)ethyl]carbonate, (methyl)[2-(2-ethoxybutoxy)ethyl]carbonate, (methyl)[2-(2-butoxybutoxy)ethyl]carbonate, (methyl)[2-(2-methoxybutoxy)propyl]carbonate, (methyl)[2-(2-ethoxybutoxy)propyl]carbonate, (methyl)[2-(2-butoxybutoxy)propyl]carbonate, (methyl)[3-(2-methoxybutoxy)propyl]carbonate, (methyl)[3-(2-ethoxybutoxy)propyl]carbonate, (methyl)[3-(2-butoxybutoxy)propyl]carbonate, (methyl)[4-(2-methoxybutoxy)butyl]carbonate, (methyl)[4-(2-ethoxybutoxy)butyl]carbonate, (methyl)[4-(2-butoxybutoxy)butyl]carbonate, (ethyl)[2-(2-methoxyethoxy)ethyl]carbonate, (ethyl)[2-(2-ethoxyethoxy)ethyl]carbonate, (ethyl)[2-(2-butoxyethoxy)ethyl]carbonate, (ethyl)[2-(2-methoxyethoxy)propyl]carbonate, (ethyl)[2-(2-ethoxyethoxy)propyl]carbonate, (ethyl)[2-(2-butoxyethoxy)propyl]carbonate, (ethyl)[3-(2-methoxyethoxy)propyl]carbonate, (ethyl)[3-(2-ethoxyethoxy)propyl]carbonate, (ethyl)[3-(2-butoxyethoxy)propyl]carbonate, (ethyl)[4-(2-methoxyethoxy)butyl]carbonate, (ethyl)[4-(2-ethoxyethoxy)butyl]carbonate, (ethyl)[4-(2-butoxyethoxy)butyl]carbonate, (ethyl)[2-(2-methoxybutoxy)ethyl]carbonate, (ethyl)[2-(2-ethoxybutoxy)ethyl]carbonate, (ethyl)[2-(2-butoxybutoxy)ethyl]carbonate, (ethyl)[2-(2-methoxybutoxy)propyl]carbonate, (ethyl)[2-(2-ethoxybutoxy)propyl]carbonate, (ethyl)[2-(2-butoxybutoxy)propyl]carbonate, (ethyl)[3-(2-methoxybutoxy)propyl]carbonate, (ethyl)[3-(2-ethoxybutoxy)propyl]carbonate, (ethyl)[3-(2-butoxybutoxy)propyl]carbonate, (ethyl)[4-(2-methoxybutoxy)butyl]carbonate, (ethyl))[4-(2-ethoxybutoxy)butyl]carbonate, (ethyl)[4-(2-butoxybutoxy)butyl]carbonate, (butyl)[2-(2-methoxyethoxy)ethyl]carbonate, (butyl)[2-(2-ethoxyethoxy)ethyl]carbonate, (butyl)[2-(2-butoxyethoxy)ethyl]carbonate, (butyl)[2-(2-methoxyethoxy)propyl]carbonate, (butyl)[2-(2-ethoxyethoxy)propyl]carbonate, (butyl)[2-(2-butoxyethoxy)propyl]carbonate, (butyl)[3-(2-methoxyethoxy)propyl]carbonate, (butyl)[3-(2-ethoxyethoxy)propyl]carbonate, (butyl)[3-(2-butoxyethoxy)propyl]carbonate, (butyl)[4-(2-methoxyethoxy)butyl]carbonate, (butyl)[4-(2-ethoxyethoxy)butyl]carbonate, (butyl)[4-(2-butoxyethoxy)butyl]carbonate, (butyl)[2-(2-methoxybutoxy)ethyl]carbonate, (butyl)[2-(2-ethoxybutoxy)ethyl]carbonate, (butyl)[2-(2-butoxybutoxy)ethyl]carbonate, (butyl)[2-(2-methoxybutoxy)propyl]carbonate, (butyl)[2-(2-ethoxybutoxy)propyl]carbonate, (butyl)[3-(2-methoxybutoxy)propyl]carbonate, (butyl)[3-(2-ethoxybutoxy)propyl]carbonate, (hexyl)[2-(2-methoxyethoxy)ethyl]carbonate, (hexyl)[2-(2-ethoxyethoxy)ethyl]carbonate, (hexyl)[2-(2-butoxyethoxy)ethyl]carbonate, (hexyl)[2-(2-methoxyethoxy)propyl]carbonate, (hexyl)[2-(2-ethoxyethoxy)propyl]carbonate, (hexyl)[3-(2-methoxyethoxy)propyl]carbonate, (hexyl)[3-(2-ethoxyethoxy)propyl]carbonate, (hexyl)[4-(2-methoxyethoxy)butyl]carbonate, (hexyl)[4-(2-ethoxyethoxy)butyl]carbonate, (hexyl)[2-(2-methoxybutoxy)ethyl]carbonate, (hexyl)[2-(2-ethoxybutoxy)ethyl]carbonate, (hexyl)[2-(2-methoxybutoxy)propyl]carbonate, and (hexyl)[3-(2-methoxybutoxy)propyl]carbonate.

Preferable among them are bis(2-methoxyethyl)carbonate, bis(3-methoxypropyl)carbonate, bis(4-methoxybutyl)carbonate, bis(2-ethoxyethyl)carbonate, bis(3-ethoxypropyl)carbonate, bis(4-ethoxybutyl)carbonate, bis(2-butoxyethyl)carbonate, bis(3-butoxypropyl)carbonate, bis(4-butoxybutyl)carbonate, bis(tetrahydrofurfuryl)carbonate, (methyl)[2-(2-methoxyethoxy)ethyl]carbonate, (methyl)[2-(2-ethoxyethoxy)ethyl]carbonate, (methyl)[2-(2-butoxyethoxy)ethyl]carbonate, (ethyl)[2-(2-methoxyethoxy)ethyl]carbonate, (ethyl)[2-(2-ethoxyethoxy)ethyl]carbonate, and (ethyl)[2-(2-butoxyethoxy)ethyl]carbonate.

Especially preferable among them are bis(2-methoxyethyl)carbonate, bis(3-methoxypropyl)carbonate, bis(4-methoxybutyl)carbonate, bis(2-ethoxyethyl)carbonate, bis(3-ethoxypropyl)carbonate, bis(4-ethoxybutyl)carbonate, (methyl)[2-(2-methoxyethoxy)ethyl]carbonate, (methyl)[2-(2-ethoxyethoxy)ethyl]carbonate, (ethyl)[2-(2-methoxyethoxy)ethyl]carbonate, and (ethyl)[2-(2-ethoxyethoxy)ethyl]carbonate.

(c) Carbonic esters having three ether linkages per molecule:

Examples of carbonic esters having three ether linkages per molecule include (methyl)[2-(2-(2-methoxyethoxy)ethoxy)ethyl]carbonate, (methyl)[2-(2-(2-ethoxyethoxy)ethoxy)ethyl]carbonate, (methyl)[2-(2-(2-butoxyethoxy)ethoxy)ethyl]carbonate, (ethyl)[2-(2-(2-methoxyethoxy)ethoxy)ethyl]carbonate, (ethyl)[2-(2-(2-ethoxyethoxy)ethoxy)ethyl]carbonate, (ethyl)[2-(2-(2-butoxyethoxy)ethoxy)ethyl]carbonate, (hexyl)[2-(2-(2-methoxyethoxy)ethoxy)ethyl]carbonate, (hexyl)[2-(2-(2-ethoxyethoxy)ethoxy)ethyl]carbonate, (2-methoxyethyl)[2-(2-methoxyethoxy)ethyl]carbonate, (2-methoxyethyl)[2-(2-ethoxyethoxy)ethyl]carbonate, (2-methoxyethyl)[2-(2-butoxyethoxy)ethyl]carbonate, (2-methoxyethyl)[2-(2-methoxyethoxy)propyl]carbonate, (2-methoxyethyl)[2-(2-ethoxyethoxy)propyl]carbonate, (2-methoxyethyl)[2-(2-butoxyethoxy)propyl]carbonate, (2-methoxyethyl)[3-(2-methoxyethoxy)propyl]carbonate, (2-methoxyethyl)[3-(2-ethoxyethoxy)propyl]carbonate, (2-methoxyethyl)[3-(2-butoxyethoxy)propyl]carbonate, (2-methoxyethyl)[4-(2-methoxyethoxy)butyl]carbonate, (2-methoxyethyl)[4-(2-ethoxyethoxy)butyl]carbonate, (2-methoxyethyl)[4-(2-butoxyethoxy)butyl]carbonate, (2-methoxyethyl)[2-(2-methoxybutoxy)ethyl]carbonate, (2-methoxyethyl)[2-(2-ethoxybutoxy)ethyl]carbonate, (2-methoxyethyl)[2-(2-butoxybutoxy)ethyl]carbonate, (2-methoxyethyl)[2-(2-methoxybutoxy)propyl]carbonate, (2-methoxyethyl)[2-(2-ethoxybutoxy)propyl]carbonate, (2-methoxyethyl)[2-(2-butoxybutoxy)propyl]carbonate, (2-methoxyethyl)[3-(2-methoxybutoxy)propyl]carbonate, (2-methoxyethyl)[3-(2-ethoxybutoxy)propyl]carbonate, (2-methoxyethyl)[3-(2-butoxybutoxy)propyl]carbonate, (2-methoxyethyl)[4-(2-methoxybutoxy)butyl]carbonate, (2-methoxyethyl)[4-(2-ethoxybutoxy)butyl]carbonate, (2-methoxyethyl)[4-(2-butoxybutoxy)butyl]carbonate, (2-ethoxyethyl)[2-(2-methoxyethoxy)ethyl]carbonate, (2-ethoxyethyl)[2-(2-ethoxyethoxy)ethyl]carbonate, (2-ethoxyethyl)[2-(2-butoxyethoxy)ethyl]carbonate, (2-ethoxyethyl)[2-(2-methoxyethoxy)propyl]carbonate, (2-ethoxyethyl)[2-(2-ethoxyethoxy)propyl]carbonate, (2-ethoxyethyl)[2-(2-butoxyethoxy)propyl]carbonate, (2-ethoxyethyl)[3-(2-methoxyethoxy)propyl]carbonate, (2-ethoxyethyl)[3-(2-ethoxyethoxy)propyl]carbonate, (2-ethoxyethyl)[3-(2-butoxyethoxy)propyl]carbonate, (2-ethoxyethyl)[4-(2-methoxyethoxy)butyl]carbonate, (2-ethoxyethyl)[4-(2-ethoxyethoxy)butyl]carbonate, (2-ethoxyethyl)[4-(2-butoxyethoxy)butyl]carbonate, (2-ethoxyethyl)[2-(2-methoxybutoxy)ethyl]carbonate, (2-ethoxyethyl)[2-(2-ethoxybutoxy)ethyl]carbonate, (2-ethoxyethyl)[2-(2-butoxybutoxy)ethyl]carbonate, (2-ethoxyethyl)[2-(2-methoxybutoxy)propyl]carbonate, (2-ethoxyethyl)[2-(2-ethoxybutoxy)propyl]carbonate, (2-ethoxyethyl)[3-(2-methoxybutoxy)propyl]carbonate, (2-ethoxyethyl)[3-(2-ethoxybutoxy)propyl]carbonate, (2-ethoxyethyl)[4-(2-methoxybutoxy)butyl]carbonate, (2-ethoxyethyl)[4-(2-ethoxybutoxy)butyl]carbonate, and (tetrahydrofurfuryl)[2-(2-methoxyethoxy)ethyl]carbonate.

Preferable among them are (methyl)[2-(2-(2-methoxyethoxy)ethoxy)ethyl]carbonate, (methyl)[2-(2-(2-ethoxyethoxy)ethoxy)ethyl]carbonate, (ethyl)[2-(2-(2-methoxyethoxy)ethoxy)ethyl]carbonate, (ethyl)[2-(2-(2-ethoxyethoxy)ethoxy)ethyl]carbonate, (2-methoxyethyl)[2-(2-(2-methoxyethoxy)ethyl]carbonate, (2-methoxyethyl)[2-(2-ethoxyethoxy)ethyl]carbonate, (2-methoxyethyl)[2-(2-butoxyethoxy)ethyl]carbonate, (2-ethoxyethyl)[2-(2-methoxyethoxy)ethyl]carbonate, (2-ethoxyethyl)[2-(2-ethoxyethoxy)ethyl]carbonate, and (tetrahydrofurfuryl)[2-(2-methoxyethoxy)ethyl]carbonate.

Especially preferable among them are, (methyl)[2-(2-(2-methoxyethoxy)ethoxy)ethyl]carbonate, (methyl)[2-(2-(2-ethoxyethoxy)ethoxy)ethyl]carbonate, (ethyl)[2-(2-(2-methoxyethoxy)ethoxy)ethyl]carbonate, (ethyl)[2-(2-(2-ethoxyethoxy)ethoxy)ethyl]carbonate, (2-methoxyethyl)[2-(2-methoxyethoxy)ethyl]carbonate, (2-methoxyethyl)[2-(2-ethoxyethoxy)ethyl]carbonate, (2-ethoxyethyl)[2-(2-methoxyethoxy)ethyl]carbonate, and (2-ethoxyethyl)[2-(2-ethoxyethoxy)ethyl]carbonate.

(d) Carbonic esters having four ether linkages per molecule:

Examples of carbonic esters having four ether linkages per molecule include bis[2-(2-methoxyethoxy)ethyl]carbonate, bis[2-(2-ethoxyethoxy)ethyl]carbonate, bis[2-(2-propoxyethoxy)ethyl]carbonate, (2-methoxyethyl)[2-(2-(2-methoxyethoxy)ethoxy)ethyl]carbonate, (2-ethoxyethyl)[2-(2-(2-methoxyethoxy)ethoxy)ethyl]carbonate, (2-butoxyethyl)[2-(2-(2-methoxyethoxy)ethoxy)ethyl]carbonate, (2-methoxyethyl)[2-(2-(2-ethoxyethoxy)ethoxy)ethyl]carbonate, (2-methoxyethyl)[2-(2-(2-butoxyethoxy)ethoxy)ethyl]carbonate, (2-ethoxyethyl)[2-(2-(2-butoxyethoxy)ethoxy)ethyl]carbonate, (2-butoxyethyl)[2-(2-(2-ethoxyethoxy)ethoxy)ethyl]carbonate, (methyl)[2-(2-(2-methoxyethoxy)ethoxy)ethoxy)ethyl]carbonate, (ethyl)[2-(2-(2-(2-methoxyethoxy)ethoxy)ethoxy)ethyl]carbonate, (butyl)[2-(2-(2-(2-methoxyethoxy)ethoxy)ethoxy)ethyl]carbonate, (butyl)[2-(2-(2-(2-ethoxyethoxy)ethoxy)ethoxy)ethyl]carbonate, (methyl)[2-(2-(2-(2-ethoxyethoxy)ethoxy)ethoxy)ethyl]carbonate, (methyl)[2-(2-(2-(2-butoxyethoxy)ethoxy)ethoxy)ethyl]carbonate, and (ethyl)[2-(2-(2-(2-butoxyethoxy)ethoxy)ethoxy)ethyl]carbonate.

Preferable among them are bis[2-(2-methoxyethoxy)ethyl]carbonate and (2-methoxyethyl)[2-(2-(2-methoxyethoxy)ethoxy)ethyl]carbonate.

(e) Carbonic esters having five ether linkages per molecule:

Examples of carbonic esters having five ether linkages per molecule include (methyl)[2-(2-(2-(2-(2-methoxyethoxy)ethoxy)ethoxy)ethoxy)ethyl]carbonate, (methyl)[2-(2-(2-(2-(2-ethoxyethoxy)ethoxy)ethoxy)ethoxy)ethyl]carbonate, (ethyl)[2-(2-(2-(2-(2-methoxyethoxy)ethoxy)ethoxy)ethoxy)ethyl]carbonate, (ethyl)[2-(2-(2-(2-(2-ethoxyethoxy)ethoxy)ethoxy)ethoxy)ethyl]carbonate, (2-methoxyethyl)[2-(2-(2-methoxyethoxy)ethoxy)ethoxy)ethyl]carbonate, (2-methoxyethyl)[2-(2-(2-(2-ethoxyethoxy)ethoxy)ethoxy)ethyl]carbonate, (2-ethoxyethyl)[2-(2-(2-ethoxyethoxy)ethoxy)ethoxy)ethyl]carbonate, [2-(2-methoxyethoxy)ethyl][2-(2-(2-methoxyethoxy)ethoxy)ethyl]carbonate, [2-(2- ethoxyethoxy)ethyl][2-(2-(2-methoxyethoxy)ethoxy)ethyl] carbonate, [2-(2-methoxyethoxy)ethyl][2-(2-(2-ethoxyethoxy)ethoxy)ethyl]carbonate, and [2-(2-ethoxyethoxy)ethyl][2-(2-(2-ethoxyethoxy)ethoxy)ethyl] carbonate.

(f) Carbonic esters having six ether linkages per molecule:

Examples of carbonic esters having six ether linkages per molecule include bis[2-(2-(2-methoxyethoxy)ethoxy)ethyl] carbonate, bis[2-(2-(2-ethoxyethoxy)ethoxy)ethyl]carbonate, and bis[2-(2-(2-propoxyethoxy)ethoxy)ethyl]carbonate.

These compounds (Ia) may be used either any one singly or in combination of any two or more at an arbitrary ratio.

The proportion of the compound (Ia) with respect to the non-aqueous electrolyte solution (Ia) is usually 0.01 weight % or higher, preferably 0.1 weight % or higher, especially preferably 0.3 weight % or higher, and usually 5 weight % or lower, preferably 4 weight % or lower, especially preferably 3 weight % or lower. If the proportion is too small, cycle characteristics at low temperature cannot be improved. On the other hand, if the proportion is too large, it is not preferable because battery characteristics after high-temperature storage tend to deteriorate. When two or more compounds (Ia) are combinedly used, the total proportion of the compounds (Ia) is required to satisfy the above range.

In the non-aqueous electrolyte solution (Ia), weight ratio between the unsaturated cyclic carbonate compound and the compound (Ia) (the weight of the unsaturated cyclic carbonate compound:the weight of the compound (Ia)) is within the range of usually 1:0.01 or higher, preferably 1:0.1 or higher, and usually 1:50 or lower, preferably 1:10 or lower. If the ratio of the compound (Ia) is too high, battery characteristics after high-temperature storage tend to deteriorate, while if the ratio is too low, cycle characteristics at low temperature cannot be improved. When two or more unsaturated cyclic carbonate compounds and/or two or more compounds (Ia) are combinedly used, the total proportion of the unsaturated cyclic carbonate compounds and/or the compounds (Ia) is required to satisfy the above range.

It is not clear why the non-aqueous electrolyte solution (Ia) containing the unsaturated cyclic carbonate compound and the compound (Ia) can improve cycle characteristics at low temperature, although the probable reason is presumed as follows.

Basically, an unsaturated cyclic carbonate compound such as vinylene carbonate is reduced during initial charging and forms stable coating on the negative electrode surface to thereby improve cycle characteristics at room temperature. However, since lithium ion permeability of the coating formed on the negative electrode surface fluctuates widely depending on temperature, the lithium ion permeability at low temperature decreases drastically to bring about decrease in cycle characteristics at low temperature.

On the contrast, when the electrolyte solution contains the compound (Ia), complex coating originating in the unsaturated cyclic carbonate compound and the compound (Ia) is formed on the negative electrode surface. Since the complex coating is excellent in lithium ion permeability even at low temperature, it is possible to keep excellent cycle characteristics at room temperature while achieving excellent cycle characteristics even at low temperature.

<Compound (Ib)>
The compound (Ib) is a compound expressed by the following general formula (Ib).

[Chemical Formula 10]

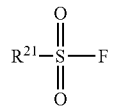

In the general formula (Ib), $R^{21}$ represents an alkyl group having 1-12 carbon atoms or an alkenyl group having 2-12 carbon atoms. Between these, the alkyl group is preferable.

Examples of the alkyl group are the ones whose number of carbon atoms is between 1-12, preferably 1-8, especially preferably 1-3, including methyl group, ethyl group, n-propyl group, i-propyl group, n-butyl group, i-butyl group, sec-butyl group, tert-butyl group, pentyl group, cyclopentyl group, and cyclohexyl group. The alkyl group may be either chain or cyclic, between which the chain form is preferred.

Examples of the alkenyl group are the ones whose number of carbon atoms is between 2-12, preferably between 2-8, especially preferably between 2-4, including vinyl group and propenyl group. The alkenyl group may be either chain or cyclic, between which the chain form is preferred.

These alkyl groups and alkenyl groups may have one or more fluorine atoms that substitute for a part or all of the hydrogen atoms, and may also have one or more ether linkages within their chains.

The molecular weight of the compound (Ib) is usually 98 or larger and usually 650 or smaller, preferably 350 or smaller, more preferably 250 or smaller. If the molecular weight is too large, solubility to the electrolyte solution may decline significantly.

Examples of the compound (Ib) are methane sulfonyl fluoride, ethane sulfonyl fluoride, propane sulfonyl fluoride, 2-propane sulfonyl fluoride, butane sulfonyl fluoride, 2-butane sulfonyl fluoride, hexane sulfonyl fluoride, octane sulfonyl fluoride, decane sulfonyl fluoride, dodecane sulfonyl fluoride, cyclohexane sulfonyl fluoride, trifluoromethane sulfonyl fluoride, perfluoroethane sulfonyl fluoride, perfluoropropane sulfonyl fluoride, perfluoro butane sulfonyl fluoride, ethene sulfonyl fluoride, 1-propene-1-sulfonyl fluoride, 2-propene-1-sulfonyl fluoride, 2-methoxy-ethane sulfonyl fluoride, and 2-ethoxy-ethane sulfonyl fluoride.

Preferable among them are methane sulfonyl fluoride, ethane sulfonyl fluoride, propane sulfonyl fluoride, 2-propane sulfonyl fluoride, butane sulfonyl fluoride, and 2-butane sulfonyl fluoride, especially preferable being methane sulfonyl fluoride, ethane sulfonyl fluoride, and propane sulfonyl fluoride.

These compounds (Ib) may be used either any one singly or in combination of any two or more at an arbitrary ratio.

The proportion of the compound (Ib) with respect to the non-aqueous electrolyte solution (Ib) is usually 0.001 weight % or higher, preferably 0.05 weight % or higher, more preferably 0.1 weight % or higher. If the concentration of the compound (Ib) is too low, scarcely any effect can appear. However, on the other hand, if the concentration of the compound (Ib) is too high, storage characteristics of the battery tends to decline. The upper limit is 5 weight % or lower, preferably 3 weight % or lower, more preferably 1 weight % or lower. When two or more compounds (Ib) are combinedly used, the total proportion of the compounds (Ib) is required to satisfy the aforementioned range.

In the non-aqueous electrolyte solution (Ib), the weight ratio of the compound (Ib) to the unsaturated cyclic carbonate compound (the weight of the compound (Ib):the weight of the unsaturated cyclic carbonate compound) is usually 1:1 or higher, preferably 1:2 or higher, and usually 1:50 or lower, preferably 1:25 or lower. If the ratio of the compound (Ib) is too high, battery characteristics after high-temperature storage tends to decline, while if the ratio is too low, gas generation during continuous charging cannot be inhibited. When two or more unsaturated cyclic carbonate compounds and/or two or more compounds (Ib) are combinedly used, the total proportion of the unsaturated cyclic carbonate compounds and/or the compounds (Ib) is required to satisfy the aforementioned range.

It is not clear why the non-aqueous electrolyte solution (Ib) containing both the unsaturated cyclic carbonate compound and the compound (Ib) enables the resultant battery to keep high cycle characteristics while improving continuous charging characteristics and storage characteristics under high temperature and high voltage condition, although the probable reason is as follows.

During initial charging, complex coating is formed on the negative electrode surface from the unsaturated cyclic carbonate compound and the compound (Ib), and on the positive electrode surface from the compound (Ib), in combination with other electrolyte solution components. The complex coating is excellent in lithium ion permeability and stable even at high temperature: supposedly the coating prevents the contact between the electrodes with high activity and the electrolyte solution even in the state of continuous charging or in the state of relatively high temperature to suppress side reactions that may occur inside the battery, thereby continuous charging characteristics and storage characteristics at high temperature being improved.

Also, since the unsaturated cyclic carbonate compound is prone to react with the positive electrode material in the state of charging, there is a problem that when the electrolyte solution contains the unsaturated cyclic carbonate compound, the amount of gas generation during continuous charging increases. However, it is assumed that when it is used in combination with the compound (Ib), the coating formed on the positive electrode surface prevents the contact between the unsaturated cyclic carbonate compound and the positive electrode to inhibit the amount of gas generation from increasing, whereby compatibility of cycle characteristics with battery characteristics at high temperature is realized.

<Compound (Ic)>

The compound (Ic) is a compound expressed by the following general formula (Ic).

[Chemical Formula 11]

$$CF_nH_{(3-n)}CH_2X^3 \quad (Ic)$$

(in the formula (Ic), n represents an integer of between 1-3, and $X^3$ represents a group selected from the groups expressed by the following formulae (Ic-1)-(Ic-4).

[Chemical Formula 12]

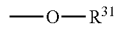
(Ic-1)

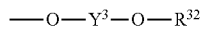
(Ic-2)

-continued

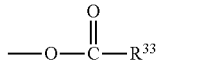
(Ic-3)

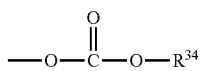
(Ic-4)

in the formulae (Ic-1)-(Ic-4), $R^{31}$-$R^{34}$ represent, independently of each other, an alkyl group having 1-20 carbon atoms that may be substituted by a halogen atom, $Y^3$ represents a divalent hydrocarbon group having 1-10 carbon atoms that may be substituted by a halogen atom.)

In the formulae, $R^{31}$-$R^{34}$ each represent a straight-chain, branched-chain or cyclic alkyl group having 1-20 carbon atoms that may be substituted by a halogen atom. The number of carbon atoms is within the range of usually 1 or more, preferably 2 or more, and usually 20 or less, preferably 10 or less, more preferably 6 or less.

Examples of $R^{31}$-$R^{34}$ are methyl group, ethyl group, n-propyl group, i-propyl group, n-butyl group, i-butyl group, sec-butyl group, tert-butyl group, pentyl group, cyclopentyl group, hexyl group, cyclohexyl group, octyl group, decyl group, and dodecyl group.

$R^{31}$-$R^{34}$ may be substituted by a halogen atom. The halogen atom is not particularly limited in its kind, although it is preferable in terms of electrochemical stability to be a fluorine atom or a chlorine atom, especially preferably a fluorine atom. The number of substituent halogen atoms is not particularly limited, although being usually 20 or less, preferably 12 or less.

Examples of alkyl groups substituted by halogen atoms are:

fluoromethyl group, difluoromethyl group, trifluoromethyl group;

1-fluoroethyl group, 2-fluoroethyl group, 1,1-difluoroethyl group, 1,2-difluoroethyl group, 2,2-difluoroethyl group, 1,1,2-trifluoroethyl group, 1,2,2-trifluoroethyl group, 2,2,2-trifluoroethyl group, 1,1,2,2-tetrafluoroethyl group, 1,2,2,2-tetrafluoroethyl group, pentafluoroethyl group;

1-fluoropropyl group, 2-fluoropropyl group, 3-fluoropropyl group, 1,1-difluoropropyl group, 1,2-difluoropropyl group, 1,3-difluoropropyl group, 2,2-difluoropropyl group, 2,3-difluoropropyl group, 3,3-difluoropropyl group, 1,1,2-trifluoropropyl group, 1,1,3-trifluoropropyl group, 1,2,2-trifluoropropyl group, 1,2,3-trifluoropropyl group, 1,3,3-trifluoropropyl group, 2,2,2-trifluoropropyl group, 2,2,3-trifluoropropyl group, 2,3,3-trifluoropropyl group, 3,3,3-trifluoropropyl group, 1,1,2,2-tetrafluoropropyl group, 1,1,2,3-tetrafluoropropyl group, 1,1,3,3-tetrafluoropropyl group, 1,2,2,3-tetrafluoropropyl group, 1,2,3,3-tetrafluoropropyl group, 1,3,3,3-tetrafluoropropyl group, 2,3,3,3-tetrafluoropropyl group, 1,1,2,2,3-pentafluoropropyl group, 1,1,2,3,3-pentafluoropropyl group, 1,1,3,3,3-pentafluoropropyl group, 1,2,2,3,3-pentafluoropropyl group, 1,2,3,3,3-pentafluoropropyl group, 2,2,3,3,3-pentafluoropropyl group, 1,1,2,2,3,3-hexafluoropropyl group, 1,1,2,3,3,3-hexafluoropropyl group, 1,2,2,3,3,3-hexafluoropropyl group, heptafluoropropyl group;

1-fluoro butyl group, 2-fluoro butyl group, 3-fluoro butyl group, 4-fluoro butyl group, 1,1-difluoro butyl group, 1,2-difluoro butyl group, 1,3-difluoro butyl group, 1,4-difluoro butyl group, 2,2-difluoro butyl group, 2,3-difluoro butyl group, 2,4-difluoro butyl group, 3,3-difluoro butyl group, 3,4-difluoro butyl group, 4,4-difluoro butyl group, 1,1,2-trifluoro butyl group, 1,1,3-trifluoro butyl group, 1,1,4-trifluoro butyl group, 1,2,2-trifluoro butyl group, 1,2,3-trifluoro butyl group, 1,2,4-trifluoro butyl group, 1,3,3-trifluoro butyl group, 1,3,4-trifluoro butyl group, 1,4,4-trifluoro butyl group, 2,2,3-trifluoro butyl group, 2,2,4-trifluoro butyl group, 2,3,3-trifluoro butyl group, 2,3,4-trifluoro butyl group, 2,4,4-trifluoro butyl group, 3,3,4-trifluoro butyl group, 3,4,4-trifluoro butyl group, 4,4,4-trifluoro butyl group;

1-fluoropentyl group, 2-fluoropentyl group, 3-fluoropentyl group, 4-fluoropentyl group, 5-fluoropentyl group, 1,1-difluoropentyl group, 1,2-difluoropentyl group, 1,3-difluoropentyl group, 1,4-difluoropentyl group, 1,5-difluoropentyl group, 2,2-difluoropentyl group, 2,3-difluoropentyl group, 2,4-difluoropentyl group, 2,5-difluoropentyl group, 3,3-difluoropentyl group, 3,4-difluoropentyl group, 3,5-difluoropentyl group, 4,4-difluoropentyl group, 4,5-difluoropentyl group, 5,5-difluoropentyl group, 1,1,2-trifluoropentyl group, 1,1,3-trifluoropentyl group, 1,1,4-trifluoropentyl group, 1,1,5-trifluoropentyl group, 1,2,2-trifluoropentyl group, 1,2,3-trifluoropentyl group, 1,2,4-trifluoropentyl group, 1,2,5-trifluoropentyl group, 1,3,3-trifluoropentyl group, 1,3,4-trifluoropentyl group, 1,3,5-trifluoropentyl group, 1,4,4-trifluoropentyl group, 1,4,5-trifluoropentyl group, 1,5,5-trifluoropentyl group, 2,2,2-trifluoropentyl group, 2,2,3-trifluoropentyl group, 2,2,4-trifluoropentyl group, 2,2,5-trifluoropentyl group, 2,3,3-trifluoropentyl group, 2,3,4-trifluoropentyl group, 2,3,5-trifluoropentyl group, 2,4,4-trifluoropentyl group, 2,4,5-trifluoropentyl group, 2,5,5-trifluoropentyl group, 3,3,3-trifluoropentyl group, 3,3,4-trifluoropentyl group, 3,3,5-trifluoropentyl group, 3,4,4-trifluoropentyl group, 3,4,5-trifluoropentyl group, 3,5,5-trifluoropentyl group, 4,4,4-trifluoropentyl group, 4,4,5-trifluoropentyl group, 4,5,5-trifluoropentyl group, 5,5,5-trifluoropentyl group;

1-fluorohexyl group, 1,1-difluorohexyl group, and 1,1,2-trifluorohexyl group.

It is particularly preferable that $R^{31}$-$R^{34}$ in the formulae (Ic-1)-(Ic-4) each are an alkyl group having 1-20 carbon atoms substituted by 1-3 fluorine atoms. Specifically, the compound (Ic) is preferable to have fluorine atoms at its both ends.

$Y^3$ in the formula (Ic-2) represents a divalent hydrocarbon group having 1-10 carbon atoms that may be substituted by a halogen atom. The number of carbon atoms is within the range of usually 1 or more, preferably 2 or more, and usually 6 or less, preferably 4 or less. Its examples include divalent hydrocarbon groups such as alkylene groups and arylene groups, which are obtained by removing two hydrogen atoms from alkanes, such as methane, ethane, propane, n-butane, isobutane, n-pentane, isopentane, and neopentane, and aromatic hydrocarbons, such as benzene, toluene, and xylene. Preferable are alkylene groups.

These hydrocarbon groups may be substituted further with a halogen atom. The halogen atom is not particularly limited in its kind, although in terms of electrochemical stability it is preferable to be a fluorine atom or a chlorine atom, between which a fluorine atom is preferred. The number of substituent halogen atoms is not particularly limited, although being usually 20 or less, preferably 12 or less.

The molecular weight of the compound (Ic) is usually 70 or greater, preferably 90 or greater, and usually 1000 or smaller, preferably 500 or smaller. The molecular weight equaling or exceeding the aforementioned lower limit is indispensable in order to satisfy the structure of the general formula (Ic). On the other hand, if it exceeds the upper limit, the compound molecules may not cluster densely when coating is formed on the negative electrode surface and that anticipated characteristics therefore may not be obtained.

Examples of the compound (Ic) are mentioned below, although the compound is not limited in its kind to the following examples but may be any compound unless it runs counter to the gist of the present invention.

Compounds in which $X^3$ is expressed by general formula (Ic-1) (monoether compounds):

  (1)

  (2)

  (3)

  (4)

  (5)

  (6)

Compounds in which $X^3$ is expressed by general formula (Ic-2) (diether compounds):

  (7)

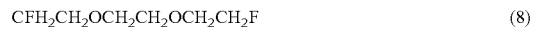  (8)

  (9)

  (10)

  (11)

  (12)

Compounds in which $X^3$ is expressed by general formula (Ic-3) (ester compounds):

  (13)

  (14)

  (15)

  (16)

  (17)

  (18)

Compounds in which $X^3$ is expressed by general formula (Ic-4) (carbonate compounds):

  (19)

  (20)

  (21)

  (22)

  (23)

  (24)

In the non-aqueous electrolyte solution (Ic), the compound (Ic) may be used either any one singly or in combination of any two or more in any proportion.

The concentration of the compound (Ic) in the non-aqueous electrolyte solution (Ic) is within the range of usually 0.01 weight % or higher, preferably 0.05 weight % or higher, especially preferably 0.1 weight % or higher, and usually 5 weight % or lower, preferably 4 weight % or lower, more preferably 3 weight % or lower, especially preferably 2 weight % or lower. If the content of the compound (Ic) is too low, inhibitory effect of degradation under high voltage may not appear to an adequate degree. On the other hand, if the proportion is too high, characteristics such as large-current characteristics of the battery may tend to decline. When two or more compounds (Ic) are combinedly used, the total proportion of the compounds (Ic) is required to meet the aforementioned range.

In the non-aqueous electrolyte solution (Ic) the weight ratio between the unsaturated cyclic carbonate compound and the compound (Ic) (the weight of the unsaturated cyclic carbonate compound/the weight of the compound (Ic)) is within the range of usually 0.001 or higher, preferably 0.01 or higher, especially preferably 0.05 or higher, and usually 1000 or lower, preferably 100 or lower. If the ratio of the compound (Ic) is too high, battery characteristics after high-temperature storage tend to decline. If the ratio is too low, gas generation during continuous charging cannot be suppressed. When two or more unsaturated cyclic carbonate compounds and/or two or more compounds (Ic) are combinedly used, the total proportion of the unsaturated cyclic carbonate compounds and/or the compounds (Ic) is required to meet the aforementioned range.

It is not clear why the use of the non-aqueous electrolyte solution (Ic) containing both the unsaturated cyclic carbonate compound and the compound (Ic) in a secondary battery, especially in a lithium secondary battery, can inhibit degradation when used high voltage, although supposedly the reason is as follows.

In the non-aqueous electrolyte solution (Ic), the unsaturated cyclic carbonate compound forms good coating on the negative electrode. However, since the unsaturated cyclic carbonate compound is vulnerable to oxidation, the battery may be adversely affected in its characteristics when used under high voltage. On the other hand, the fluorine-containing compound also forms coating, although it produces an excessive amount of coating under high voltage to bring about deterioration in battery characteristics. Thus, the unsaturated cyclic carbonate compound and the fluorine-containing compound have their respective advantages and drawbacks. However, when the unsaturated cyclic carbonate compound is used in combination with the compound (Ic) being a fluorine-containing compound, it is supposed that the coating formed by the compound (Ic) inhibits the unsaturated cyclic carbonate compound from being oxidized while the coating formed by the unsaturated cyclic carbonate compound inhibits compound (Ic) from decomposed. According to the present invention, since the unsaturated cyclic carbonate compound is used in combination with the compound (Ic) being a fluorine-containing compound in combination, these compounds can thus act complementarily to each other to thereby produce tolerance for use under high voltage.

In view of achieving the aforementioned effects, if the concentration of the compound (Ic) in the non-aqueous electrolyte solution (Ic) is too low, coating may not be formed adequately to produce the effects. On the other hand, if the concentration is too high, the coating may be formed excessively and denatured, exerting a detrimental effect on battery characteristics. The same is applied to the concentration of the unsaturated cyclic carbonate compound in the non-aqueous electrolyte solution (Ic): if the concentration is too high, an excessive amount of negative electrode coating may be formed to impede the travel of lithium ions, while if the concentration is too low, only an inadequate amount of negative electrode coating may be formed to cause degradation. For this reason, the concentration range defined in the present invention is considered to be most favorable.

<Others>

When the non-aqueous electrolyte solution (I) contains two or more of the compound (Ia), the compound (Ib), and the compound (Ic), the total concentration of compounds (I) with respect to the non-aqueous electrolyte solution (I) is within the range of usually 0.01 weight % or higher, preferably 0.05 weight % or higher, especially preferably 0.1 weight % or higher, and usually 5 weight % or lower, preferably 4 weight % or lower, more preferably 3 weight % or lower. If the content of the compounds (I) is too low, inhibitory effect of degradation under high voltage may not appear to an adequate extent. On the other hand, if the proportion is too high, characteristics such as large-current characteristics of the battery tend to decline.

When the non-aqueous electrolyte solution (I) contains two or more of the compound (Ia), the compound (Ib), and the compound (Ic), the weight ratio between the unsaturated cyclic carbonate compound and the total of the compounds (I) in the non-aqueous electrolyte solution (I) (the weight of the unsaturated cyclic carbonate compound/the total weight of the compounds (I)) is within the range of usually 0.001 or higher, preferably 0.01 or higher, especially preferably 0.05 or higher, and usually 1000 or lower, preferably 100 or lower. If the ratio of the compounds (I) is too high, battery characteristics after high-temperature storage tend to deteriorate. If the ratio is too low, it is possible neither to improve cycle characteristics at low temperature nor to inhibit gas generation during continuous charging.

[Other Ingredients]

In addition to the aforementioned electrolyte, non-aqueous solvent, unsaturated cyclic carbonate compound (A ingredient), and compound (I) (B ingredient), the non-aqueous electrolyte solution of the present invention (I) may contain one or more other ingredients in such an amount as not to impair the effects of the present invention. Examples of other ingredients are conventionally known various assistants, such as anti-overcharging agents, acid removers, dehydrators, and fire retardants.

Among such assistants, examples of anti-overcharging agents are: aromatic compounds such as biphenyl, alkyl biphenyl, terphenyl, partially-hydrogenation products of terphenyl, cyclohexyl benzene, t-butyl benzene, t-amyl benzene, diphenyl ether, and dibenzofuran, etc.; partially fluorination products of the aforementioned aromatic compounds, such as 2-fluoro biphenyl, o-cyclohexyl fluoro benzene, and p-cyclohexyl fluoro benzene; fluorine-containing anisole compounds such as 2,4-difluoro anisole, 2,5-difluoro anisole, and 2,6-difluoro anisole. These may be used either any one singly or in combination of two or more at an arbitrary ratio. Containing these anti-overcharging agents at a concentration equal to or higher than the lower limit value enables to inhibit a rupture or ignition of the battery even in such a case of overcharging. If their concentration exceeds the upper limit value, they may react during high-temperature storage in the regions of the electrodes that exhibit relatively high activity. Reactions of these compounds may bring about marked decrease in discharging characteristics after continuous charging and discharging characteristics after high-temperature storage due to marked increase in internal resistance of the battery or gas generation.

Examples of other assistants are: carbonate compounds such as fluoroethylene carbonate, trifluoropropylene carbonate, phenyl ethylene carbonate, erythritan carbonate, and spiro-bis-dimethylene carbonate; carboxylic anhydrides such as succinic anhydride, glutaric anhydride, maleic anhydride, citraconic anhydride, glutaconic anhydride, itaconic anhydride, diglycolic anhydride, cyclohexane dicarboxylic anhydride, cyclopentane tetracarboxylic dianhydride and phenyl succinic anhydride; sulfur-containing compounds such as ethylene sulfite, 1,3-propane sultone, 1,4-butane sultone, methyl methanesulfonate, busulfan, sulfolane, sulfolene, dimethyl sulfone, tetramethyl thiuram monosulfide, N,N-dimethyl methane sulfone amide, and N,N-diethyl methane sulfone amide; nitrogen-containing compounds such as 1-methyl-2-pyrrolidinone, 1-methyl-2-piperidone, 3-methyl-2-oxazolidinone, 1,3-dimethyl-2-imidazolidinone, and N-methyl succinimide; hydrocarbon compounds such as heptane, octane, and cycloheptane; fluorine-containing aromatic compounds such as fluoro benzene, difluoro benzene, hexafluoro benzene, and benzotrifluoride; and phosphorus-containing compounds such as trimethyl phosphate, triethyl phosphate, dimethyl ethyl phosphate, methyl diethyl phosphate, ethylene methyl phosphate, ethylene ethyl phosphate, and tris(trifluoroethyl)phosphate. These may be used either any one singly or in combination of two or more at an arbitrary ratio.

When the non-aqueous electrolyte solution of the present invention (I) contains these assistants, their content with respect to the non-aqueous electrolyte solution is within the range of usually 0.01 weight % or higher and usually 5 weight % or lower. Contained in the non-aqueous electrolyte solution of the present invention, these assistants can improve capacity-maintenance characteristics after high-temperature storage and cycle characteristics.

[Production Method of Non-Aqueous Electrolyte Solution (I)]

The non-aqueous electrolyte solution of the present invention (I) can be prepared by dissolving in the aforementioned non-aqueous solvent the aforementioned electrolyte, unsaturated cyclic carbonate compound (A ingredient), and compound (I) (B ingredient), together with other assistants, which are used according to need. Before preparing the non-aqueous electrolyte solution (I), it is desired to dewater each ingredient such as the non-aqueous solvent in advance. Specifically, it is desirable to carry out dewatering until its water content becomes usually 50 ppm or lower, preferably 30 ppm or lower. The methods of dewatering can be selected arbitrarily, examples of which methods are heating under a reduced pressure or passing through a molecular sieve.

The non-aqueous electrolyte solution of the present invention (I) may also be prepared in a semisolid state through gelation using a gelatinizer such as macromolecules. The ratio of the non-aqueous electrolyte solution (I) in the semisolid electrolyte is within the range of usually 30 weight % or higher, preferably 50 weight % or higher, more preferably 75 weight % or higher, and usually 99.95 weight % or lower, preferably 99 weight % or lower, more preferably 98 weight % or lower with respect to the total weight of the semisolid electrolyte. If the ratio of the non-aqueous electrolyte solution (I) is too high, the non-aqueous electrolyte solution (I) may hardly be secured and is therefore prone to cause leakage. On the other hand, if the ratio of the non-aqueous electrolyte solution (I) is too low, the battery may be deficient in charge and discharge efficiencies and capacity.

[2: Non-Aqueous Electrolyte Solution (II)]

The non-aqueous electrolyte solution according to the second aspect of the present invention (hereinafter also called "non-aqueous electrolyte solution (II)") contains a lithium salt and a non-aqueous solvent, and is characterized in that it further contains a compound (II) (hereinafter also called "C ingredient") that is described later. Besides, it is preferable to contain a cyclic carbonate compound having an unsaturated bond (hereinafter also called "D ingredient").

[Electrolyte]

The electrolyte used in the non-aqueous electrolyte solution (II) is not particularly limited and can be selected arbitrarily from known substances used as an electrolyte of a secondary battery. As regards a lithium secondary battery, a lithium salt is usually used as the electrolyte. The details of the lithium salt, such as its selections and its amount of usage, are the same as explained above in connection with the non-aqueous electrolyte solution (I).

[Non-Aqueous Solvent]

As the non-aqueous solvent of the non-aqueous electrolyte solution (II), it is possible to use any substance conventionally known as solvents for non-aqueous electrolyte solutions, although an organic solvent is usually selected. The details of the organic solvent, such as its selections and its amount of usage, the non-aqueous electrolyte solution (I), are the same as explained above in connection with the non-aqueous electrolyte solution (I).

[Compound (II) (C Ingredient)]

The non-aqueous electrolyte solution (II) contains, as C ingredient, at least one compound of a compound (IIa), a compound (IIb), and a compound (IIc) (hereinafter also called "compound (II)"). The non-aqueous electrolyte solution (II) may contain any one of the compound (IIa), the compound (IIb), and the compound (IIc) singly, or may contain two or three of them in combination. In the following description, the non-aqueous electrolyte solutions (II) that each contain a respective one of the compound (IIa), the compound (IIb), the compound (IIc) will be respectively called the "non-aqueous electrolyte solution (IIa)" through the "non-aqueous electrolyte solution (IIc)" when explained separately, while they will be collectively called the "non-aqueous electrolyte solution (II)" when explained without particular distinction.

<Compound (IIa)>

The compound (IIa) is a compound having a structure expressed by the following general formula (IIa).

[Chemical Formula 13]

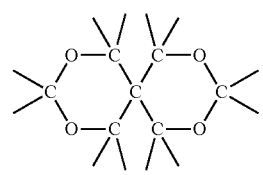

(IIa)

Among the compounds (IIa), preferred is a compound expressed by the following general formula (IIa') (hereinafter also called "compound (IIa')").

[Chemical Formula 14]

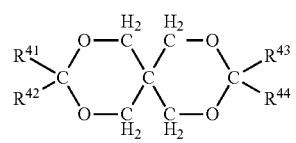

(IIa')

(in the formula (IIa'), $R^{41}$-$R^{44}$ represent, independently of each other, a hydrogen atom, an alkyl group having 1-12 carbon atoms that may be substituted by a fluorine atom, an alkenyl group having 2-12 carbon atoms that may be substituted by a fluorine atom, an aryl group having 6-12 carbon atoms that may be substituted by a fluorine atom, or an aralkyl group having 7-12 carbon atoms that may be substituted by a fluorine atom. The group may have an ether linkage in its chain. $R^{41}$ may be linked with $R^{42}$, and $R^{43}$ may be linked with $R^{44}$, to form a ring that may have an oxygen atom.)

In the general formula (IIa'), $R^{41}$-$R^{44}$ represent, independently of each other, a hydrogen atom, an alkyl group having 1-12 carbon atoms, an alkenyl group having 2-12 carbon atoms, an aryl group having 6-12 carbon atoms, or an aralkyl group having 7-12 carbon atoms.

The alkyl group, alkenyl group, aryl group, or aralkyl group may have one or more fluorine atoms that substitute a part or all of the hydrogen atoms, and may also have an ether linkage in its chain.

Examples of alkyl groups are the ones whose number of carbon atoms is between 1-12, preferably between 1-8, such as methyl group, ethyl group, n-propyl group, i-propyl group, n-butyl group, i-butyl group, sec-butyl group, tert-butyl group, pentyl group, cyclopentyl group, cyclohexyl, etc.

Examples of alkenyl groups are the ones whose number of carbon atoms is between 1-12, preferably between 2-8, especially preferably between 2-4, such as vinyl group and propenyl group.

Examples of aryl groups include phenyl group, tolyl group, and xylyl group, among which phenyl group is preferred.

Examples of aralkyl group include benzyl group and phenethyl group.

$R^{41}$ may be coupled with $R^{42}$, and $R^{43}$ may be coupled with $R^{44}$, to form a cyclic structure that may contain an oxygen atom, e.g., a cycloalkane structure having 3-12 carbon atoms.

Among these, it is preferable that $R^{41}$-$R^{44}$ is, independently of each other: a hydrogen atom, an alkyl group having 1-12 carbon atoms that may be substituted by a fluorine atom; or an alkenyl group having 2-12 carbon atoms that may be substituted by a fluorine atom.

The molecular weight of the compound (IIa') is usually 160 or larger and usually 900 or smaller, preferably 650 or smaller. If the molecular weight is too large, its solubility in the electrolyte solution decreases markedly.

Examples of the compound (IIa') can be mentioned as follows.

As the compound in which each of $R^{41}$-$R^{44}$ is a hydrogen atom, 2,4,8,10-tetraoxaspiro[5.5]undecane can be mentioned.

As the compounds in which any of $R^{41}$-$R^{44}$ is an alkyl group, there can be mentioned 3,9-dimethyl-2,4,8,10-tetraoxaspiro[5.5]undecane, 3,9-diethyl-2,4,8,10-tetraoxaspiro[5.5]undecane, 3,9-dipropyl-2,4,8,10-tetraoxaspiro[5.5]undecane, 3,9-dioctyl-2,4,8,10-tetraoxaspiro[5.5]undecane, 3,9-didecyl-2,4,8,10-tetraoxaspiro[5.5]undecane, 3,9-diundecyl-2,4,8,10-tetraoxaspiro[5.5]undecane, 3,9-didodecyl-2,4,8,10-tetraoxaspiro[5.5]undecane, 3,3,9,9-tetramethyl-2,4,8,10-tetraoxaspiro[5.5]undecane, 3,3,9,9-tetraethyl-2,4,8,10-tetraoxaspiro[5.5]undecane, 3,9-diethyl-3,9-dimethyl-2,4,8,10-tetraoxaspiro[5.5]undecane, 3,9-dicyclohexyl-2,4,8,10-tetraoxaspiro[5.5]undecane, etc.

As the compounds in which any of $R^{41}$-$R^{44}$ is an alkenyl group, there can be mentioned 3,9-divinyl-2,4,8,10-tetraoxaspiro[5.5]undecane, 3,9-di-1-propenyl-2,4,8,10-tetraoxaspiro[5.5]undecane, 3,9-di-2-propenyl-2,4,8,10-tetraoxaspiro[5.5]undecane, etc.

As the compounds in which any of $R^{41}$-$R^{44}$ is an aryl group, there can be mentioned 3,9-diphenyl-2,4,8,10-tetraoxaspiro[5.5]undecane, 3,9-bis(4-fluoro phenyl)-2,4,8,10-tetraoxaspiro[5.5]undecane, etc.

As the compounds in which either $R^{41}$ is coupled with $R^{42}$, or $R^{43}$ is coupled with $R^{44}$, to form a cyclic structure, there can be mentioned 7,11,18,21-tetraoxatrispiro[5.2.2.5.2.2]heneicosane, 6,10,16,19-tetraoxatrispiro[4.2.2.4.2.2]nonadecane, etc.

As the compounds in which any of $R^{41}$-$R^{44}$ has an ether linkage in its chain, there can be mentioned 3,9-dimethoxy-2,4,8,10-tetraoxaspiro[5.5]undecane, 3,9-diethoxy-2,4,8,10-tetraoxaspiro[5.5]undecane, 3,9-bis(methoxymethyl)-2,4,8,10-tetraoxaspiro[5.5]undecane, 3,9-bis(2-methoxyethyl)-2,4,8,10-tetraoxaspiro[5.5]undecane, 3,9-bis(2-ethoxyethyl)-2,4,8,10-tetraoxaspiro[5.5]undecane, etc.

Among these, preferred are 2,4,8,10-tetraoxaspiro[5.5]undecane, 3,9-dimethyl-2,4,8,10-tetraoxaspiro[5.5]undecane, 3,9-diethyl-2,4,8,10-tetraoxaspiro[5.5]undecane, 3,9-dipropyl-2,4,8,10-tetraoxaspiro[5.5]undecane, 3,9-divinyl-2,4,8,10-tetraoxaspiro[5.5]undecane, 3,9-di-1-propenyl-2,4,8,10-tetraoxaspiro[5.5]undecane, and 3,9-di-2-propenyl-2,4,8,10-tetraoxaspiro[5.5]undecane, especially preferred being 2,4,8,10-tetraoxaspiro[5.5]undecane and 3,9-divinyl-2,4,8,10-tetraoxaspiro[5.5]undecane.

For the non-aqueous electrolyte solution (IIa), the compounds (IIa) may be used either any one singly or in combination of any two or more at an arbitrary proportion.

The proportion of compound (IIa) in the non-aqueous electrolyte solution (IIa) is usually 0.001 weight % or higher. If its concentration is lower than the limit, it scarcely exhibits any effect. The concentration is preferably 0.05 weight % or higher, especially preferably 0.1 weight % or higher. On the other hand, if the concentration is too high, storage characteristics of the battery tend to decline. The upper limit is usually 10 weight % or lower, preferably weight % or lower, more preferably 4 weight % or lower. In view of relationship of the concentration with various characteristics of the electrolyte solution, the concentration is preferably 3 weight % or lower, further preferably 2 weight % or lower, still further preferably 1 weight % or lower. When two or more compounds (IIa) are combinedly used, the total proportion of the compounds (IIa) is required to meet the aforementioned range.

It is not clear why the non-aqueous electrolyte solution (IIa) containing the compound (IIa) improves continuous charging characteristics, although the probable reason is presumed as follows. Basically, the compound (IIa) causes reactions on the negative electrode and positive electrode surfaces during initial charging, forms complex coating together with ingredients of the electrolyte solution. As presumed from the structure expressed by the formula (IIa), the complex coating contains a lot of oxygen atoms that are located in appropriate positions, which may bring about both excellent lithium ion permeability and stability at high temperature. Presumably the coating prevents the contact between the electrodes with high activity and the electrolyte solution even in the state of continuous charging or in the state of relatively high temperature, as results of which it becomes possible to inhibit side reactions inside the battery and to improve continuous charging characteristics.

On the other hand, when using cyclic ether compounds whose structures fall outside the definition of the formula (IIa), such as dioxolane, tetrahydrofuran, tetrahydropyran, and dioxane, battery characteristics tend to decline presumably because the resultant complex coating is inferior in lithium ion permeability and unstable at high temperature.

<Compound (IIb)>

The compound (IIb) is a compound expressed by the following general formula (IIb).

[Chemical Formula 15]

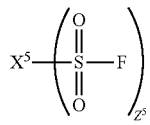

In the formula (IIb), $Z^5$ represents an integer of 2 or larger and usually 8 or smaller, preferably 4 or smaller. It is especially preferable that $Z^5=2$.

$X^5$ represents a Z-valent linkage group composed of one or more atoms selected from the group consisting of a carbon atom, a hydrogen atom, a fluorine atom and an oxygen atom, and the fluoro sulfonyl group is bound to a carbon atom of the linkage group. Examples of the linkage group are hydrocarbon groups and fluorine-substituted hydrocarbon groups, as well as the hydrocarbon groups whose chains contain any linkage such as ether linkage or ester linkage. Examples of the hydrocarbon group are aliphatic hydrocarbon groups, such as saturated aliphatic hydrocarbon groups and unsaturated aliphatic hydrocarbon groups, as well as aromatic hydrocarbon groups. Among these aliphatic hydrocarbon groups are preferred, especially preferable being saturated aliphatic hydrocarbon groups. The aliphatic hydrocarbon groups may be either chain or cyclic, although chain is preferred. These hydrocarbon groups may have one or more fluorine atoms substituting a part or all of the hydrogen atoms. The number of carbon atoms of the linkage group is usually between 1-12, preferably between 2-8.

Examples of the linkage groups where $Z^5=2$ are enumerated below.

[Chemical Formula 16]

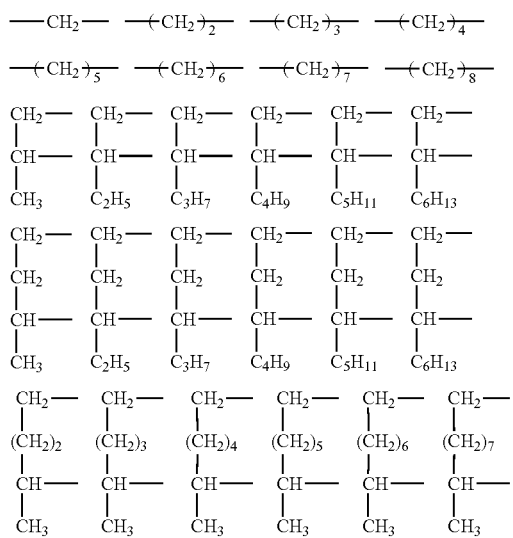

Examples of the linkage groups where $Z^5=3$ are enumerated below.

[Chemical Formula 17]

Examples of the linkage groups where $Z^5=4$ are enumerated below.

[Chemical Formula 18]

The molecular weight of the compound (IIb) is usually 180 or larger and usually 1000 or smaller, preferably 650 or smaller, more preferably 350 or smaller. If the molecular weight is too large, solubility in the electrolyte solution may decrease markedly.

Examples of the compounds (IIb) where $Z^5=2$ are methane-bis(sulfonyl fluoride), ethane-1,2-bis(sulfonyl fluoride), propane-1,3-bis(sulfonyl fluoride), propane-1,2-bis(sulfonyl fluoride), butane-1,4-bis(sulfonyl fluoride), butane-1,2-bis(sulfonyl fluoride), butane-1,3-bis(sulfonyl fluoride), difluoromethane bis(sulfonyl fluoride), 1,1,2,2-tetrafluoroethane-1,2-bis(sulfonyl fluoride), 1,1,2,2,3,3-hexafluoropropane-1,3-bis(sulfonyl fluoride), 1,1,2,2,3,3,4,4-octafluoro butane-1,4-bis(sulfonyl fluoride), 2,2'-oxybis(ethane sulfonyl fluoride), 2,2'-oxybis(1,1,2,2-tetrafluoroethane sulfonyl fluoride), etc.

Examples of the compounds (IIb) where $Z^5=3$ are propane-1,2,3-tris(sulfonyl fluoride), butane-1,2,3-tris(sulfonyl fluoride), butane-1,2,4-tris(sulfonyl fluoride), 1,1,2,3,3-pentafluoropropane-1,2,3-tris(sulfonyl fluoride), etc.

Examples of the compounds (IIb) where $Z^5=4$ are butane-1,2,3,4-tetrakis(sulfonyl fluoride), 1,1,2,3,4,4-hexafluorobutane-1,2,3,4-tetrakis(sulfonyl fluoride), etc.

Preferable among these are methane-bis(sulfonyl fluoride), ethane-1,2-bis(sulfonyl fluoride), propane-1,3-bis(sulfonyl fluoride), propane-1,2-bis(sulfonyl fluoride), butane-1,4-bis(sulfonyl fluoride), difluoromethane bis(sulfonyl fluoride), 1,1,2,2-tetrafluoroethane-1,2-bis(sulfonyl fluoride), 1,1,2,2,3,3-hexafluoropropane-1,3-bis(sulfonyl fluoride), 1,1,2,2,3,3,4,4-octafluoro butane-1,4-bis(sulfonyl fluoride), and propane-1,2,3-tris(sulfonyl fluoride).

More preferably, ethane-1,2-bis(sulfonyl fluoride), propane-1,3-bis(sulfonyl fluoride), butane-1,4-bis(sulfonyl fluoride), 1,1,2,2-tetrafluoroethane-1,2-bis(sulfonyl fluoride), 1,1,2,2,3,3-hexafluoropropane-1,3-bis(sulfonyl fluoride), and 1,1,2,2,3,3,4,4-octafluoro butane-1,4-bis(sulfonyl fluoride) are mentioned.

In the non-aqueous electrolyte solution (IIb), the compounds (IIb) may be used either any one singly or in combination of any two or more in any ratio.

The proportion of the compound (IIb) in the non-aqueous electrolyte solution (IIb) is usually 0.001 weight % or higher. If the concentration of the compound (IIb) is lower than the limit, it exhibits scarcely any effects. It is preferably 0.05 weight % or higher, especially preferably 0.1 weight % or higher. However, if the concentration is too high, storage characteristics of the battery tend to decline. There is hence an upper limit of usually 5 weight % or lower, preferably 3 weight % or lower, more preferably 1 weight % or lower. When two or more compounds (IIb) are combinedly used, the total proportion of the compounds (IIb) is required to meet the aforementioned range.

It is not clear why the non-aqueous electrolyte solution containing the compound (IIb) improves the battery characteristics under high-temperature, high-voltage condition such as continuous charging characteristics and storage characteristics, although the probable reason is presumed as following. Basically, the compound (IIb) causes reactions on the negative electrode and positive electrode surfaces during initial charging and forms complex coating together with other electrolyte solution ingredients. Since the complex coating exhibits excellent lithium ion permeability and is stable even at high temperature, it is presumed that even in the state of continuous charging or in the state of relatively high temperature, the coating prevents the contact between the electrodes with high activity and the electrolyte solution to thereby suppress side reactions that may occur inside the battery.

On the other hand, a compound having a single fluoro sulfonyl group, such as benzene sulfonyl fluoride and p-toluene sulfonyl fluoride, may form complex coating that is inferior in lithium ion permeability and unstable at high temperature. It is presumably because the resultant battery increases its internal resistance when stored under high-temperature condition, bringing about deterioration in battery characteristics such as storage characteristics at high temperature and continuous charging characteristics.

<Compound (IIc)>

The compound (IIc) is a compound expressed by the following general formula (IIc).

[Chemical Formula 19]

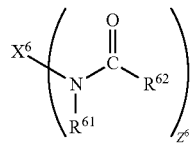

(IIc)

In the formula (IIc), $Z^6$ represents an integer of 2 or larger. Although not being restricted, the upper limit is preferably 4 or smaller, more preferably 3 or smaller. Especially preferred is that $Z^6=2$. If $Z^6$ is smaller than two, discharging storage characteristics may deteriorate.

$R^{61}$ represent, independently of each other, an alkyl group. The number of carbon atoms is within the range of usually 1 or more and usually 6 or less, preferably 4 or less. Examples of alkyl groups for $R^{61}$ are methyl group, ethyl group, n-propyl group, i-propyl group, n-butyl group, i-butyl group, sec-butyl group, tert-butyl group, pentyl group, cyclopentyl group, and cyclohexyl group. These alkyl groups may be substituted by other groups. The substituents that the alkyl groups of $R^{61}$ may have are not particularly limited unless they depart from the gist of the non-aqueous electrolyte solution of the present invention, although halogen atoms, alkoxy groups, hydroxy groups, and amino groups are desirable. $Z^6$ alkyl groups of $R^{61}$, including their substituents if any, may be either identical to one another or different from any other.

$R^{62}$ represents, independently of each other, an alkyl group substituted by one or more halogen atoms. The number of carbon atoms is within the range of usually 1 or more and usually 6 or less, preferably 3 or less. The halogen atoms are not particularly limited in their kinds, although fluorine atoms are preferred in terms of electrochemical stability. The number of substituent halogen atoms of the alkyl group is usually 1 or more, preferably 2 or more. The upper limit depends on the number of carbon atoms the alkyl group has, although being usually 6 or less, preferably 4 or less. Examples of $R^{62}$ include fluoromethyl group, difluoromethyl group, trifluoromethyl group, 1-fluoroethyl group, 2-fluoroethyl group, 2,2-difluoroethyl group, 2,2,2-trifluoroethyl group, pentafluoroethyl group, heptafluoropropyl group, etc. Preferred among these are fluorine-substituted alkyl groups whose number of carbon atoms is 1 or more and 6 or less, especially preferable being fluorine-substituted alkyl groups whose number of carbon atoms is 1 or more and 3 or less. These alkyl groups may be substituted by one or more other groups. The substituents that the alkyl groups of $R^{62}$ may have are not particularly limited unless they depart from the gist of the non-aqueous electrolyte solution of the present invention, although alkoxy groups, hydroxy groups, and amino groups are desirable. $Z^6$ units of $R^{62}$ may be either identical to one another or different from any other.

Any two or more of $R^{61}$ and/or $R^{62}$ may be linked with each other to form a cyclic structure, which decreases the number hydrogen atoms in the molecule and results in suppression of hydrogen-gas generation.

$X^6$, the linkage part that links the plural functional groups together, represents a $Z^6$-valent hydrocarbon group. The number of carbon atoms is within the range of usually 1 or more and usually 6 or less, preferably 3 or less. Examples of $X^6$ are $Z^6$-valent hydrocarbon groups obtained by removing $Z^6$ hydrogen atoms from alkyl groups, such as ethane, propane, n-butane, isobutane, n-pentane, isopentane, and neopentane, or from aryl groups, such as benzene and toluene. These hydrocarbon groups may be substituted by one or more other groups. The substituents that the alkyl groups of $X^6$ may have are not particularly limited unless they depart from the gist of the non-aqueous electrolyte solution of the present invention, although halogen atoms, alkoxy groups, hydroxy groups, and amino groups are desirable.

The molecular weight of the compound (IIc) is usually 150 or larger, preferably 180 or larger, and usually 1000 or smaller, preferably 500 or smaller. The molecular weight equaling or exceeding the aforementioned lower limit is indispensable in order to satisfy the structure of the general formula (IIc). On the other hand, if it exceeds the upper limit, the compound molecules may not cluster densely during formation of complex coating, bringing about degradation when stored in a discharged state.

Examples of the compound (IIc) are enumerated below, although the selections are not limited to the following examples. Any compound can be used unless it runs counter to the gist of the present invention.

$Z^6=2$:

[Chemical Formula 20]

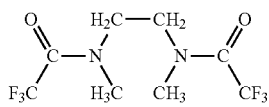
(A-1)

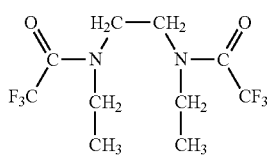
(A-2)

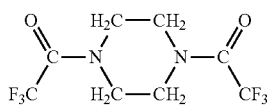
(A-3)

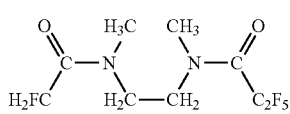
(A-4)

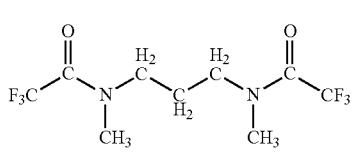
(A-5)

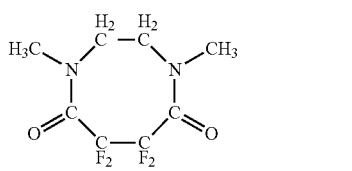
(A-6)

$Z^6=3$:

[Chemical Formula 21]

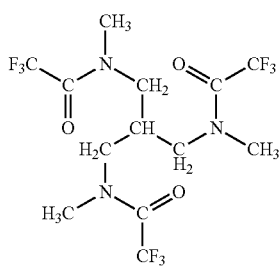
(B-1)

$Z^6=4$:

[Chemical Formula 22]

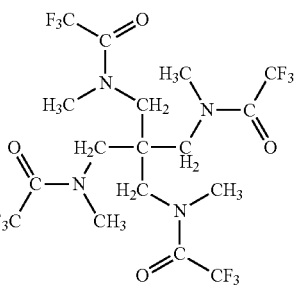
(C-1)

Among the compounds enumerated above, preferable compounds as the compound (IIc) are (A-1), (A-2), (A-3) or (B-1), especially preferable being (A-1), (A-2) and (A-3).

In the non-aqueous electrolyte solution (IIc), the compounds (IIc) may be used either any one singly or in combination of any two or more at arbitrary proportion.

The concentration of the compound (IIc) in the non-aqueous electrolyte solution (IIc) is within the range of usually 0.01 weight % or higher, preferably 0.05 weight % or higher, especially preferably 0.1 weight % or higher, and usually 4 weight % or lower, preferably 3 weight % or lower, more preferably 2 weight % or lower, especially preferably 1 weight % or lower. If the proportion of the compound (IIc) is too low, gas inhibitory effect may not emerge adequately. On the other hand, if the proportion is too high, discharging storage characteristics of the battery tends to decline. When two or more compounds (IIc) are used combinedly, the total proportion of the compounds (IIc) is required to meet the aforementioned range.

It is not clear why using the non-aqueous electrolyte solution (IIc) containing the compound (IIc) as the electrolyte solution of a secondary battery, especially of a lithium secondary battery, can suppress degradation during storage in a discharged state and also reduce gas generation markedly, although the probable reason is presumed as following.

The non-aqueous electrolyte solution (IIc) causes reaction on the positive electrode or the negative electrode during initial charging to form organic macromolecule coating. Since the compound used in Patent Document 7 has a single amide site, i.e., a single reaction site, it may have the effect of terminating polymerization reaction. Hence, macromolecularization may not progress to a sufficient degree, resulting in that the solution containing the compound is inferior in stability of the organic coating in an electrolyte solution when stored in a discharged state compared to a solution without the compound. On the other hand, since the compound (IIc) contained in the non-aqueous electrolyte solution (IIc) have plural amide sites, i.e., plural reaction sites, it can keep causing polymerization reaction without terminating it. This is presumably because the non-aqueous electrolyte solution (IIc) can form favorable coating that is capable of inhibiting gas generation without impairing stability during storage in a discharged state.

If the concentration of the compound (IIc) in the non-aqueous electrolyte solution (IIc) is too low, it may produce little effect because it cannot produce an adequate amount of coating. On the other hand, if the concentration is too high, it may cause unfavorable effects on other battery characteristics such as discharging storage characteristics because it produces such an abundance of coating that the properties of coating may be altered. Consequently, the concentration range defined in the present invention is considered appropriate.

<Others>

When the non-aqueous electrolyte solution (II) contains two or more of the compound (IIa), the compound (IIb), and the compound (IIc), the total concentration of compounds (II) with respect to the non-aqueous electrolyte solution (II) is within the range of usually 0.01 weight % or higher, preferably 0.05 weight % or higher, especially preferably 0.1 weight % or higher, and usually 5 weight % or lower, preferably 4 weight % or lower, more preferably 3 weight % or lower, especially preferably 2 weight % or lower. If the content of the compounds (II) is too low, inhibitory effect of degradation under high voltage may not appear to an adequate extent. On the other hand, if the proportion is too high, characteristics such as large-current characteristics of the battery tend to decline.

[Unsaturated Cyclic Carbonate Compound (D Ingredient)]

In addition to the aforementioned C ingredient, the non-aqueous electrolyte solution (II) may preferably contain an unsaturated cyclic carbonate compound as D ingredient. As described above, an unsaturated cyclic carbonate compound means a compound that has at least one carbonate structure and at least one carbon-carbon double bond per molecule, at least one cyclic structure per molecule.

Incorporating the unsaturated cyclic carbonate compound into the non-aqueous electrolyte solution contains can improve storage characteristics of the resultant battery. The reason is not clear, although it is presumed that stable protective coating is formed on the negative electrode surface. If the content is too low, storage characteristics cannot be fully improved. Use of an unsaturated cyclic carbonate in an electrolyte solution generally becomes a cause of gas generation during storage at high temperature. However, its combined use with a compound expressed by the Compound II is favorable because it produces a battery that can inhibit gas generation and improve the shortcomings from the unsaturated cyclic carbonate.

Examples of unsaturated cyclic carbonate compounds are vinylene carbonate compounds, vinyl ethylene carbonate compounds, and methylene ethylene carbonate compounds.

Examples of vinylene carbonate compounds include vinylene carbonate, methyl vinylene carbonate, ethyl vinylene carbonate, 4,5-dimethyl vinylene carbonate, 4,5-diethyl vinylene carbonate, fluoro vinylene carbonate, and trifluoromethyl vinylene carbonate.

Examples of vinyl ethylene carbonate compounds include vinyl ethylene carbonate, 4-methyl-4-vinyl ethylene carbonate, 4-ethyl-4-vinyl ethylene carbonate, 4-n-propyl-4-vinyl ethylene carbonate, 5-methyl-4-vinyl ethylene carbonate, 4,4-divinyl ethylene carbonate, and 4,5-divinyl ethylene carbonate.

Examples of methylene ethylene carbonate compounds are methylene ethylene carbonate, 4,4-dimethyl-5-methylene ethylene carbonate, and 4,4-diethyl-5-methylene ethylene carbonate.

Among them, preferable unsaturated cyclic carbonate compounds are vinylene carbonate, vinyl ethylene carbonate, especially preferable being vinylene carbonate.

These unsaturated cyclic carbonate compounds may be used either any one alone or in combination of two or more in an arbitrary proportion.

When the non-aqueous electrolyte solution (II) contains a unsaturated cyclic carbonate compound in combination with the aforementioned compound (IIa) or compound (IIb), its proportion in the non-aqueous electrolyte solution (II) is within the range of usually 0.01 weight % or higher, preferably 0.1 weight % or higher, especially preferably 0.3 weight % or higher, most preferably 0.5 weight % or higher, and usually 8 weight % or lower, preferably 4 weight % or lower, especially preferably 3 weight % or lower. When two or more unsaturated cyclic carbonate compounds are used combinedly, the total proportion of the unsaturated cyclic carbonate compounds is required to meet the aforementioned range.

When the non-aqueous electrolyte solution (II) contains a unsaturated cyclic carbonate compound in combination with the aforementioned compound (IIc), its proportion in the non-aqueous electrolyte solution (II) is within the range of usually 0.01 weight % or higher, preferably 0.1 weight % or higher, especially preferably 0.5 weight % or higher, most preferably 1 weight % or higher, and usually 10 weight % or lower, preferably 5 weight % or lower, especially preferably 2.5 weight % or lower. When two or more unsaturated cyclic carbonate compounds are used combinedly, the total proportion of the unsaturated cyclic carbonate compounds is required to meet the aforementioned range.

If the content of the unsaturated cyclic carbonate compound is too low, it may not adequately produce the effect of improving cycle characteristics of the battery. Since an unsaturated cyclic carbonate compound is apt to react with a positive electrode material in the state of charging, the use of the unsaturated cyclic carbonate compound in the non-aqueous electrolyte solution generally brings about a problem that the amount of gas generation during continuous charging. However, its use in combination with the compound (II) is preferable because it prevents the amount of gas generation increasing and improves cycle characteristics while inhibiting gas generation. On the other hand, if the content of the unsaturated cyclic carbonate compound is too high, there arise tendencies to increase the amount of gas generation during high-temperature storage and to deteriorate discharging characteristics at low temperature.

When the non-aqueous electrolyte solution (II) contains an unsaturated cyclic carbonate compound in combination with the aforementioned compound (II), the weight ratio between the compound (II) and the unsaturated cyclic carbonate compound is usually 1:1-50 in the state where the non-aqueous electrolyte solution (II) is prepared. When two or more unsaturated cyclic carbonate compounds and/or compounds (II) are combinedly used, the total proportion of the unsaturated cyclic carbonate compounds and/or the compounds (II) is required to meet the aforementioned range.

[Other Ingredients]

Besides the aforementioned electrolyte, the non-aqueous solvent, and the compound (II) (C ingredient), in addition to the unsaturated cyclic carbonate compound (D ingredient) used according to need, the non-aqueous electrolyte solution (II) may contain other ingredients unless they impair the effects of the present invention. Examples of other ingredients are various conventionally-known assistants such as anti-overcharging agent, acid removers, dehydrator, and fire retardant. The details of anti-overcharging agent and other assistants, such as their selections and their amounts to be used, are the same as explained above in connection with non-aqueous electrolyte solution (I).

[Production Method of Non-Aqueous Electrolyte Solution (II)]

The non-aqueous electrolyte solution of the present invention (II) can be prepared by dissolving the aforementioned electrolyte into the aforementioned non-aqueous solvent together with other ingredients used according to need, such as the compound (II) (C ingredient), the unsaturated cyclic carbonate compound (D ingredient) and other assistants.

Before preparing the non-aqueous electrolyte solution (II), it is desired to dewater in advance the individual ingredients such as the non-aqueous solvent. Specifically, it is desirable to carry out dewatering until their water contents become usually 50 ppm or lower, preferably 30 ppm or lower. The methods of dewatering can be selected arbitrarily, examples of which methods are heating under a reduced pressure or passing through a molecular sieve.

The non-aqueous electrolyte solution (II) may also be prepared in a semisolid state through gelation using a gelatinizer such as macromolecules. The ratio of the non-aqueous electrolyte solution (II) with respect to the semisolid electrolyte is within the range of usually 30 weight % or higher, preferably 50 weight % or higher, more preferably 75 weight % or higher, and usually 99.95 weight % or lower, preferably 99 weight % or lower, more preferably 98 weight % or lower. If the ratio of the non-aqueous electrolyte solution (II) is too high, the non-aqueous electrolyte solution (II) may hardly be secured and is therefore prone to cause leakage. On the other hand, if the ratio of the non-aqueous electrolyte solution (II) is too low, the battery may be deficient in charge and discharge efficiencies and capacity.

[3: Lithium Secondary Battery]

Next, the lithium secondary battery of the present invention will be explained.

The lithium secondary battery of the present invention comprises, as minimum components, a negative electrode and a positive electrode that are capable of absorbing and desorbing lithium ions in addition to the aforementioned non-aqueous electrolyte solution of the present invention.

That is to say, the lithium secondary battery of the present invention has the same arrangement as those of the conventionally-known lithium secondary batteries expect the non-aqueous electrolyte solution: it is usually constituted by layering the positive electrode and the negative electrode with a porous membrane (separator) interposed between, which separator is impregnated with the non-aqueous electrolyte solution of the present invention, and containing these components in a case. The shape of the lithium secondary battery of the present invention is not particularly limited and may be any shape, such as cylindrical type, square type, laminated type, coin type, large-sized type, etc.

[Positive Electrode Active Material]

Examples of the positive electrode active material are oxides of transition metals, composite oxides of transition metals and lithium (lithium transition metal composite oxides), sulfides of transition metals, inorganic compounds such as metal oxides, lithium metal, lithium alloys, and their mixtures. Specific examples are: transition metal oxides such as MnO, $V_2O_5$, $V_6O_{13}$, and $TiO_2$; lithium cobalt composite oxides whose basic composition is expressed by $LiCoO_2$; lithium nickel composite oxides expressed by $LiNiO_2$; lithium manganese composite oxide expressed by $LiMn_2O_4$ or $LiMnO_2$; lithium transition metal composite oxides such as lithium nickel manganese cobalt composite oxide, and lithium nickel cobalt aluminum composite oxide; transition metal sulfides such as TiS and FeS; metal oxides such as $SnO_2$ and $SiO_2$. Among them, lithium transition metal composite oxides, specifically, lithium cobalt composite oxide, lithium nickel composite oxide, lithium cobalt nickel composite oxide, lithium nickel manganese cobalt composite oxide, and lithium nickel cobalt aluminum composite oxide are preferably used because they realize both large capacity and high cycle characteristics. Part of cobalt, nickel or manganese site of the lithium transition metal composite oxides may preferably be replaced with metals such as Al, Ti, V, Cr, Mn, Fe, Co, Li, Ni, Cu, Zn, Mg, Ga, and Zr because it stabilizes the structure. These positive electrode active materials may be used either any one singly or in combination of any two or more at an arbitrary ratio.

[Negative Electrode Active Material]

As the negative electrode active material, it is possible to use materials capable of absorbing and desorbing lithium's, such as carbonaceous materials, metal compounds, lithium metal and lithium alloys. Preferable among them are carbonaceous materials, especially preferable being graphite and surface-covered graphite with carbon material that is more amorphous compared to graphite. These negative electrode active materials may be used either any one singly or in combination of any two or more at an arbitrary ratio.

Desirable Graphite is the following: the d value (interlayer distance) of the lattice plane (002 plane) obtained by X-ray diffraction according to Gakushin method (a method stipulated by Japan Society for the Promotion of Science) is usually between 0.335-0.340 nm, preferably between 0.335-0.338 nm, especially preferably between 0.335-0.337 nm. The crystallite size (Lc) obtained by X-ray diffraction according to Gakushin method is usually 30 nm or larger, preferably 50 nm or larger, especially preferably 100 nm or larger. The ash content is usually 1 weight % or lower, preferably 0.5 weight % or lower, especially preferably 0.1 weight % or lower.

Desirable surface-covered graphite with amorphous carbon is the following: graphite whose d value (interlayer distance) of the lattice plane (002 plane) obtained by X-ray diffraction is between 0.335-0.338 nm is used as core material, and its surface is coated with carbon material that has a larger d value (interlayer distance) of the lattice plane (002 plane) obtained by X-ray diffraction than the core material. Besides, the proportion of the core material and the carbon material whose d value (interlayer distance) of the lattice plane (002 plane) obtained by X-ray diffraction is larger than that of the core material is between 99/1-80/20 in terms of weight ratio. With the above material, it is possible to produce a negative electrode that has high capacity and hardly reacts with the electrolyte solution.

The particle diameter of the carbonaceous material in terms of median diameter obtained by laser diffraction/scattering method is usually 1 μm or larger, preferably 3 μm or larger, more preferably 5 μm or larger, most preferably 7 μm or larger, and usually 100 μm or smaller, preferably 50 μm or smaller, more preferably 40 μm or smaller, most preferably 30 μm or smaller.

The specific surface area of the carbonaceous material by means of BET method is usually 0.3 $m^2/g$ or larger, preferably 0.5 $m^2/g$ or larger, more preferably 0.7 $m^2/g$ or larger, most preferably 0.8 $m^2/g$ or larger, and usually 25 $m^2/g$ or smaller, preferably 20 $m^2/g$ or smaller, more preferably 15 $m^2/g$ or smaller, most preferably 10 $m^2/g$ or smaller.

When the carbonaceous material is measured by Raman spectrum analysis using argon laser beam, the R value expressed by the ratio of $I_B/I_A$ where $I_A$ represents the intensity of peak $P_A$, which is detected within a range of between 1570-1620 $cm^{-1}$, and $I_B$ represents the intensity of peak $P_B$, which is detected within a range of between 1300-1400 $cm^{-1}$, is preferably within the range of between 0.01-0.7. Also, desirable half-value width of the peak within the range of between 1570-1620 $cm^{-1}$ is usually 26 $cm^{-1}$ or smaller, preferably 25 $cm^{-1}$ or smaller.

Examples of metal compounds capable of absorbing and desorbing lithium are compounds containing metals such as Ag, Al, Ba, Bi, Cu, Ga, Ge, In, Ni, P, Pb, Sb, Si, Sn, Sr, Zn, etc. These metals may be used in any state, such as simple substance, oxide, or lithium alloy. In the present invention, it is preferable to use a compound containing an element selected from Al, Ge, Si and Sn, especially preferable being a oxide or lithium alloy of a metal selected from Al, Si and Sn.

The metal compounds capable of absorbing and desorbing lithium and their oxides and alloys with lithium generally has a larger capacity per unit of weight compared to carbon materials, notably graphite, and is therefore suitable for a lithium secondary battery, which requires higher energy density.

[Production Method of Electrodes]

The electrodes may be produced according to the usual methods. According to one of the methods, the negative electrode or positive electrode active material is combined with binder, thickener, conductive material, solvent, etc., and made into the form of slurry, and the obtained slurry is applied onto a collector and subjected to drying followed by pressing.

As the binder for binding the active material, any material can be used as long as it is stable both to solvent used in the electrode production and to the electrolyte solution. Examples of the binder are fluorine resins such as poly vinylidene fluoride and polytetrafluoroethylene, polyolefins such as polyethylene and polypropylene, unsaturated polymers and their copolymers such as styrene butadiene rubber, isoprene rubber, butadiene rubber, etc., acrylic acid polymers and their copolymers such as ethylene-acrylic acid copolymer, ethylene-methacrylic acid copolymer, etc.

For the sake of improving mechanical strength and electrical conductivity, the electrodes may contain materials such as thickener, conductive material, and filler.

Examples of thickener are carboxylmethyl cellulose, methyl cellulose, hydroxy methyl cellulose, ethyl cellulose, polyvinyl alcohol, oxidized starch, phosphatized starch, and casein.

Examples of conductive material are metal materials, such as copper and nickel, and carbon materials, such as graphite and carbon black.

The active material may be mixed with other materials such as binder and conductive material, and the mixture may be directly roll-molded into a sheet electrode, compression-molded into a pellet electrode, or formed into an electrode-material thin layer on the collector by means of evaporation, spattering, plating, or a like method.

When graphite is used as the negative electrode active material, the density of the negative electrode active material layer after drying and pressing is usually 1.45 g/cm$^3$ or higher, preferably 1.55 g/cm$^3$ or higher, especially preferably 1.60 g/cm$^3$ or higher.

The density of the positive electrode active material layer after drying and pressing is usually 3.0 g/cm$^3$ or higher.

The collector is usually made of a metal or an alloy. Specifically, examples of the negative-electrode collector are copper and its alloys, nickel and its alloys, stainless steel, etc., among which copper and its alloys are preferred. Examples of the positive electrode collector are aluminum, titanium, tantalum, and their alloys, among which aluminum and its alloys are preferred. In order to improve the bindability of its surface to the active material layer formed thereon, the collector surface may preferably undergo roughening processing in advance. Examples of surface roughening methods are: blasting processing; rolling with a rough-surfaced roll; mechanical polishing methods in which the collector surface is polished with an abrasive cloth or paper onto which abradant particles are adhered, a whetstone, an emery buff, a wire brush equipped with steel wires, etc; electropolishing methods; and chemical polishing methods.

Besides, with a view to decrease collector weight and improve energy density per battery weight, it is also possible to use a perforated-type collector such as an expanded metal or a punching metal. This type of collector is freely adjustable in its weight by means of adjusting its perforation rate. Besides, when the active material layer is formed on both sides of this type of collector, the active material layer is riveted at these perforations and becomes resistant to exfoliation. However, if the perforation rate is too high, bond strength may rather decrease because the contact area between the active material layer and the collector becomes too small.

The thickness of the collector is usually 1 μm or larger, preferably 5 μm or larger, and usually 100 μm or smaller, preferably 50 μm or smaller. If it is too thick, the capacity of the whole battery may decrease markedly. On the other hand, if it is too thin, it may be difficult to handle.

[Separator]

In order to prevent the occurrence of a short circuit, a separator is usually interposed between the positive electrode and negative electrode. The separator is usually impregnated with the non-aqueous electrolyte solution of the present invention.

The separator, although not limited particularly in its material or its shape, may preferably be a porous sheet or a non-woven fabric that is excellent in liquid retention and is made of a material stable to the non-aqueous electrolyte solution of the present invention. Examples of the separator material are polyolefins such as polyethylene and polypropylene, as well as polytetrafluoroethylene and polyether sulfone, among which polyolefin is preferred.

The thickness of the separator is usually 1 μm or larger, preferably 5 μm or larger, more preferably 10 μm or larger, and usually 50 μm or smaller, preferably 40 μm or smaller, more preferably 30 μm or smaller. If the separator is too thin, insulation performance and mechanical strength may deteriorate, while if it is too thick, not only battery characteristics such as rate characteristics may deteriorate but also energy density as the whole battery may decline.

The porosity of the separator is usually 20% or higher, preferably 35% or higher, more preferably 45% or higher, and usually 90% or lower, preferably 85% or lower, more preferably 75% or lower. If the porosity is too low, rate characteristics tend to deteriorate due to increase in film resistance. If the porosity is too high, insulation performance tends to decline due to decrease in mechanical strength of the separator.

The average pore diameter of the separator is usually 0.5 μm or smaller, preferably 0.2 μm or smaller, and usually 0.05 μm or larger. Excessively large average pore diameter tends to bring about a short circuit, while excessively small average pore diameter may cause deterioration in rate characteristics due to increase in film resistance.

[Outer Casing]

The outer casing used for the lithium secondary battery of the present invention may be made of any material, examples of which include nickel-plated iron, stainless steel, aluminum and its alloys, nickel, titanium, etc.

EXAMPLES

Hereinafter, the present invention will be explained in further detail with reference to Examples, although the following Examples are used simply for explaining the present invention in detail. The present invention is not limited to the following Examples unless it runs counter to its gist.

Examples/Comparative-Examples Group (Ia)

Procedures explained in each of the following Examples and Comparative Examples were carried out to thereby prepare a non-aqueous electrolyte solution, produce a lithium secondary battery using the resultant non-aqueous electrolyte solution, and evaluate the obtained lithium secondary battery.

Production and evaluation procedures of a lithium secondary battery, which are common to the Examples and the Comparative Examples, are explained in advance.

[Battery Production and Evaluation Procedures]

Production of Negative Electrode:

94 weight parts of natural graphite powder, whose d value of the lattice plane (002 plane) obtained by X-ray diffraction is 0.336 nm, whose crystallite size (Lc) is 652 nm, whose ash content is 0.07 weight %, whose median diameter according to laser diffraction/scattering method is 12 μm, whose specific surface area according to BET method is 7.5 m$^2$/g, whose R value ($=I_B/I_A$) according to Raman spectrum analysis using argon ion laser light 0.12, and whose half-value width of the peak within the range of between 1570-1620 cm$^{-1}$ is 19.9 cm$^{-1}$, was mixed with 6 weight parts of poly vinylidene fluoride and made into the form of slurry under the presence of N-methyl-2-pyrrolidone. Onto a surface of a copper foil with the thickness of 12 μm, the obtained slurry was applied uniformly, dried and pressed in such a manner that the density of the negative electrode active layer be 1.6 g/cm$^3$, thereby a negative electrode being obtained.

Production of Positive Electrode:

85 weight parts of LiCoO$_2$, 6 weight parts of carbon black and 9 weight parts of poly vinylidene fluoride (trade mark "KF-1000", manufactured by Kureha Kagaku Corp.) were mixed together and made into the form of slurry under the presence of N-methyl-2-pyrrolidone. Onto the both surfaces of an aluminum foil with the thickness of 15 μm, the obtained slurry was applied uniformly, dried and pressed in such a manner that the density of the positive electrode active layer be 3.0 g/cm$^3$, thereby a positive electrode being obtained.

Production of Lithium Secondary Battery:

The thus-obtained positive electrode and negative electrodes, together with separators made of polyethylene, were layered in the order of a negative electrode, a separator, a positive electrode, a separator, and a negative electrode, to produce a battery element. The battery element was inserted into a bag formed with laminated film of aluminum (40 μm in thickness), whose both faces were coated with resin layers, with the terminals of the positive electrode and negative electrodes sticking out from the bag. The bag was filled with a non-aqueous electrolyte solution, which was prepared in each of the Examples and Comparative Examples described below, and then vacuum-sealed to produce a sheet-type battery (a lithium secondary battery of each of the Examples and the Comparative Examples).

Capacity Evaluation:

The lithium secondary battery of each of the Examples and the Comparative Examples was sandwiched between glass plates in such a manner that the electrodes were brought into more intimate contact with each other, and subject to the following procedures. At 25° C., the battery was charged with a constant current corresponding to 0.2 C until it reached 4.2 V, and then discharged with 0.2 C constant current until it reached 3 V. The steps were carried out for three cycles to stabilize the battery. In the fourth cycle, the battery was charged with a constant current of 0.5 C until it reached 4.2 V, then charged under 4.2 V constant voltage until the current value reached 0.05 C, and discharged with 0.2 C constant current until it reached 3 V. Thus initial discharging capacity was obtained.

In the description, 1 C represents a current value for discharging a base capacity of the battery in one hour, and 0.2 C represents ⅕ of the current value.

Evaluation of Low-Temperature Cycle Characteristics:

After the capacity evaluation test, the lithium secondary battery was placed at 0° C. and subjected to a cycle test in which the battery was charged with a 0.5 C constant current until it reached 4.2 V, then charged under 4.2 V constant voltage until the current value reached 0.05 C, and discharged with 0.2 C constant current until it reached 3 V. With respect to the discharging capacity at the first cycle, the discharging capacity after the fiftieth cycle was determined on a percentage basis.

Evaluation of Room-Temperature Cycle Characteristics:

Subsequently to the capacity evaluation test, the lithium secondary battery was placed at 25° C. and subjected to a cycle test in which the battery was charged with a 0.5 C constant current until it reached 4.2 V, then charged under 4.2 V constant voltage until the current value reached 0.05 C, and discharged with a 1 C constant current until it reached 3 V. With respect to the discharging capacity before the cycle test, the discharging capacity after the 300th cycle was determined on a percentage basis.

Evaluation of Continuous Charging Characteristics:

After the capacity evaluation test, the lithium secondary battery was submerged in an ethanol bath to measure its volume. The battery was placed at 60° C. and charged with a 0.5 C constant current until it reached 4.25 V, followed by constant voltage charging that continued for one week. The battery was then cooled and submerged in an ethanol bath to measure its volume. Based on the amount of change in volume before and after the continuous charging, the amount of generated gas was determined.

After the measurement of the amount of generated gas, the battery was placed at 25° C. and discharged with 0.2 C constant current until it reached 3 V to thereby obtain residual capacity after the continuous charging test. With respect to the discharging capacity before the continuous charging test, the residual capacity after the continuous charging was determined on a percentage basis.

Example (Ia-1)

In an atmosphere of dry argon, 97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of (methyl) (2-methoxyethyl) carbonate, serving as a compound (Ia). In the resultant mixture, well-dried LiPF$_6$ was dissolved in the proportion of 1.0 mol/liter. Thus, a non-aqueous electrolyte solution (the non-aqueous electrolyte solution of Example (Ia-1)) was prepared. The obtained non-aqueous electrolyte solution was subjected to the aforementioned procedures to thereby produce the lithium secondary battery (the lithium secondary battery of Example (Ia-1)).

Comparative Example (Ia-1)

98 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound. In the resultant mixture, well-dried LiPF$_6$ was dissolved in the proportion of 1.0 mol/liter. Thus, a non-aqueous electrolyte solution (the non-aqueous electrolyte solution of Comparative Example (Ia-1)) was prepared. The obtained non-aqueous electrolyte solution was subjected to the aforementioned procedures to thereby produce the lithium secondary battery (the lithium secondary battery of Comparative Example (Ia-1)).

Comparative Example (Ia-2)

99 weight parts of the mixture of ethylene carbonate, ethyl methyl carbonate, and dimethyl carbonate (2:4:4 in volume ratio) was mixed with one weight part of (methyl)(2-methoxyethyl)carbonate. In the resultant mixture, well-dried LiPF$_6$ was dissolved in the proportion of 1.0 mol/liter. Thus, a non-aqueous electrolyte solution (the non-aqueous electrolyte solution of Comparative Example (Ia-2)) was prepared. The obtained non-aqueous electrolyte solution was subjected to the aforementioned procedures to thereby produce the lithium secondary battery (the lithium secondary battery of Comparative Example (Ia-2)).

Comparative Example (Ia-3)

In the mixture of ethylene carbonate, ethyl methyl carbonate, and dimethyl carbonate (2:4:4 in volume ratio), well-dried LiPF$_6$ was dissolved in the proportion of 1.0 mol/liter. Thus, a non-aqueous electrolyte solution (the non-aqueous electrolyte solution of Comparative Example (Ia-3)) was prepared. The obtained non-aqueous electrolyte solution was subjected to the aforementioned procedures to thereby produce the lithium secondary battery (the lithium secondary battery of Comparative Example (Ia-3)).

Example (Ia-2)

96 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 2 weight parts of (methyl)(2-methoxyethyl)carbonate, serving as a compound (Ia). In the resultant mixture, well-dried LiPF$_6$ was dissolved in the proportion of 1.0 mol/liter. Thus, a non-aqueous electrolyte solution (the non-aqueous electrolyte solution of Example (Ia-2)) was prepared. The obtained non-aqueous electrolyte solution was subjected to the aforementioned procedures to thereby produce the lithium secondary battery (the lithium secondary battery of Example (Ia-2)).

Example (Ia-3)

97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of bis(2-methoxyethyl)carbonate, serving as a compound (Ia). In the resultant mixture, well-dried LiPF$_6$ was dissolved in the proportion of 1.0 mol/liter. Thus, a non-aqueous electrolyte solution (the non-aqueous electrolyte solution of Example (Ia-3)) was prepared. The obtained non-aqueous electrolyte solution was subjected to the aforementioned procedures to thereby produce the lithium secondary battery (the lithium secondary battery of Example (Ia-3)).

[Evaluation Results of Batteries]

The lithium secondary batteries of Examples (Ia-1)-(Ia-3) and Comparative Examples (Ia-1)-(Ia-3) obtained according to the aforementioned procedures were subjected to the evaluation of low-temperature and room-temperature cycle characteristics and the evaluation of continuous charging characteristics. The evaluation results are shown in Tables (Ia-1)-(Ia-3).

TABLE 1

Table (Ia-1)

| | Compound (Ia) | | Unsaturated Cyclic Carbonate Compound | |
|---|---|---|---|---|
| | Selection | Mixed Amount (weight part) | Selection | Mixed Amount (weight part) |
| Example (Ia-1) | H$_3$C-O-C(=O)-O-CH$_2$-C(H$_2$)-O-CH$_3$ | 1 | Vinylene Carbonate | 2 |
| Comparative Example (Ia-1) | — | — | Vinylene Carbonate | 2 |
| Comparative Example (Ia-2) | H$_3$C-O-C(=O)-O-CH$_2$-C(H$_2$)-O-CH$_3$ | 1 | — | — |
| Comparative Example (Ia-3) | — | — | — | — |
| Example (Ia-2) | H$_3$C-O-C(=O)-O-CH$_2$-C(H$_2$)-O-CH$_3$ | 2 | Vinylene Carbonate | 2 |

TABLE 1-continued

Table (Ia-1)

| | Compound (Ia) | | Unsaturated Cyclic Carbonate Compound | |
|---|---|---|---|---|
| | Selection | Mixed Amount (weight part) | Selection | Mixed Amount (weight part) |
| Example (Ia-3) | H₃C-O-CH₂-CH₂-O-C(=O)-O-CH₂-CH₂-O-CH₃ | 1 | Vinylene Carbonate | 2 |

TABLE (Ia-2)

| | Low-Temperature Cycle Characteristics (%) | Room-Temperature Cycle Characteristics (%) |
|---|---|---|
| Example (Ia-1) | 95 | 89 |
| Comparative Example (Ia-1) | 87 | 88 |
| Comparative Example (Ia-2) | 94 | 80 |
| Comparative Example (Ia-3) | 94 | 79 |
| Example (Ia-2) | 95 | 88 |
| Example (Ia-3) | 94 | 88 |

TABLE (Ia-3)

| | Amount of Generated Gas (ml) | Residual Capacity after Continuous Charging (%) |
|---|---|---|
| Example (Ia-1) | 0.48 | 96 |
| Comparative Example (Ia-1) | 0.76 | 89 |
| Comparative Example (Ia-3) | 0.46 | 88 |

As is evident from Tables (Ia-1), (Ia-2), the lithium secondary batteries of Examples (Ia-1)-(Ia-3) are superior in cycle characteristics even at low temperature while maintaining high cycle characteristics at room temperature, compared with the lithium secondary batteries of Comparative Examples (Ia-1)-(Ia-3).

Besides, as is evident from Table (Ia-3), the lithium secondary batteries of Examples (Ia-1)-(Ia-3) generate little amount of gas during continuous charging and are superior in battery characteristics after continuous charging, compared with the lithium secondary batteries of Comparative Examples (Ia-1)-(Ia-3).

Consequently, according to the definitions of the present invention, as the lithium secondary batteries of Examples (Ia-1)-(Ia-3), it is clearly possible to produce a battery that exhibits excellent cycle characteristics both at room temperature and at low temperature, is stable under high-temperature, high-voltage conditions, and is also excellent in storage characteristics.

Examples/Comparative-Examples Group (Ib)

Procedures explained in each of the following Examples and Comparative Examples were carried out to thereby prepare a non-aqueous electrolyte solution, produce a lithium secondary battery using the resultant non-aqueous electrolyte solution, and evaluate the obtained lithium secondary battery.

Production and evaluation procedures of a lithium secondary battery, which are common to the Examples and the Comparative Examples, are explained in advance.

[Battery Production and Evaluation Procedures]

Production of Negative Electrode:

94 weight parts of natural graphite powder, whose d value of the lattice plane (002 plane) obtained by X-ray diffraction is 0.336 nm, whose crystallite size (Lc) is 652 nm, whose ash content is 0.07 weight %, whose median diameter according to laser diffraction/scattering method is 12 μm, whose specific surface area according to BET method is 7.5 m²/g, whose R value ($=I_B/I_A$) according to Raman spectrum analysis using argon ion laser light 0.12, and whose half-value width of the peak within the range of between 1570-1620 cm$^{-1}$ is 19.9 cm$^{-1}$, was mixed with 6 weight parts of poly vinylidene fluoride and made into the form of slurry under the presence of N-methyl-2-pyrrolidone. Onto a surface of a copper foil with the thickness of 12 μm, the obtained slurry was applied uniformly, dried and pressed in such a manner that the density of the negative electrode active layer be 1.6 g/cm³, thereby a negative electrode being obtained.

Production of Positive Electrode:

85 weight parts of LiCoO₂, 6 weight parts of carbon black and 9 weight parts of poly vinylidene fluoride (trade mark "KF-1000", manufactured by Kureha Kagaku Corp.) were mixed together and made into the form of slurry under the presence of N-methyl-2-pyrrolidone.

Onto the both surfaces of an aluminum foil with the thickness of 15 μm, the obtained slurry was applied uniformly, dried and pressed in such a manner that the density of the positive electrode active layer be 3.0 g/cm³, thereby a positive electrode being obtained.

Production of Lithium Secondary Battery:

The thus-obtained positive electrode and negative electrodes, together with separators made of polyethylene, were layered in the order of a negative electrode, a separator, a positive electrode, a separator, and a negative electrode, to produce a battery element. The battery element was inserted into a bag formed with laminated film of aluminum (40 μm in thickness), whose both faces were coated with resin layers, with the terminals of the positive electrode and negative electrodes sticking out from the bag. The bag was filled with a non-aqueous electrolyte solution, which was prepared in each of the Examples and Comparative Examples described below, and then vacuum-sealed to produce a sheet-type battery (a lithium secondary battery of each of the Examples and the Comparative Examples).

Capacity Evaluation:

The lithium secondary battery of each of the Examples and the Comparative Examples was sandwiched between glass plates in such a manner that the electrodes were brought into more intimate contact with each other, and subject to the following procedures. At 25° C., the battery was charged with a constant current corresponding to 0.2 C until it reached 4.2 V, and then discharged with 0.2 C constant current until it reached 3V. The steps were carried out for three cycles to stabilize the battery. In the fourth cycle, the battery was charged with a constant current of 0.5 C until it reached 4.2 V, then charged under 4.2 V constant voltage until the current value reached 0.05 C, and discharged with 0.2 C constant current until it reached 3 V. Thus initial discharging capacity was obtained.

In the description, 1 C represents a current value for discharging a base capacity of the battery in one hour, and 0.2 C represents ⅕ of the current value.

Evaluation of Continuous Charging Characteristics:

After the capacity evaluation test, the lithium secondary battery was submerged in an ethanol bath to measure its volume. The battery was placed at 60° C. and charged with a 0.5 C constant current until it reached 4.25 V, followed by constant voltage charging that continued for one week.

The battery was then cooled and submerged in an ethanol bath to measure its volume. Based on the amount of change in volume before and after the continuous charging, the amount of generated gas was determined.

After the measurement of the amount of gas generation, the battery was placed at 25° C. and discharged with 0.2 C constant current until it reached 3 V to thereby obtain residual capacity after the continuous charging test. With respect to the discharging capacity before the continuous charging test, the residual capacity after the continuous charging was determined on a percentage basis.

Evaluation of High-Temperature-Storage Characteristics:

After the capacity evaluation test, the lithium secondary battery was charged with a 0.5 C constant current until it reached 4.2 V, and then charged under 4.2 V constant voltage until the current value reached 0.05 C, followed by storage at 85° C. for 3 days. Subsequently, the battery was well-cooled to 25° C. and subjected to discharging with 0.2 C constant current until it reached 3 V to thereby obtain residual capacity after the storage test. With respect to the discharging capacity before the storage test, the residual capacity after the storage test was determined on a percentage basis.

Evaluation of Cycle Characteristics:

After the capacity evaluation test, the lithium secondary battery was placed at 25° C. and subjected to a cycle test in which the battery was charged with a 0.5 C constant current until it reached 4.2 V, then charged under 4.2 V constant voltage until the current value reached 0.05 C, and discharged with a 1 C constant current until it reached 3 V. With respect to the discharging capacity before the cycle test, the discharging capacity after the 300th cycle was determined on a percentage basis.

Example (Ib-1)

In an atmosphere of dry argon, 96 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 2 weight parts of methane sulfonyl fluoride, serving as a compound (Ib). In the resultant mixture, well-dried $LiPF_6$ was dissolved in the proportion of 1.0 mol/liter. Thus, a non-aqueous electrolyte solution (the non-aqueous electrolyte solution of Example (Ib-1)) was prepared. The obtained non-aqueous electrolyte solution was subjected to the aforementioned procedures to thereby produce the lithium secondary battery (the lithium secondary battery of Example (Ib-1)).

Example (Ib-2)

In an atmosphere of dry argon, 97 weight parts the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of methane sulfonyl fluoride, serving as a compound (Ib). In the resultant mixture, well-dried $LiPF_6$ was dissolved in the proportion of 1.0 mol/liter. Thus, a non-aqueous electrolyte solution (the non-aqueous electrolyte solution of Example (Ib-2)) was prepared. The obtained non-aqueous electrolyte solution was subjected to the aforementioned procedures to thereby produce the lithium secondary battery (the lithium secondary battery of Example (Ib-2)).

Example (Ib-3)

In an atmosphere of dry argon, 97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of ethane sulfonyl fluoride, serving as a compound (Ib). In the resultant mixture, well-dried $LiPF_6$ was dissolved in the proportion of 1.0 mol/liter. Thus, a non-aqueous electrolyte solution (the non-aqueous electrolyte solution of Example (Ib-3)) was prepared. The obtained non-aqueous electrolyte solution was subjected to the aforementioned procedures to thereby produce the lithium secondary battery (the lithium secondary battery of Example (Ib-3)).

Example (Ib-4)

In an atmosphere of dry argon, 97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of propane sulfonyl fluoride, serving as a compound (Ib). In the resultant mixture, well-dried $LiPF_6$ was dissolved in the proportion of 1.0 mol/liter. Thus, a non-aqueous electrolyte solution (the non-aqueous electrolyte solution of Example (Ib-4)) was prepared. The obtained non-aqueous electrolyte solution was subjected to the aforementioned procedures to thereby produce the lithium secondary battery (the lithium secondary battery of Example (Ib-4)).

Example (Ib-5)

In an atmosphere of dry argon, 97.5 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 0.5 weight part of methane sulfonyl fluoride, serving as a compound (Ib). In the resultant mixture, well-dried $LiPF_6$ was dissolved in the proportion of 1.0 mol/liter. Thus, a non-aqueous electrolyte solution (the non-aqueous electrolyte solution of Example (Ib-5)) was prepared. The obtained non-aqueous electrolyte solution was subjected to the aforementioned procedures to thereby produce the lithium secondary battery (the lithium secondary battery of Example (Ib-5)).

Comparative Example (Ib-1)

98 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound. In the resultant mixture, well-dried $LiPF_6$ was dissolved in the proportion of 1.0 mol/liter. Thus, a non-aqueous electrolyte solution (the non-aqueous electrolyte solution of Comparative Example (Ib-1)) was prepared. The obtained non-aqueous electrolyte solution was subjected to the aforementioned procedures to thereby produce the lithium secondary battery (the lithium secondary battery of Comparative Example (Ib-1)).

Comparative Example (Ib-2)

96 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 2 weight parts of benzene sulfonyl fluoride as an additive. In the resultant mixture, well-dried $LiPF_6$ was dissolved in the proportion of 1.0 mol/liter. Thus, a non-aqueous electrolyte solution (the non-aqueous electrolyte solution of Comparative Example (Ib-2)) was prepared. The obtained non-aqueous electrolyte solution was subjected to the aforementioned procedures to thereby produce the lithium secondary battery (the lithium secondary battery of Comparative Example (Ib-2)).

Comparative Example (Ib-3)

96 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 2 weight parts of p-toluene sulfonyl fluoride as an additive. In the resultant mixture, well-dried $LiPF_6$ was dissolved in the proportion of 1.0 mol/liter. Thus, a non-aqueous electrolyte solution (the non-aqueous electrolyte solution of Comparative Example (Ib-3)) was prepared. The obtained non-aqueous electrolyte solution was subjected to the aforementioned procedures to thereby produce the lithium secondary battery (the lithium secondary battery of Comparative Example (Ib-3)).

Comparative Example (Ib-4)

In an atmosphere of dry argon, 98 weight parts of the mixture of ethylene carbonate, ethyl methyl carbonate, and dimethyl carbonate (2:4:4 in volume ratio) was mixed with 2 weight parts of methane sulfonyl fluoride, serving as a compound (Ib). In the resultant mixture, well-dried $LiPF_6$ was dissolved in the proportion of 1.0 mol/liter. Thus, a non-aqueous electrolyte solution (the non-aqueous electrolyte solution of Comparative Example (Ib-4)) was prepared. The obtained non-aqueous electrolyte solution was subjected to the aforementioned procedures to thereby produce the lithium secondary battery (the lithium secondary battery of Comparative Example (Ib-4)).

[Evaluation Results of Batteries]

The lithium secondary batteries of Examples (Ib-1)-(Ib-5) and Comparative Examples (Ib-1)-(Ib-4) obtained according to the aforementioned procedures were subjected to the evaluation of continuous charging characteristics, high-temperature-storage characteristics, and cycle characteristics. The evaluation results are shown in Table (Ib-1) and Table (Ib-2).

TABLE 4

Table (Ib-1)

| Selection | Compound (Ib) or Additive | Mixed Amount (weight part) | Cyclic Carbonate Compound with Unsaturated Bond (weight part) |
|---|---|---|---|
| Example (Ib-1) | $CH_3$—$SO_2F$ | 2 | 2 |
| Example (Ib-2) | $CH_3$—$SO_2F$ | 1 | 2 |
| Example (Ib-3) | $C_2H_5$—$SO_2F$ | 1 | 2 |
| Example (Ib-4) | $C_3H_7$—$SO_2F$ | 1 | 2 |
| Example (Ib-5) | $CH_3$—$SO_2F$ | 0.5 | 2 |
| Comparative Example (Ib-1) | — | 0 | 2 |
| Comparative Example (Ib-2) | 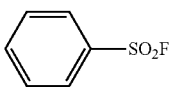 | 2 | 2 |
| Comparative Example (Ib-3) | 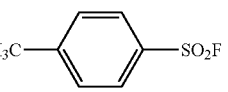 | 2 | 2 |
| Comparative Example (Ib-4) | $CH_3$—$SO_2F$ | 2 | 0 |

TABLE (Ib-2)

| | Amount of Generated Gas (ml) | Residual Capacity after Continuous Charging(%) | Residual Capacity after High-Temperature Storage (%) | Cycle Characteristics (%) |
|---|---|---|---|---|
| Example (Ib-1) | 0.59 | 96 | 80 | 88 |
| Example (Ib-2) | 0.60 | 96 | 80 | 89 |
| Example (Ib-3) | 0.57 | 95 | 81 | 89 |
| Example (Ib-4) | 0.55 | 95 | 82 | — |
| Example (Ib-5) | 0.60 | 95 | 79 | — |
| Comparative Example (Ib-1) | 0.76 | 89 | 75 | 88 |
| Comparative Example (Ib-2) | 0.73 | 88 | 67 | — |
| Comparative Example (Ib-3) | 1.28 | 83 | 63 | — |
| Comparative Example (Ib-4) | 0.52 | 90 | 73 | 79 |

As is evident from Table (Ib-1) and Table (Ib-2), the lithium secondary batteries of Examples (Ib-1)-(Ib-5) generate little amount of gas during continuous charging and are superior in battery characteristics after continuous charging, battery characteristics after high-temperature storage, and cycle characteristics, compared with the lithium secondary batteries of Comparative Examples (Ib-1)-(Ib-4).

Examples/Comparative-Examples Group (Ic)

Procedures explained in each of the following Examples and Comparative Examples were carried out to thereby prepare a non-aqueous electrolyte solution, produce a lithium secondary battery using the resultant non-aqueous electrolyte solution, and evaluate the obtained lithium secondary battery.

Production and evaluation procedures of a lithium secondary battery, which are common to the Examples and the Comparative Examples, are explained in advance.

[Battery Production and Evaluation Procedures]

85 weight parts of LiCoO$_2$, 6 weight parts of carbon black and 9 weight parts of poly vinylidene fluoride (trade mark "KF-1000", manufactured by Kureha Kagaku Corp.) were mixed together and made into the form of slurry under the presence of N-methyl-2-pyrrolidone. Onto the both faces of an aluminum foil with the thickness of 15 µm, the obtained slurry was applied uniformly, dried and pressed in such a manner that the density of the positive electrode active layer be 3.0 g/cm$^3$, thereby a positive electrode being obtained.

Production of Negative Electrode:

94 weight parts of natural graphite powder, whose d value of the lattice plane (002 plane) obtained by X-ray diffraction is 0.336 nm, whose crystallite size (Lc) is 652 nm, whose ash content is 0.07 weight %, whose median diameter according to laser diffraction/scattering method is 12 µm, whose specific surface area according to BET method is 7.5 m$^2$/g, whose R value ($=I_B/I_A$) according to Raman spectrum analysis using argon ion laser light 0.12, and whose half-value width of the peak within the range of between 1570-1620 cm$^{-1}$ is 19.9 cm$^{-1}$, was mixed with 6 weight parts of poly vinylidene fluoride and made into the form of slurry under the presence of N-methyl-2-pyrrolidone. Onto a surface of a copper foil with the thickness of 12 µm, the obtained slurry was applied uniformly, dried and pressed in such a manner that the density of the negative electrode active layer be 1.6 g/cm$^3$, thereby a negative electrode being obtained.

Production of Lithium Secondary Battery:

The thus-obtained positive electrode and negative electrodes, together with separators made of polyethylene, were layered in the order of a negative electrode, a separator, a positive electrode, a separator, and a negative electrode, to produce a battery element. The battery element was inserted into a bag formed with laminated film of aluminum (40 µm in thickness), whose both faces were coated with resin layers, with the terminals of the positive electrode and negative electrodes sticking out from the bag. The bag was filled with a non-aqueous electrolyte solution, which was prepared in each of the Examples and Comparative Examples described below, and then vacuum-sealed to produce a sheet-type battery (a lithium secondary battery of each of the Examples and the Comparative Examples).

[Initial Evaluation]

The lithium secondary battery of each of the Examples and the Comparative Examples was sandwiched between glass plates in such a manner that the electrodes were brought into more intimate contact with each other, and subject to the following procedures. At 25° C., the battery was charged with a constant current corresponding to 0.2 C until it reached 4.2 V, and then discharged with 0.2 C constant current until it reached 3 V. The steps were carried out for three cycles to stabilize the battery. In the description, 1 C represents a current value for discharging a base capacity of the battery in one hour, and 0.2 C represents ⅕ of the current value. Subsequently, the volume of the battery was measured according to Archimedes' method.

[Evaluation of Continuous Charging Characteristics]

After the initial evaluation, the lithium secondary battery was continuously charged under 4.3 V constant voltage for 7 days while kept at the constant temperature of 60° C. After the battery was well-cooled naturally, the battery volume after continuous charging was measured according to Archimedes' method, and the variation from the battery volume at the initial evaluation was obtained as a gas amount during continuous charging. Reducing the gas amount enables the design of a battery in which the occurrence of swelling during continuous charging is inhibited. Subsequently, the battery was discharged with 0.2 C constant current until it reached 3 V, then charged with a 0.5 C constant current until it reached 4.2 V, and charged under 4.2 V constant voltage until the current value reached 0.05 C. The battery was then discharged with a 1 C constant current until it reached 3 V to obtain a capacity in 1 C discharging after continuous charging. Increasing the capacity in 1 C discharging enables the design of a battery in which degradation is inhibited.

Example (Ic-1)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (7) (additive B1). To the resultant mixture, well-dried LiPF$_6$ was added as an electrolyte in the proportion of 1.0 mol/liter and dissolved. Thus, a non-aqueous electrolyte solution (the non-aqueous electrolyte solution of Example (Ic-1)) was prepared. The obtained non-aqueous electrolyte solution was subjected to the aforementioned procedures to thereby produce the lithium secondary battery (the lithium secondary battery of Example (Ic-1)).

Example (Ic-2)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (8) (additive B2). To the resultant mixture, well-dried LiPF$_6$ was added as an electrolyte in the proportion of 1.0 mol/liter and dissolved. Thus, a non-aqueous electrolyte solution (the non-aqueous electrolyte solution of Example (Ic-2)) was prepared. The obtained non-aqueous electrolyte solution was subjected to the aforementioned procedures to thereby produce the lithium secondary battery (the lithium secondary battery of Example (Ic-2)).

Example (Ic-3)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (11) (additive B3). To the resultant mixture, well-dried LiPF$_6$ was added as an electrolyte in the proportion of 1.0 mol/liter and dissolved. Thus, a non-aqueous electrolyte solution (the non-aqueous electrolyte solution of Example (Ic-3)) was prepared. The obtained non-aqueous electrolyte solution was subjected to the aforementioned procedures to thereby produce the lithium secondary battery (the lithium secondary battery of Example (Ic-3)).

Example (Ic-4)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (12) (additive B4). To the resultant mixture, well-dried $LiPF_6$ was added as an electrolyte in the proportion of 1.0 mol/liter and dissolved. Thus, a non-aqueous electrolyte solution (the non-aqueous electrolyte solution of Example (Ic-4)) was prepared. The obtained non-aqueous electrolyte solution was subjected to the aforementioned procedures to thereby produce the lithium secondary battery (the lithium secondary battery of Example (Ic-4)).

Example (Ic-5)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (13) (additive B5). To the resultant mixture, well-dried $LiPF_6$ was added as an electrolyte in the proportion of 1.0 mol/liter and dissolved. Thus, a non-aqueous electrolyte solution (the non-aqueous electrolyte solution of Example (Ic-5)) was prepared. The obtained non-aqueous electrolyte solution was subjected to the aforementioned procedures to thereby produce the lithium secondary battery (the lithium secondary battery of Example (Ic-5)).

Example (Ic-6)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (19) (additive B6). To the resultant mixture, well-dried $LiPF_6$ was added as an electrolyte in the proportion of 1.0 mol/liter and dissolved. Thus, a non-aqueous electrolyte solution (the non-aqueous electrolyte solution of Example (Ic-6)) was prepared. The obtained non-aqueous electrolyte solution was subjected to the aforementioned procedures to thereby produce the lithium secondary battery (the lithium secondary battery of Example (Ic-6)).

Example (Ic-7)

In an atmosphere of dry argon, 975 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound, and then combined with 5 weight parts of the compound expressed by the aforementioned chemical formula (20) (additive B7). To the resultant mixture, well-dried $LiPF_6$ was added as an electrolyte in the proportion of 1.0 mol/liter and dissolved. Thus, a non-aqueous electrolyte solution (the non-aqueous electrolyte solution of Example (Ic-7)) was prepared. The obtained non-aqueous electrolyte solution was subjected to the aforementioned procedures to thereby produce the lithium secondary battery (the lithium secondary battery of Example (Ic-7)).

Comparative Example (Ic-1)

In an atmosphere of dry argon, the mixture of ethylene carbonate and ethyl methyl carbonate (1:2 in volume ratio), serving as non-aqueous solvents, was mixed with well-dried $LiPF_6$ as an electrolyte in the proportion of 1.0 mol/liter and dissolved. Thus, a non-aqueous electrolyte solution (the non-aqueous electrolyte solution of Comparative Example (Ic-1)) was prepared. The obtained non-aqueous electrolyte solution was subjected to the aforementioned procedures to thereby produce the lithium secondary battery (the lithium secondary battery of Comparative Example (Ic-1)).

Comparative Example (Ic-2)

In an atmosphere of dry argon, 980 weight parts of the mixture of ethylene carbonate and ethyl methyl carbonate (1:2 in volume ratio), serving as non-aqueous solvents, was mixed with 20 weight parts of vinylene carbonate (VC), serving as an unsaturated cyclic carbonate compound. To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-2)) was prepared. The obtained non-aqueous electrolyte solution was subjected to the aforementioned procedures to thereby produce the lithium secondary battery (the lithium secondary battery of Comparative Example (Ic-2)).

Comparative Example (Ic-3)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (7) (additive B1). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-3)) was prepared. The obtained non-aqueous electrolyte solution was subjected to the aforementioned procedures to thereby produce the lithium secondary battery (the lithium secondary battery of Comparative Example (Ic-3)).

Comparative Example (Ic-4)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (8) (additive B2). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-4)) was prepared. The obtained non-aqueous electrolyte solution was subjected to the aforementioned procedures to thereby produce the lithium secondary battery (the lithium secondary battery of Comparative Example (Ic-4)).

Comparative Example (Ic-5)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (II) (additive B3). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-5)) was prepared. The obtained non-aqueous electrolyte solution was subjected to the aforementioned procedures to thereby produce the lithium secondary battery (the lithium secondary battery of Comparative Example (Ic-5)).

Comparative Example (Ic-6)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (12) (additive B4). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-6)) was prepared. The obtained non-aqueous electrolyte solution was subjected to the aforementioned procedures to thereby produce the lithium secondary battery (the lithium secondary battery of Comparative Example (Ic-6)).

Comparative Example (Ic-7)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (13) (additive B5). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-7)) was prepared. The obtained non-aqueous electrolyte solution was subjected to the aforementioned procedures to thereby produce the lithium secondary battery (the lithium secondary battery of Comparative Example (Ic-7)).

Comparative Example (Ic-8)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (19) (additive B6). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-8)) was prepared. The obtained non-aqueous electrolyte solution was subjected to the aforementioned procedures to thereby produce the lithium secondary battery (the lithium secondary battery of Comparative Example (Ic-8)).

Comparative Example (Ic-9)

In an atmosphere of dry argon, 995 weight parts of the mixture of ethylene carbonate and ethyl methyl carbonate (1:2 in volume ratio), serving as non-aqueous solvents, was mixed with 5 weight parts of the compound expressed by the aforementioned chemical formula (20) (additive B7). To the resultant mixture, well-dried $LiPF_6$ was added as an electrolyte in the proportion of 1.0 mol/liter and dissolved. Thus, a non-aqueous electrolyte solution (the non-aqueous electrolyte solution of Comparative Example (Ic-9)) was prepared. The obtained non-aqueous electrolyte solution was subjected to the aforementioned procedures to thereby produce the lithium secondary battery (the lithium secondary battery of Comparative Example (Ic-9)).

[Evaluation Results of Batteries]

The lithium secondary batteries of Examples (Ic-1)-(Ic-7) and Comparative Examples (Ic-1)-(Ic-9) obtained according to the aforementioned procedures were subjected to the evaluation of continuous charging characteristics. The evaluation results are shown in the following Tables (Ic-1)-(Ic-7).

TABLE (Ic-1)

(Effects of Combined Use of VC and Additive B1)

|  |  | Comparative Example (Ic-1) | Comparative Example (Ic-2) | Comparative Example (Ic-3) | Example (Ic-1) |
|---|---|---|---|---|---|
| Ingredients | Unsaturated Cyclic Carbonate Compound | None | VC | None | VC |
|  | Compound (Ic) | None | None | Additive B1 | Additive B1 |
| Results | 1C after Continuous Charging (mAh/g) | 33 | 28 | 10 | 63 |
|  | Gas after Continuous Charging (ml) | 0.43 | 0.49 | 0.11 | 0.34 |

TABLE (Ic-2)

(Effects of Combined Use of VC and Additive B2)

|  |  | Comparative Example (Ic-1) | Comparative Example (Ic-2) | Comparative Example (Ic-4) | Example (Ic-2) |
|---|---|---|---|---|---|
| Ingredients | Cyclic Carbonate Compound with Unsaturated Bond | None | VC | None | VC |
|  | Compound (Ic) | None | None | Additive B2 | Additive B2 |

TABLE (Ic-2)-continued (Effects of Combined Use of VC and Additive B2)

|  |  | Comparative Example (Ic-1) | Comparative Example (Ic-2) | Comparative Example (Ic-4) | Example (Ic-2) |
|---|---|---|---|---|---|
| Results | 1C after Continuous Charging (mAh/g) | 33 | 28 | 22 | 41 |
|  | Gas after Continuous Charging (ml) | 0.43 | 0.49 | 0.17 | 0.39 |

TABLE (Ic-3)

(Effects of Combined Use of VC and Additive B3)

|  |  | Comparative Example (Ic-1) | Comparative Example (Ic-2) | Comparative Example (Ic-5) | Example (Ic-3) |
|---|---|---|---|---|---|
| Ingredients | Cyclic Carbonate Compound with Unsaturated Bond | None | VC | None | VC |
|  | Compound (Ic) | None | None | Additive B3 | Additive B3 |
| Results | 1C after Continuous Charging (mAh/g) | 33 | 28 | 7 | 71 |
|  | Gas after Continuous Charging (ml) | 0.43 | 0.49 | 0.19 | 0.27 |

TABLE (Ic-4)

(Effects of Combined Use of VC and Additive B4)

|  |  | Comparative Example (Ic-1) | Comparative Example (Ic-2) | Comparative Example (Ic-6) | Example (Ic-4) |
|---|---|---|---|---|---|
| Ingredients | Cyclic Carbonate Compound with Unsaturated Bond | None | VC | None | VC |
|  | Compound (Ic) | None | None | Additive B4 | Additive B4 |
| Results | 1C after Continuous Charging (mAh/g) | 33 | 28 | 27 | 74 |
|  | Gas after Continuous Charging (ml) | 0.43 | 0.49 | 0.22 | 0.39 |

TABLE (Ic-5)

(Effects of Combined Use of VC and Additive B5)

|  |  | Comparative Example (Ic-1) | Comparative Example (Ic-2) | Comparative Example (Ic-7) | Example (Ic-5) |
|---|---|---|---|---|---|
| Ingredients | Cyclic Carbonate Compound with Unsaturated Bond | None | VC | None | VC |
|  | Compound (Ic) | None | None | Additive B5 | Additive B5 |
| Results | 1C after Continuous Charging (mAh/g) | 33 | 28 | 12 | 66 |
|  | Gas after Continuous Charging (ml) | 0.43 | 0.49 | 0.26 | 0.38 |

TABLE (Ic-6)

(Effects of Combined Use of VC and Additive B6)

|   |   | Comparative Example (Ic-1) | Comparative Example (Ic-2) | Comparative Example (Ic-8) | Example (Ic-6) |
|---|---|---|---|---|---|
| Ingredients | Cyclic Carbonate Compound with Unsaturated Bond | None | VC | None | VC |
|   | Compound (Ic) | None | None | Additive B6 | Additive B6 |
| Results | 1C after Continuous Charging (mAh/g) | 33 | 28 | 14 | 84 |
|   | Gas after Continuous Charging (ml) | 0.43 | 0.49 | 0.18 | 0.41 |

TABLE (Ic-7)

(Effects of Combined Use of VC and Additive B7)

|   |   | Comparative Example (Ic-1) | Comparative Example (Ic-2) | Comparative Example (Ic-9) | Example (Ic-7) |
|---|---|---|---|---|---|
| Ingredients | Cyclic Carbonate Compound with Unsaturated Bond | None | VC | None | VC |
|   | Compound (Ic) | None | None | Additive B7 | Additive B7 |
| Results | 1C after Continuous Charging (mAh/g) | 33 | 28 | 6 | 42 |
|   | Gas after Continuous Charging (ml) | 0.43 | 0.49 | 0.16 | 0.39 |

The following findings are derived from Table (Ic-1).

As in Comparative Example (Ic-2), the use of VC increases the gas amount after continuous charging, compared to Comparative Example (Ic-1) in which VC was not used. This is presumably because VC is vulnerable to oxidation. As the result, the addition of VC decreases the 1 C capacity after continuous charging.

Also, as in Comparative Example (Ic-3), the use of additive B1 (the compound expressed by chemical formula (7)) inhibits the gas amount after continuous charging, compared to Comparative Example (Ic-1) in which additive B1 was not used. This is presumably because additive B1 inhibits the decomposition of the electrolyte solution. On the other hand, the 1C capacity after continuous charging decreases. This is presumably because the coating formed increases its resistance.

Consequently, when either A ingredient or B ingredient is used singly, battery characteristics may deteriorate.

In contrast to this, as in Example (Ic-1), the concurrent use of A ingredient and B ingredient dramatically improves 1C capacity after continuous charging, compared with Comparative Examples (Ic-1)-(Ic-3). This is presumably because B ingredient inhibits the decomposition of A ingredient while the coating formed from A ingredient inhibits the formation of coating from B ingredient, as a result of which the battery becomes stable even during continuous charging.

It is also apparent from Tables (Ic-2)-(Ic-7), as Table (Ic-1), that the single use of either A ingredient or B ingredient worsens characteristics while the combined use of these ingredients dramatically improves 1C capacity after continuous charging.

Examples/Comparative-Examples Group (IIa)

Procedures explained in each of the following Examples and Comparative Examples were carried out to thereby prepare a non-aqueous electrolyte solution, produce a lithium secondary battery using the resultant non-aqueous electrolyte solution, and evaluate the obtained lithium secondary battery.

Production and evaluation procedures of a lithium secondary battery, which are common to the Examples and the Comparative Examples, are explained in advance.

[Battery Production and Evaluation Procedures]

Production of Negative Electrode:

94 weight parts of natural graphite powder, whose d value of the lattice plane (002 plane) obtained by X-ray diffraction is 0.336 nm, whose crystallite size (Lc) is 652 nm, whose ash content is 0.07 weight %, whose median diameter according to laser diffraction/scattering method is 12 µm, whose specific surface area according to BET method is 7.5 m$^2$/g, whose R value ($=I_B/I_A$) according to Raman spectrum analysis using argon ion laser light 0.12, and whose half-value width of the peak within the range of between 1570-1620 cm$^{-1}$ is 19.9 cm$^{-1}$, was mixed with 6 weight parts of poly vinylidene fluoride and made into the form of slurry under the presence of N-methyl-2-pyrrolidone. Onto a surface of a copper foil with the thickness of 12 µm, the obtained slurry was applied uniformly, dried and pressed in such a manner that the density of the negative electrode active layer be 1.6 g/cm$^3$, thereby a negative electrode being obtained.

Production of Positive Electrode:

85 weight parts of LiCoO$_2$, 6 weight parts of carbon black and 9 weight parts of poly vinylidene fluoride (trade mark "KF-1000", manufactured by Kureha Kagaku Corp.) were mixed together and made into the form of slurry under the presence of N-methyl-2-pyrrolidone. Onto the both surfaces of an aluminum foil with the thickness of 15 µm, the obtained slurry was applied uniformly, dried and pressed in such a manner that the density of the positive electrode active layer be 3.0 g/cm$^3$, thereby a positive electrode being obtained.

Production of Lithium Secondary Battery:

The thus-obtained positive electrode and negative electrodes, together with separators made of polyethylene, were layered in the order of a negative electrode, a separator, a positive electrode, a separator, and a negative electrode, to produce a battery element. The battery element was inserted into a bag formed with laminated film of aluminum (40 µm in thickness), whose both faces were coated with resin layers, with the terminals of the positive electrode and negative electrodes sticking out from the bag. The bag was filled with a non-aqueous electrolyte solution, which was prepared in each of the Examples and Comparative Examples described below, and then vacuum-sealed to produce a sheet-type battery (a lithium secondary battery of each of the Examples and the Comparative Examples).

Capacity Evaluation:

The lithium secondary battery of each of the Examples and the Comparative Examples was sandwiched between glass plates in such a manner that the electrodes were brought into more intimate contact with each other, and subject to the following procedures. At 25° C., the battery was charged with a constant current corresponding to 0.2 C until it reached 4.2 V, and then discharged with 0.2 C constant current until it reached 3 V. The steps were carried out for three cycles to stabilize the battery. In the fourth cycle, the battery was charged with a constant current of 0.5 C until it reached 4.2 V, then charged under 4.2 V constant voltage until the current value reached 0.05 C, and discharged with 0.2 C constant current until it reached 3 V. Thus initial discharging capacity was obtained.

In the description, 1 C represents a current value for discharging a base capacity of the battery in one hour, and 0.2 C represents 1/5 of the current value.

Evaluation of Continuous Charging Characteristics:

After the capacity evaluation test, the lithium secondary battery was submerged in an ethanol bath to measure its volume. The battery was placed at 60° C. and charged with a 0.5 C constant current until it reached 4.25 V, followed by constant voltage charging that continued for one week.

The battery was then cooled and submerged in an ethanol bath to measure its volume. Based on the amount of change in volume before and after the continuous charging, the amount of generated gas was determined.

After the measurement of the amount of gas generation, the battery was placed at 25° C. and discharged with 0.2 C constant current until it reached 3 V to thereby obtain residual capacity after the continuous charging test. With respect to the discharging capacity before the continuous charging test, the residual capacity after the continuous charging was determined on a percentage basis.

Evaluation of High-Temperature-Storage Characteristics:

After the capacity evaluation test, the lithium secondary battery was charged with a 0.5 C constant current until it reached 4.2 V, and then charged under 4.2 V constant voltage until the current value reached 0.05 C, followed by storage at 85° C. for 3 days. Subsequently, the battery was well-cooled to 25° C. and subjected to discharging with 0.2 C constant current until it reached 3 V to thereby obtain residual capacity after the storage test. With respect to the discharging capacity before the storage test, the residual capacity after the storage test was determined on a percentage basis.

Evaluation of Cycle Characteristics:

After the capacity evaluation test, the lithium secondary battery was placed at 25° C. and subjected to a cycle test in which the battery was charged with a 0.5 C constant current until it reached 4.2 V, then charged under 4.2 V constant voltage until the current value reached 0.05 C, and discharged with a 1 C constant current until it reached 3 V. With respect to the discharging capacity before the cycle test, the discharging capacity after the 300th cycle was determined on a percentage basis.

Example (IIa-1)

In an atmosphere of dry argon, 97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of 2,4,8,10-tetraoxaspiro[5.5]undecane, serving as a compound (IIa). In the resultant mixture, well-dried LiPF$_6$ was dissolved in the proportion of 1.0 mol/liter. Thus, a non-aqueous electrolyte solution (the non-aqueous electrolyte solution of Example (IIa-1)) was prepared. The obtained non-aqueous electrolyte solution was subjected to the aforementioned procedures to thereby produce the lithium secondary battery (the lithium secondary battery of Example (IIa-1)).

Example (IIa-2)

97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of 3,9-divinyl-2,4,8,10-tetraoxaspiro[5.5]undecane, serving as a compound (IIa). In the resultant mixture, well-dried LiPF$_6$ was dissolved in the proportion of 1.0 mol/liter. Thus, a non-aqueous electrolyte solution (the non-aqueous electrolyte solution of Example (IIa-2)) was prepared. The obtained non-aqueous electrolyte solution was subjected to the aforementioned procedures to thereby produce the lithium secondary battery (the lithium secondary battery of Example (IIa-2)).

Example (IIa-3)

97.5 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 0.5 weight part of 3,9-divinyl-2,4,8,10-tetraoxaspiro[5.5]undecane, serving as a compound (IIa). In the resultant mixture, well-dried LiPF$_6$ was dissolved in the proportion of 1.0 mol/liter. Thus, a non-aqueous electrolyte solution (the non-aqueous electrolyte solution of Example (IIa-3)) was prepared. The obtained non-aqueous electrolyte solution was subjected to the aforementioned procedures to thereby produce the lithium secondary battery (the lithium secondary battery of Example (IIa-3)).

Example (IIa-4)

97.8 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 0.2 weight part of 3,9-divinyl-2,4,8,10-tetraoxaspiro[5.5]undecane, serving as a compound (IIa). In the resultant mixture, well-dried $LiPF_6$ was dissolved in the proportion of 1.0 mol/liter. Thus, a non-aqueous electrolyte solution (the non-aqueous electrolyte solution of Example (IIa-4)) was prepared. The obtained non-aqueous electrolyte solution was subjected to the aforementioned procedures to thereby produce the lithium secondary battery (the lithium secondary battery of Example (IIa-4)).

Comparative Example (IIa-1)

98 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound. In the resultant mixture, well-dried $LiPF_6$ was dissolved in the proportion of 1.0 mol/liter. Thus, a non-aqueous electrolyte solution (the non-aqueous electrolyte solution of Comparative Example (IIa-1)) was prepared. The obtained non-aqueous electrolyte solution was subjected to the aforementioned procedures to thereby produce the lithium secondary battery (the lithium secondary battery of Comparative Example (IIa-1)).

Comparative Example (IIa-2)

97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of 1,3-dioxane as an additive. In the resultant mixture, well-dried $LiPF_6$ was dissolved in the proportion of 1.0 mol/liter. Thus, a non-aqueous electrolyte solution (the non-aqueous electrolyte solution of Comparative Example (IIa-2)) was prepared. The obtained non-aqueous electrolyte solution was subjected to the aforementioned procedures to thereby produce the lithium secondary battery (the lithium secondary battery of Comparative Example (IIa-2)).

Evaluation Results of Batteries

The lithium secondary batteries of Examples (IIa-1)-(IIa-4) and Comparative Examples (IIa-1), (IIa-2) obtained according to the aforementioned procedures were subjected to the evaluation of continuous charging characteristics, high-temperature-storage characteristics, and cycle characteristics. The evaluation results are shown in the following Table (IIa).

TABLE (IIa)

|  | Amount of Generated Gas (ml) | Residual Capacity after Continuous Charging (%) | Residual Capacity after High-Temperature Storage (%) | Cycle Characteristics (%) |
|---|---|---|---|---|
| Example (IIa-1) | 0.40 | 94 | 82 | 88 |
| Example (IIa-2) | 0.45 | 96 | 81 | 92 |
| Example (IIa-3) | 0.48 | 92 | 80 | 93 |
| Example (IIa-4) | 0.49 | 92 | 81 | 91 |
| Comparative Example (IIa-1) | 0.76 | 89 | 75 | 88 |
| Comparative Example (IIa-2) | 0.65 | 88 | 72 | 87 |

As is evident from Table (IIa), the lithium secondary batteries of Examples (IIa-1)-(IIa-4) generate little amount of gas during continuous charging and are superior in battery characteristics after continuous charging, battery characteristics after high-temperature storage, and cycle characteristics, compared with the lithium secondary batteries of Comparative Examples (IIa-1), (IIa-2).

Examples/Comparative-Examples Group (IIb)

Procedures explained in each of the following Examples and Comparative Examples were carried out to thereby prepare a non-aqueous electrolyte solution, produce a lithium secondary battery using the resultant non-aqueous electrolyte solution, and evaluate the obtained lithium secondary battery.

Production and evaluation procedures of a lithium secondary battery, which are common to the Examples and the Comparative Examples, are explained in advance.

[Battery Production and Evaluation Procedures]

Production of Negative Electrode:

94 weight parts of natural graphite powder, whose d value of the lattice plane (002 plane) obtained by X-ray diffraction is 0.336 nm, whose crystallite size (Lc) is 652 nm, whose ash content is 0.07 weight %, whose median diameter according to laser diffraction/scattering method is 12 µm, whose specific surface area according to BET method is 7.5 $m^2/g$, whose R value (=$I_B/I_A$) according to Raman spectrum analysis using argon ion laser light 0.12, and whose half-value width of the peak within the range of between 1570-1620 $cm^{-1}$ is 19.9 $cm^{-1}$, was mixed with 6 weight parts of poly vinylidene fluoride and made into the form of slurry under the presence of N-methyl-2-pyrrolidone. Onto a surface of a copper foil with the thickness of 12 µm, the obtained slurry was applied uniformly, dried and pressed in such a manner that the density of the negative electrode active layer be 1.6 $g/cm^3$, thereby a negative electrode being obtained.

Production of Positive Electrode:

85 weight parts of $LiCoO_2$, 6 weight parts of carbon black and 9 weight parts of poly vinylidene fluoride (trade mark "KF-1000", manufactured by Kureha Kagaku Corp.) were mixed together and made into the form of slurry under the presence of N-methyl-2-pyrrolidone. Onto the both surfaces of an aluminum foil with the thickness of 15 µm, the obtained slurry was applied uniformly, dried and pressed in such a manner that the density of the positive electrode active layer be 3.0 $g/cm^3$, thereby a positive electrode being obtained.

Production of Lithium Secondary Battery:

The thus-obtained positive electrode and negative electrodes, together with separators made of polyethylene, were layered in the order of a negative electrode, a separator, a positive electrode, a separator, and a negative electrode, to produce a battery element. The battery element was inserted into a bag formed with laminated film of aluminum (40 µm in thickness), whose both faces were coated with resin layers, with the terminals of the positive electrode and negative electrodes sticking out from the bag. The bag was filled with a non-aqueous electrolyte solution, which was prepared in each of the Examples and Comparative Examples described below, and then vacuum-sealed to produce a sheet-type battery (a lithium secondary battery of each of the Examples and the Comparative Examples).

Capacity Evaluation:

The lithium secondary battery of each of the Examples and the Comparative Examples was sandwiched between glass plates in such a manner that the electrodes were brought into more intimate contact with each other, and subject to the following procedures. At 25° C., the battery was charged with a constant current corresponding to 0.2 C until it reached 4.2 V, and then discharged with 0.2 C constant current until it reached 3 V. The steps were carried out for three cycles to stabilize the battery. In the fourth cycle, the battery was charged with a constant current of 0.5 C until it reached 4.2 V, then charged under 4.2 V constant voltage until the current value reached 0.05 C, and discharged with 0.2 C constant current until it reached 3 V. Thus initial discharging capacity was obtained.

In the description, 1 C represents a current value for discharging a base capacity of the battery in one hour, and 0.2 C represents ⅕ of the current value.

Evaluation of Continuous Charging Characteristics:

After the capacity evaluation test, the lithium secondary battery was submerged in an ethanol bath to measure its volume. The battery was placed at 60° C. and charged with a 0.5 C constant current until it reached 4.25 V, followed by constant voltage charging that continued for one week.

The battery was then cooled and submerged in an ethanol bath to measure its volume. Based on the amount of change in volume before and after the continuous charging, the amount of generated gas was determined.

After the measurement of the amount of gas generation, the battery was placed at 25° C. and discharged with 0.2 C constant current until it reached 3 V to thereby obtain residual capacity after the continuous charging test. With respect to the discharging capacity before the continuous charging test, the residual capacity after the continuous charging was determined on a percentage basis.

Evaluation of High-Temperature-Storage Characteristics:

After the capacity evaluation test, the lithium secondary battery was charged with a 0.5 C constant current until it reached 4.2 V, and then charged under 4.2 V constant voltage until the current value reached 0.05 C, followed by storage at 85° C. for 3 days. Subsequently, the battery was well-cooled to 25° C. and subjected to discharging with 0.2 C constant current until it reached 3 V to thereby obtain residual capacity after the storage test. With respect to the discharging capacity before the storage test, the residual capacity after the storage test was determined on a percentage basis.

Example (IIb-1)

In an atmosphere of dry argon, 97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of propane-1,3-bis (sulfonyl fluoride), serving as a compound (IIb). In the resultant mixture, well-dried $LiPF_6$ was dissolved in the proportion of 1.0 mol/liter. Thus, a non-aqueous electrolyte solution (the non-aqueous electrolyte solution of Example (IIb-1)) was prepared. The obtained non-aqueous electrolyte solution was subjected to the aforementioned procedures to thereby produce the lithium secondary battery (the lithium secondary battery of Example (IIb-1)).

Example (IIb-2)

In an atmosphere of dry argon, 97 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and one weight part of 1,1,2,2,3,3-hexafluoropropane-1, 3-bis(sulfonyl fluoride), serving as a compound (IIb). In the resultant mixture, well-dried $LiPF_6$ was dissolved in the proportion of 1.0 mol/liter. Thus, a non-aqueous electrolyte solution (the non-aqueous electrolyte solution of Example (IIb-2)) was prepared. The obtained non-aqueous electrolyte solution was subjected to the aforementioned procedures to thereby produce the lithium secondary battery (the lithium secondary battery of Example (IIb-2)).

Example (IIb-3)

In an atmosphere of dry argon, 97.5 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 0.5 weight part of propane-1,3-bis (sulfonyl fluoride), serving as a compound (IIb). In the resultant mixture, well-dried $LiPF_6$ was dissolved in the proportion of 1.0 mol/liter. Thus, a non-aqueous electrolyte solution (the non-aqueous electrolyte solution of Example (IIb-3)) was prepared. The obtained non-aqueous electrolyte solution was subjected to the aforementioned procedures to thereby produce the lithium secondary battery (the lithium secondary battery of Example (IIb-3)).

Comparative Example (IIb-1)

98 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound. In the resultant mixture, well-dried $LiPF_6$ was dissolved in the proportion of 1.0 mol/liter. Thus, a non-aqueous electrolyte solution (the non-aqueous electrolyte solution of Comparative Example (IIb-1)) was prepared. The obtained non-aqueous electrolyte solution was subjected to the aforementioned procedures to thereby produce the lithium secondary battery (the lithium secondary battery of Comparative Example (IIb-1)).

Comparative Example (IIb-2)

96 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 2 weight parts of benzene sulfonyl fluoride as an additive. In the resultant mixture, well-dried $LiPF_6$ was dissolved in the proportion of 1.0 mol/liter. Thus, a non-aqueous electrolyte solution (the non-aqueous electrolyte solution of Comparative Example (IIb-2)) was prepared. The obtained non-aqueous electrolyte solution was subjected to the aforementioned procedures to thereby produce the lithium secondary battery (the lithium secondary battery of Comparative Example (IIb-2)).

Comparative Example (IIb-3)

96 weight parts of the mixture of ethylene carbonate, ethyl methyl carbonate, and dimethyl carbonate (2:4:4 in volume ratio) was mixed with 2 weight parts of vinylene carbonate, serving as an unsaturated cyclic carbonate compound, and 2 weight parts of p-toluene sulfonyl fluoride as an additive. In the resultant mixture, well-dried $LiPF_6$ was dissolved in the proportion of 1.0 mol/liter. Thus, a non-aqueous electrolyte solution (the non-aqueous electrolyte solution of Comparative Example (IIb-3)) was prepared. The obtained non-aqueous electrolyte solution was subjected to the aforementioned procedures to thereby produce the lithium secondary battery (the lithium secondary battery of Comparative Example (IIb-3)).

[Evaluation Results of Batteries]

The lithium secondary batteries of Examples (IIb-1)-(IIb-3) and Comparative Examples (IIb-1)-(IIb-3) obtained according to the aforementioned procedures were subjected to the evaluation of continuous charging characteristics and high-temperature-storage characteristics. The evaluation results are shown in the following Table (IIb).

TABLE 14

Table (IIb)

| | Compound (IIb) or Additive | | | Residual Capacity | Residual Capacity |
|---|---|---|---|---|---|
| | Selection | Mixed Amount (weight part) | Amount of Generated Gas (ml) | after Continuous Charging (%) | after High-Temperature Storage (%) |
| Example (IIb-1) | $(SO_2F)$—$C_3H_6$—$(SO_2F)$ | 1 | 0.49 | 96 | 83 |
| Example (IIb-2) | $(SO_2F)$—$C_3F_6$—$(SO_2F)$ | 1 | 0.51 | 96 | 81 |
| Example (IIb-3) | $(SO_2F)$—$C_3H_6$—$(SO_2F)$ | 0.5 | 0.52 | 98 | 84 |
| Comparative Example (IIb-1) | — | 0 | 0.76 | 89 | 75 |
| Comparative Example (IIb-2) | ⌬—$SO_2F$ | 2 | 0.73 | 88 | 67 |
| Comparative Example (IIb-3) | $H_3C$—⌬—$SO_2F$ | 2 | 1.28 | 83 | 63 |

As is evident from Table (IIb), the lithium secondary batteries of Examples (IIb-1)-(IIb-3) generate little amount of gas during continuous charging and are superior in battery characteristics after high-temperature storage, compared with the lithium secondary batteries of Comparative Examples (IIb-1)-(IIb-3).

Examples/Comparative-Examples Group (IIc)

Procedures explained in each of the following Examples and Comparative Examples were carried out to thereby prepare a non-aqueous electrolyte solution, produce a lithium secondary battery using the resultant non-aqueous electrolyte solution, and evaluate the obtained lithium secondary battery.

Production and evaluation procedures of a lithium secondary battery, which are common to the Examples and the Comparative Examples, are explained in advance.

[Battery Production and Evaluation Procedures]

Production of Negative Electrode:

94 weight parts of natural graphite powder, whose d value of the lattice plane (002 plane) obtained by X-ray diffraction is 0.336 nm, whose crystallite size (Lc) is 652 nm, whose ash content is 0.07 weight %, whose median diameter according to laser diffraction/scattering method is 12 μm, whose specific surface area according to BET method is 7.5 m²/g, whose R value ($=I_B/I_A$) according to Raman spectrum analysis using argon ion laser light 0.12, and whose half-value width of the peak within the range of between 1570-1620 cm$^{-1}$ is 19.9 cm$^{-1}$, was mixed with 6 weight parts of poly vinylidene fluoride and made into the form of slurry under the presence of N-methyl-2-pyrrolidone. Onto a surface of a copper foil with the thickness of 12 μm, the obtained slurry was applied uniformly, dried and pressed in such a manner that the density of the negative electrode active layer be 1.6 g/cm³. The resultant plate was cut into the shape of 3.5 cm×2.5 cm to thereby obtain a negative electrode.

Production of Positive Electrode:

85 weight parts of $LiCoO_2$, 6 weight parts of carbon black and 9 weight parts of poly vinylidene fluoride (trade mark "KF-1000", manufactured by Kureha Kagaku Corp.) were mixed together and made into the form of slurry under the presence of N-methyl-2-pyrrolidone. Onto the both surfaces of an aluminum foil with the thickness of 15 μm, the obtained slurry was applied uniformly and dried, followed by pressing in such a manner that the density of the positive electrode active layer be 3.0 g/cm³. The resultant plate was cut into the shape of 3.5 cm×2.5 cm to thereby obtain a positive electrode.

Production of Lithium Secondary Battery:

The thus-obtained positive electrode and negative electrodes, together with separators made of polyethylene, were layered in the order of a negative electrode, a separator, a positive electrode, a separator, and a negative electrode, to produce a battery element. The battery element was inserted into a bag formed with laminated film of aluminum (40 μm in thickness), whose both faces were coated with resin layers, with the terminals of the positive electrode and negative electrodes sticking out from the bag. The bag was filled with a non-aqueous electrolyte solution, which was prepared in each of the Examples and Comparative Examples described below, and then vacuum-sealed to produce a sheet-type battery (a lithium secondary battery of each of the Examples and the Comparative Examples).

Initial Evaluation:

The lithium secondary battery of each of the Examples and the Comparative Examples was sandwiched between glass plates in such a manner that the electrodes were brought into more intimate contact with each other, and subject to the following procedures. At 25° C., the battery was charged with a constant current corresponding to 0.2 C until it reached 4.2 V, and then discharged with 0.2 C constant current until it reached 3 V. The steps were carried out for three cycles to stabilize the battery. In the description, 1 C represents a current value for discharging a base capacity of the battery in one hour, and 0.2 C represents ⅕ of the current value. Subsequently, the volume of the battery was measured according to Archimedes' method.

Evaluation of Continuous Charging Characteristics:

After the initial evaluation, the lithium secondary battery was continuously charged under 4.3 V constant voltage for 7 days while kept at the constant temperature of 60° C. After the battery was well-cooled naturally, the battery volume after continuous charging was measured according to Archimedes' method, and the variation from the battery volume at the initial evaluation was obtained as a gas amount during continuous charging. Reducing the gas amount enables the design of a battery in which the occurrence of swelling during continuous charging is inhibited. Subsequently, the battery was discharged with 0.2 C constant current until it reached 3 V, then charged with a 0.5 C constant current until it reached 4.2 V, and charged under 4.2 V constant voltage until the current value reached 0.05 C. The battery was then discharged with a 1 C constant current until it reached 3 V to obtain a capacity in 1 C discharging after continuous charging. Increasing the capacity in 1 C discharging enables the design of a battery in which degradation is inhibited.

Evaluation of High-Temperature-Storage Characteristics:

After the initial evaluation, the lithium secondary battery was charged with a 0.5 C constant current until it reached 4.2 V, and then charged under 4.2 V constant voltage until the current value reached 0.05 C, after which the battery was stored at 85° C. for 72 hours. After the battery was well-cooled naturally, the battery volume after high-temperature storage was measured according to Archimedes' method, and the variation from the volume before the storage was determined as the amount of gas generation. Reducing the gas amount enables the design of a battery in which the occurrence of swelling during continuous charging is inhibited. Subsequently, the battery was charged with a 0.5 C constant current until it reached 4.2 V, then charged under 4.2 V constant voltage until the current value reached 0.05 C. The battery was then discharged with a 1.0 C constant current until it reached 3 V to obtain a capacity in 1 C discharging after continuous charging. Increasing the capacity in 1 C discharging enables the design of a battery in which degradation is inhibited.

Evaluation of Discharging Storage Characteristics:

After the initial evaluation, the lithium secondary battery was stored at 60° C. and variation in residual voltage was monitored. The elapsed time while the residual voltage changed from 3 V to 1 V was determined as a discharging storage time. A battery that shows a longer discharging storage time suffers less degradation during discharging and is more stable.

Example (IIc-1)

In an atmosphere of dry argon, 998 weight parts of the mixture of ethylene carbonate and ethyl methyl carbonate (1:2 in volume ratio), serving as non-aqueous solvents, was mixed with 2 weight parts of N,N'-bis (trifluoroacetyl)piperazine, i.e., the aforementioned example compound (A-3), as a compound (Ic). To the resultant mixture, well-dried $LiPF_6$ was added as an electrolyte in the proportion of 1 mol/liter and dissolved. Thus, a non-aqueous electrolyte solution (the non-aqueous electrolyte solution of Example (IIc-1)) was prepared. The obtained non-aqueous electrolyte solution was subjected to the aforementioned procedures to thereby produce the lithium secondary battery (the lithium secondary battery of Example (IIc-1)).

Example (IIc-2)

995 weight parts of the mixture of ethylene carbonate and ethyl methyl carbonate (1:2 in volume ratio), serving as non-aqueous solvents, was mixed with 5 weight parts of N,N'-bis (trifluoroacetyl)piperazine, serving as a compound (Ic). To the resultant mixture, well-dried $LiPF_6$ was added as an electrolyte in the proportion of 1 mol/liter and dissolved. Thus, a non-aqueous electrolyte solution (the non-aqueous electrolyte solution of Example (IIc-2)) was prepared. The obtained non-aqueous electrolyte solution was subjected to the aforementioned procedures to thereby produce the lithium secondary battery (the lithium secondary battery of Example (IIc-2)).

Example (IIc-3)

98 weight parts of the mixture of ethylene carbonate and ethyl methyl carbonate (1:2 in volume ratio), serving as non-aqueous solvents, was mixed with 2 weight parts of N,N'-bis (trifluoroacetyl)piperazine, serving as a compound (Ic). To the resultant mixture, well-dried $LiPF_6$ was added as an electrolyte in the proportion of 1 mol/liter and dissolved. Thus, a non-aqueous electrolyte solution (the non-aqueous electrolyte solution of Example (IIc-3)) was prepared. The obtained non-aqueous electrolyte solution was subjected to the aforementioned procedures to thereby produce the lithium secondary battery (the lithium secondary battery of Example (IIc-3)).

Comparative Example (IIc-1)

To the mixture of ethylene carbonate and ethyl methyl carbonate (1:2 in volume ratio), serving as non-aqueous solvents, well-dried $LiPF_6$ was added as an electrolyte in the proportion of 1 mol/liter and dissolved. Thus, a non-aqueous electrolyte solution (the non-aqueous electrolyte solution of Comparative Example (IIc-1)) was prepared. The obtained non-aqueous electrolyte solution was subjected to the aforementioned procedures to thereby produce the lithium secondary battery (the lithium secondary battery of Comparative Example (IIc-1)).

Comparative Example (IIc-2)

995 weight parts of the mixture of ethylene carbonate and ethyl methyl carbonate (1:2 in volume ratio), serving as non-aqueous solvents, was mixed with 5 weight parts of N,N-dimethyl trifluoroacetamide as an additive. To the resultant mixture, well-dried $LiPF_6$ was added as an electrolyte in the proportion of 1 mol/liter and dissolved. Thus, a non-aqueous electrolyte solution (the non-aqueous electrolyte solution of Comparative Example (IIc-2)) was prepared. The obtained non-aqueous electrolyte solution was subjected to the aforementioned procedures to thereby produce the lithium secondary battery (the lithium secondary battery of Comparative Example (IIc-2)).

Example (IIc-4)

978 weight parts of the mixture of ethylene carbonate and ethyl methyl carbonate (1:2 in volume ratio), serving as non-aqueous solvents, was mixed with 20 weight parts of vinylene carbonate, serving as an unsaturated cyclic carbonate compound, and 2 weight parts of N,N'-bis(trifluoroacetyl)piperazine, serving as a compound (Ic). To the resultant mixture, well-dried $LiPF_6$ was added as an electrolyte in the proportion of 1 mol/liter and dissolved. Thus, a non-aqueous electrolyte solution (the non-aqueous electrolyte solution of Example (IIc-4)) was prepared. The obtained non-aqueous electrolyte solution was subjected to the aforementioned procedures to thereby produce the lithium secondary battery (the lithium secondary battery of Example (IIc-4)).

Example (IIc-5)

975 weight parts of the mixture of ethylene carbonate and ethyl methyl carbonate (1:2 in volume ratio), serving as non-aqueous solvents, was mixed with 20 weight parts of vinylene carbonate, serving as an unsaturated cyclic carbonate compound, and 5 weight parts of N,N'-bis(trifluoroacetyl)piperazine, serving as a compound (Ic). To the resultant mixture, well-dried $LiPF_6$ was added as an electrolyte in the proportion of 1 mol/liter and dissolved. Thus, a non-aqueous electrolyte solution (the non-aqueous electrolyte solution of Example (IIc-5)) was prepared. The obtained non-aqueous electrolyte solution was subjected to the aforementioned procedures to thereby produce the lithium secondary battery (the lithium secondary battery of Example (IIc-5)).

Comparative Example (IIc-3)

98 weight parts of the mixture of ethylene carbonate and ethyl methyl carbonate (1:2 in volume ratio), serving as non-aqueous solvents, was mixed with 2 weight parts of vinylene carbonate, serving as an unsaturated cyclic carbonate compound. To the resultant mixture, well-dried $LiPF_6$ was added as an electrolyte in the proportion of 1 mol/liter and dissolved. Thus, a non-aqueous electrolyte solution (the non-aqueous electrolyte solution of Comparative Example (IIc-3)) was prepared. The obtained non-aqueous electrolyte solution was subjected to the aforementioned procedures to thereby produce the lithium secondary battery (the lithium secondary battery of Comparative Example (IIc-3)).

Comparative Example (IIc-4)

975 weight parts of the mixture of ethylene carbonate and ethyl methyl carbonate (1:2 in volume ratio), serving as non-aqueous solvents, was mixed with 20 weight parts of vinylene carbonate, serving as an unsaturated cyclic carbonate compound, and 5 weight parts of N,N-dimethyl trifluoroacetamide as an additive. To the resultant mixture, well-dried $LiPF_6$ was added as an electrolyte in the proportion of 1 mol/liter and dissolved. Thus, a non-aqueous electrolyte solution (the non-aqueous electrolyte solution of Comparative Example (IIc-4)) was prepared. The obtained non-aqueous electrolyte solution was subjected to the aforementioned procedures to thereby produce the lithium secondary battery (the lithium secondary battery of Comparative Example (IIc-4)).

[Evaluation Results of Batteries]

The lithium secondary batteries of Examples (IIc-1)-(IIc-5) and Comparative Examples (IIc-1)-(IIc-4) obtained according to the aforementioned procedures were subjected to the initial evaluation and the evaluation of continuous charging characteristics, high-temperature-storage characteristics, and discharging storage characteristics. The evaluation results are shown in the following Table (IIc-1) and Table (IIc-2). In column "Additive" of each table, "Additive 1"represents N,N-dimethyl trifluoroacetamide, and "Additive 2" represents N,N'-bis (trifluoroacetyl)piperazine, being a compound (IIc). Also, in column "Assistant" of each table, "VC"represents vinylene carbonate, being an unsaturated cyclic carbonate compound.

TABLE (IIc-1)

| | Compound (IIc) or Additive | | Unsaturated Cyclic Carbonate Compound | | Continuous Charging Gas | 1C Capacity after | Storage Gas Generation | 1C Capacity after |
|---|---|---|---|---|---|---|---|---|
| | Selection | Concentration (weight %) | Selection | Concentration (weight %) | Generation Amount (ml) | Continuous Charging (mAh/g) | Amount (ml) | Storage (mAh/g) |
| Comparative Example (IIc-1) | None | — | None | — | 0.43 | 33 | 0.16 | 110 |
| Comparative Example (IIc-2) | Additive 1 | 0.5 | None | — | 0.38 | 42 | 0.07 | 111 |
| Example (IIc-1) | Additive 2 | 0.2 | None | — | 0.28 | 56 | 0.09 | 113 |
| Example (IIc-2) | Additive 2 | 0.5 | None | — | 0.22 | 61 | 0.06 | 114 |
| Example (IIc-3) | Additive 2 | 2.0 | None | — | 0.20 | 59 | 0.03 | 110 |
| Comparative Example (IIc-3) | None | — | VC | 2.0 | 0.49 | 28 | 0.37 | 112 |
| Comparative Example (IIc-4) | Additive 1 | 0.5 | VC | 2.0 | 0.45 | 31 | 0.32 | 117 |
| Example (IIc-4) | Additive 2 | 0.2 | VC | 2.0 | 0.39 | 58 | 0.30 | 118 |
| Example (IIc-5) | Additive 2 | 0.5 | VC | 2.0 | 0.36 | 71 | 0.30 | 116 |

TABLE (IIc-2)

| | Compound (IIc) or Additive | | Unsaturated Cyclic Carbonate Compound | | Discharging Storage |
|---|---|---|---|---|---|
| | Selection | Concentration (weight %) | Selection | Concentration (weight %) | Time (hours) |
| Comparative Example (IIc-1) | None | — | None | — | 212 |
| Comparative Example (IIc-2) | Additive 1 | 0.5 | None | — | 89 |

TABLE (IIc-2)-continued

|  | Compound (IIc) or Additive | | Unsaturated Cyclic Carbonate Compound | | Discharging Storage |
| --- | --- | --- | --- | --- | --- |
|  | Selection | Concentration (weight %) | Selection | Concentration (weight %) | Time (hours) |
| Example (IIc-2) | Additive 2 | 0.5 | None | — | 210 |
| Comparative Example (IIc-3) | None | — | VC | 2.0 | 334 |
| Comparative Example (IIc-4) | Additive 1 | 0.5 | VC | 2.0 | 292 |
| Comparative Example (IIc-5) | Additive 2 | 0.5 | VC | 2.0 | 362 |

As is evident from Table (IIc-1), according to the lithium secondary battery of each of Examples (IIc-1)-(IIc-3), which uses a non-aqueous electrolyte solutions with a compound (IIc), the amount of gas generation was reduced significantly compared with the lithium secondary battery of Comparative Example 1, which uses a non-aqueous electrolyte solution without any additive. Also, as is evident from Table (IIc-2), the discharging storage time worsened in the lithium secondary battery of Comparative Example (IIc-2), which uses a non-aqueous electrolyte solution with a compound that has only a single amide site, while such worsening during discharging storage was scarcely observed in the lithium secondary battery of Example (IIc-2), which uses a non-aqueous electrolyte solution with a compound (IIc), i.e., a compound that has two amide sites. This is presumably because the use of a compound that has a single amide site does not produce effective organic coating, resulting in deterioration in characteristics.

Besides, the lithium secondary battery of each of Example (IIc-4) and Example (IIc-5), which uses a non-aqueous electrolyte solution that contains a compound (IIc), shows gas inhibitory effect compared with the case where a non-aqueous electrolyte solution with no additive was used, as in Comparative Example (IIc-3), which uses vinylene carbonate being an unsaturated cyclic carbonate. Also, as in Comparative Example (IIc-4), when a compound that has only a single amide site was added to the non-aqueous electrolyte solution, the discharging storage time deteriorates instead.

[Others]

Up to this point the present invention has been explained in detail with reference to specific embodiments, although to those skilled in the art it is obvious that various modifications can be suggested without departing from the intention and the scope of the present invention.

The present application is based on each of the descriptions of: Japanese Patent Application No. 2004-124174, which was filed Apr. 20, 2004; Japanese Patent Application No. 2004-156209, which was filed May 26, 2004; Japanese Patent Application No. 2004-214104, which was filed Jul. 22, 2004; Japanese Patent Applications Nos. 2004-229188 and 2004-229757, which were filed Aug. 5, 2004; and Japanese Patent Application No. 2004-301751, which was filed Oct. 15, 2004; and their entireties are incorporated herewith by reference.

INDUSTRIAL APPLICABILITY

As detailed above, the non-aqueous electrolyte solution of the present invention, realizes an excellent lithium secondary battery that has a large capacity, exhibits high storage characteristics and cycle characteristics, and is also capable of inhibiting gas generation. The present invention therefore can be suitably applicable to various fields in which lithium secondary batteries are used, such as the field of electronic devices. As Examples of the uses, there can be mentioned notebook computers, pen-input personal computers, mobile computers, electronic book players, cellular phones, portable facsimiles, portable copiers, portable printers, headphone stereos, video movies, liquid crystal televisions, handy cleaners, portable CDs, mini discs, transceivers, electronic databooks, electronic calculators, memory cards, portable tape recorders, radios, backup power sources, motors, illuminators, toys, game machines, watches, stroboscopes, cameras, etc.

The invention claimed is:

1. A non-aqueous electrolyte solution comprising:
    a lithium salt;
    a non-aqueous solvent; and
    a compound expressed by the following general formula (IIb)

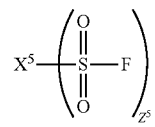

(IIb)

wherein $Z^5$ represents an integer of 2 or larger, $X^5$ represents a linkage group comprising one or more atoms selected from the group consisting of a carbon atom, a hydrogen atom, a fluorine atom and an oxygen atom, and the fluoro sulfonyl group is bound to a carbon atom of the linkage group.

2. The non-aqueous electrolyte solution of claim 1, wherein
    the concentration of the compound expressed by the general formula (IIb) with respect to the non-aqueous electrolyte solution is 0.001 weight % to 5 weight %.

3. The non-aqueous electrolyte solution of claim 1 further comprising a cyclic carbonate compound wherein said cyclic carbonate compound has an unsaturated bond and has a concentration of 0.01 weight % to 8 weight % with respect to the non-aqueous electrolyte solution.

4. A lithium secondary battery comprising:
    a non-aqueous electrolyte solution; and a positive electrode and a negative electrode capable of absorbing and desorbing lithium ions; wherein the non-aqueous electrolyte solution is the non-aqueous electrolyte solution of claim 1.

* * * * *